(12) United States Patent  (10) Patent No.: US 8,298,076 B2
Okada  (45) Date of Patent: Oct. 30, 2012

(54) GAMING MACHINE AND CONTROL DEVICE CAPABLE OF COLLECTING ADVERTISEMENT COST FROM SPONSOR, AND METHOD OF COLLECTING THE ADVERTISEMENT COST

(75) Inventor: Kazuo Okada, Tokyo (JP)

(73) Assignee: Aruze Gaming America, Inc., Las Vegas, NV (US)

( * ) Notice: Subject to any disclaimer, the term of this patent is extended or adjusted under 35 U.S.C. 154(b) by 499 days.

(21) Appl. No.: 12/577,651

(22) Filed: Oct. 12, 2009

(65) Prior Publication Data

US 2010/0190547 A1  Jul. 29, 2010

Related U.S. Application Data

(60) Provisional application No. 61/147,578, filed on Jan. 27, 2009, provisional application No. 61/147,582, filed on Jan. 27, 2009.

(51) Int. Cl.
A63F 13/00 (2006.01)

(52) U.S. Cl. ................ 463/25; 463/16; 463/20

(58) Field of Classification Search ............ 463/16, 463/20, 25
See application file for complete search history.

(56) References Cited

U.S. PATENT DOCUMENTS

| 4,283,709 A | 8/1981 | Lucero et al. |
| 4,624,459 A | 11/1986 | Kaufman |
| 4,669,731 A | 6/1987 | Clarke |
| 4,837,728 A | 6/1989 | Barrie et al. |
| 4,964,638 A | 10/1990 | Ishida |
| 5,178,390 A | 1/1993 | Okada |
| 5,271,626 A | 12/1993 | Llenas et al. |
| 5,280,909 A | 1/1994 | Tracy |
| 5,564,700 A | 10/1996 | Celona |
| 5,611,730 A | 3/1997 | Weiss |
| 5,639,088 A | 6/1997 | Schneider et al. |
| 5,695,402 A | 12/1997 | Stupak |
| 5,702,303 A | 12/1997 | Takemoto et al. |
| 5,770,533 A | 6/1998 | Franchi |
| 5,820,459 A | 10/1998 | Acres et al. |
| 5,836,817 A | 11/1998 | Acres et al. |
| 5,890,963 A | 4/1999 | Yen |
| 5,910,048 A | 6/1999 | Feinberg |
| 6,001,016 A | 12/1999 | Walker et al. |
| 6,003,013 A | 12/1999 | Boushy et al. |
| 6,089,980 A | 7/2000 | Gauselmann |
| 6,224,482 B1 | 5/2001 | Bennett |
| 6,234,896 B1 | 5/2001 | Walker et al. |
| 6,244,957 B1 | 6/2001 | Walker et al. |
| 6,254,483 B1 | 7/2001 | Acres |
| 6,257,981 B1 | 7/2001 | Acres et al. |
| 6,270,409 B1 | 8/2001 | Shuster |

(Continued)

FOREIGN PATENT DOCUMENTS

DE  3242890  5/1984

(Continued)

Primary Examiner — James S McClellan
(74) Attorney, Agent, or Firm — Edwards Wildman Palmer LLP

(57) ABSTRACT

According to a gaming machine 1, a predetermined profit is offered and an advertisement image of a sponsor is displayed to a lower image display panel 141 when a predetermined condition is satisfied. A hard disk drive 205 provided in an external control device 200 stores data based on the satisfaction of the predetermined condition as cost-collecting data for collecting money in an amount corresponding to the predetermined profit from the sponsor.

15 Claims, 32 Drawing Sheets

U.S. PATENT DOCUMENTS

| | | |
|---|---|---|
| 6,273,820 B1 | 8/2001 | Haste, III |
| 6,695,697 B1 | 2/2004 | Okada |
| 6,932,704 B2 | 8/2005 | Walker et al. |
| 6,932,707 B2 | 8/2005 | Duhamel |
| 7,946,922 B2 * | 5/2011 | Yin .................................. 463/42 |
| 2003/0069073 A1 | 4/2003 | Okada |
| 2007/0077981 A1 * | 4/2007 | Hungate et al. .................. 463/16 |
| 2008/0167106 A1 * | 7/2008 | Lutnick et al. .................. 463/16 |
| 2009/0124384 A1 * | 5/2009 | Smith et al. ...................... 463/42 |
| 2010/0120494 A1 * | 5/2010 | Dewaal et al. .................. 463/20 |

FOREIGN PATENT DOCUMENTS

| | | |
|---|---|---|
| DE | 3712841 | 11/1988 |
| DE | 4137010 | 8/1992 |
| DE | 10049444 | 11/2001 |
| EP | 0 631 798 | 1/1995 |
| EP | 0 840 264 | 5/1998 |
| EP | 1 192 975 | 4/2002 |
| EP | 1 302 914 | 4/2003 |
| EP | 1 351 180 | 10/2003 |
| EP | 1 477 947 | 11/2004 |
| EP | 1 544 811 | 6/2005 |
| GB | 2 326 830 | 1/1999 |
| JP | 6-39062 (U) | 5/1994 |
| WO | 03/083795 | 10/2003 |
| WO | 2004/095383 | 11/2004 |

\* cited by examiner

FIG. 5

| Code number | 1st video reel Symbol | 2nd video reel Symbol | 3rd video reel Symbol | 4th video reel Symbol | 5th video reel Symbol |
|---|---|---|---|---|---|
| 00 | JACKPOT 7 | JACKPOT 7 | JACKPOT 7 | JACKPOT 7 | JACKPOT 7 |
| 01 | PLUM | BELL | CHERRY | ORANGE | APPLE |
| 02 | ORANGE | APPLE | ORANGE | PLUM | ORANGE |
| 03 | PLUM | BELL | APPLE | STRAWBERRY | BELL |
| 04 | ORANGE | CHERRY | ORANGE | BELL | PLUM |
| 05 | PLUM | ORANGE | PLUM | PLUM | BLUE 7 |
| 06 | ORANGE | PLUM | ORANGE | APPLE | ORANGE |
| 07 | PLUM | CHERRY | PLUM | BLUE 7 | APPLE |
| 08 | BLUE 7 | BELL | ORANGE | PLUM | PLUM |
| 09 | CHERRY | APPLE | PLUM | ORANGE | BELL |
| 10 | ORANGE | BELL | ORANGE | BELL | CHERRY |
| 11 | BELL | STRAWBERRY | PLUM | ORANGE | PLUM |
| 12 | ORANGE | PLUM | BELL | PLUM | BELL |
| 13 | STRAWBERRY | BLUE 7 | STRAWBERRY | CHERRY | ORANGE |
| 14 | BLUE 7 | BELL | BLUE 7 | APPLE | APPLE |
| 15 | ORANGE | APPLE | BELL | STRAWBERRY | PLUM |
| 16 | APPLE | BELL | CHERRY | CHERRY | CHERRY |
| 17 | PLUM | STRAWBERRY | PLUM | BELL | ORANGE |
| 18 | ORANGE | PLUM | ORANGE | PLUM | BELL |
| 19 | PLUM | CHERRY | PLUM | ORANGE | ORANGE |
| 20 | BLUE 7 | BELL | ORANGE | CHERRY | PLUM |
| 21 | CHERRY | APPLE | PLUM | PLUM | STRAWBERRY |

FIG. 8

Symbol combination table

| Combination of symbols | | | | | Number of payouts | Winning combination |
|---|---|---|---|---|---|---|
| 1st video reel | 2nd video reel | 3rd video reel | 4th video reel | 5th video reel | | |
| JACKPOT 7 | JACKPOT 7 | JACKPOT 7 | JACKPOT 7 | JACKPOT 7 | Amount of jackpot | Jackpot |
| APPLE | APPLE | APPLE | APPLE | APPLE | 20 | APPLE |
| BLUE 7 | BLUE 7 | BLUE 7 | BLUE 7 | BLUE 7 | 10 | BLUE |
| BELL | BELL | BELL | BELL | BELL | 8 | BELL |
| CHERRY | CHERRY | CHERRY | CHERRY | CHERRY | 5 | CHERRY 3 |
| STRAWBERRY | STRAWBERRY | STRAWBERRY | STRAWBERRY | STRAWBERRY | 5 | STRAWBERRY |
| PLUM | PLUM | PLUM | PLUM | PLUM | 4 | PLUM |
| ORANGE | ORANGE | ORANGE | ORANGE | ORANGE | 3 | ORANGE 3 |
| CHERRY | CHERRY | CHERRY | (ANY) | (ANY) | 2 | CHERRY 2 |
| ORANGE | ORANGE | ORANGE | (ANY) | (ANY) | 2 | ORANGE 2 |
| CHERRY | (ANY) | (ANY) | (ANY) | (ANY) | 1 | CHERRY 1 |
| ORANGE | (ANY) | (ANY) | (ANY) | (ANY) | 1 | ORANGE 1 |

(External control device)

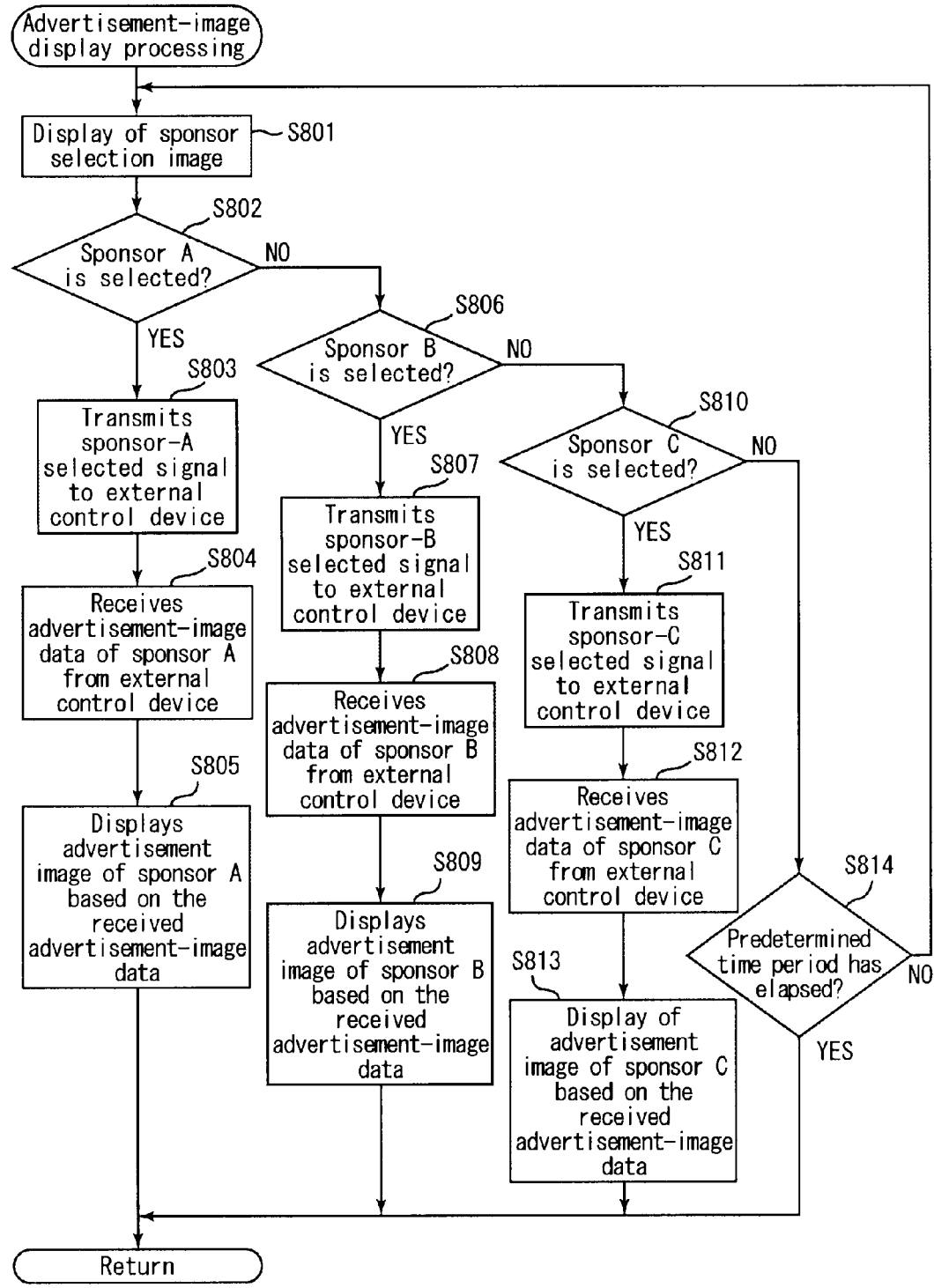

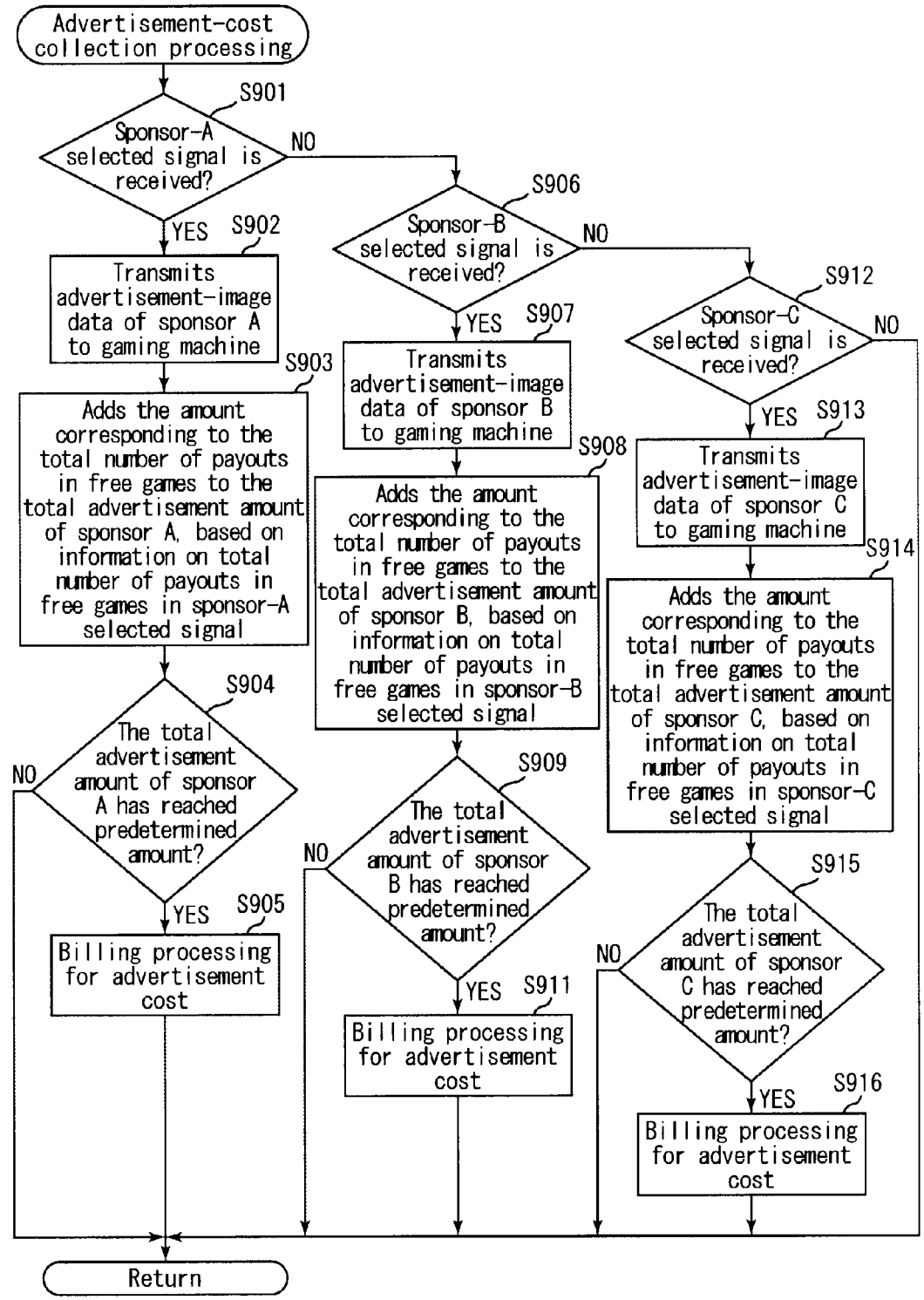

GAMING MACHINE AND CONTROL DEVICE CAPABLE OF COLLECTING ADVERTISEMENT COST FROM SPONSOR, AND METHOD OF COLLECTING THE ADVERTISEMENT COST

CROSS-REFERENCE TO RELATED APPLICATIONS

This application claims benefit of priority based on U.S. Provisional Patent Application No. 61/147,578 filed on Jan. 27, 2009, and U.S. Provisional Patent Application No. 61/147,582 filed on Jan. 27, 2009, the entire contents of which are incorporated herein by reference.

BACKGROUND OF THE INVENTION

1. Field of the Invention

The present invention relates to a gaming machine and a control device, which are capable of collecting advertisement cost from sponsors, and a method of collecting the advertisement cost.

2. Discussion of the Background

Among conventional gaming machines, a gaming machine exists which pays out a large number of game media on condition that a predetermined hand is formed or that games are played for a predetermined number of times.

Such gaming machines are disclosed for example in U.S. Pat. No. 5,178,390, U.S. Pat. No. 5,820,459, U.S. Pat. No. 6,695,697, US 2003-0069073-A1, EP 1192975-A, U.S. Pat. No. 6,254,483, U.S. Pat. No. 5,611,730, U.S. Pat. No. 5,639,088, U.S. Pat. No. 6,257,981, U.S. Pat. No. 6,234,896, U.S. Pat. No. 6,001,016, U.S. Pat. No. 6,273,820, U.S. Pat. No. 6,224,482, U.S. Pat. No. 4,669,731, U.S. Pat. No. 6,244,957, U.S. Pat. No. 5,910,048, U.S. Pat. No. 5,695,402, U.S. Pat. No. 6,003,013, U.S. Pat. No. 4,283,709, EP 0631798-A, DE 4137010-A, GB 2326830-A, DE 3712841-A, U.S. Pat. No. 4,964,638, U.S. Pat. No. 6,089,980 U.S. Pat. No. 5,280,909, U.S. Pat. No. 5,702,303, U.S. Pat. No. 6,270,409, U.S. Pat. No. 5,770,533, U.S. Pat. No. 5,836,817, U.S. Pat. No. 6,932,704, U.S. Pat. No. 6,932,707, U.S. Pat. No. 4,837,728, EP 1302914-A, U.S. Pat. No. 4,624,459, U.S. Pat. No. 5,564,700, WO 03/083795-A1, DE 3242890-A, EP 0840264-A, DE 10049444-A, WO 04/095383-A1, EP 1544811-A, U.S. Pat. No. 5,890,963, EP 1477947-A, EP 1351180-A, and the like.

A payout of a large number of game media in such a gaming machine may be highly attractive to a player. However, on the standpoint of the casino, the payout means a return of a part of the profit and it could be a great burden on the casino.

On the other hand, many companies are carrying out active advertisement through various media and direct mails in order to promote their products. In a field of gaming machines, gaming machines having advertising functions are present as disclosed in U.S. Pat. No. 5,271,626 and JP-U 06-39062.

Advertisement generally costs the company very much, and therefore, the company tends to expect an advertising effect enough for the cost.

Against the above backgrounds, the present inventor has thought that addition of features in a timing of carrying out an advertisement and in a method of collecting the advertisement cost can increase the advertising effect of the advertisement by the company, in addition to reducing the above-described burden on the casino.

The present invention was made in view of the above problems, and an object thereof is to provide a gaming machine, a gaming system, and a control device, which are capable of increasing the advertising effect of the advertisement by the company as well as reducing the financial burden on the casino, and a method of collecting the advertisement cost.

The contents of U.S. Pat. No. 5,178,390, U.S. Pat. No. 5,820,459, U.S. Pat. No. 6,695,697, US 2003-0069073-A1, EP 1192975-A, U.S. Pat. No. 6,254,483, U.S. Pat. No. 5,611,730, U.S. Pat. No. 5,639,088, U.S. Pat. No. 6,257,981, U.S. Pat. No. 6,234,896, U.S. Pat. No. 6,001,016, U.S. Pat. No. 6,273,820, U.S. Pat. No. 6,224,482, U.S. Pat. No. 4,669,731, U.S. Pat. No. 6,244,957, U.S. Pat. No. 5,910,048, U.S. Pat. No. 5,695,402, U.S. Pat. No. 6,003,013, U.S. Pat. No. 4,283,709, EP 0631798-A, DE 4137010-A, GB 2326830-A, DE 3712841-A, U.S. Pat. No. 4,964,638, U.S. Pat. No. 6,089,980 U.S. Pat. No. 5,280,909, U.S. Pat. No. 5,702,303, U.S. Pat. No. 6,270,409, U.S. Pat. No. 5,770,533, U.S. Pat. No. 5,836,817, U.S. Pat. No. 6,932,704, U.S. Pat. No. 6,932,707, U.S. Pat. No. 4,837,728, EP 1302914-A, U.S. Pat. No. 4,624,459, U.S. Pat. No. 5,564,700, WO 03/083795-A1, DE 3242890-A, EP 0840264-A, DE 10049444-A, WO 04/095383-A1, EP 1544811-A, U.S. Pat. No. 5,890,963, EP 1477947-A, and EP 1351180-A are incorporated herein by reference in their entirety.

SUMMARY OF THE INVENTION

The present invention provides a method of collecting the advertisement cost, which has the following configuration.

Namely, the method of collecting advertisement cost, comprises the steps of: (a) a gaming machine offering a predetermined profit when a predetermined condition is satisfied; (b) the gaming machine outputting an advertisement image or an advertisement sound of a sponsor to an output device when the predetermined condition is satisfied; (c) the gaming machine transmitting a signal based on the satisfaction of the predetermined condition to a control device at a predetermined timing; (A) the control device receiving the signal transmitted in the step (c); and (B) the control device storing cost-collecting data for collecting money in an amount corresponding to the predetermined profit from the sponsor in a memory device, the cost-collecting data being based on data included in the signal received in the step (A).

According to the method of collecting advertisement cost, a predetermined profit is offered in a gaming machine when a predetermined condition is satisfied. At this time, the player is generally elated and satisfied with obtaining of the predetermined profit. According to the method of collecting advertisement cost, an advertisement image or an advertisement sound of the sponsor is outputted to the output device provided in the gaming machine at this timing. Namely, the advertisement is carried out to the elated and satisfied player. Accordingly, it is highly possible that such advertisement gives the player a favorable impression and is striking to the player. As a result, it is highly possible to increase the player's willingness to purchase the sponsor's product. Consequently, a significant advertising effect can be obtained.

In addition, according to the method of collecting advertisement cost, a signal based on the satisfaction of the predetermined condition is transmitted from the gaming machine to the control device. Then, based on data included in the signal, the memory device provided in the control device stores cost-collecting data for collecting money in an amount corresponding to the predetermined profit from the sponsor. Examples of the cost-collecting data include deposit data indicating the amount of money deposited by the sponsor and total-number-of-times data indicating the total number of times the predetermined condition has been satisfied. Accordingly, the casino can collect money in an amount corresponding to the predetermined profit from the sponsor as advertisement cost, and therefore, it is possible to reduce the financial burden on the casino, which is involved in offering of the predetermined profit to the player.

The method of collecting advertisement cost of the present invention desirably has the following configuration.

Namely, the step (B) includes the control device subtracting the amount of money corresponding to the predetermined profit from an amount of money deposited by the sponsor, which is indicated by deposit data stored in the memory device, based on the signal received in the step (A).

According to the method of collecting advertisement cost, the cost-collecting data is the deposit data indicating the amount of money deposited by the sponsor. Based on the satisfaction of the predetermined condition, the amount of money corresponding to the predetermined profit is subtracted from the amount of money deposited by the sponsor. Accordingly, the casino can collect money in an amount corresponding to the predetermined profit from the sponsor as advertisement cost, and therefore, it is possible to reduce the financial burden on the casino, which is involved in offering of the predetermined profit to the player.

According to the method of collecting advertisement cost, it is possible to surely collect the advertisement cost from the sponsor by adopting the configuration that the advertisement image or the advertisement sound is outputted on condition that the amount of money deposited by the sponsor is equal to or more than a predetermined amount.

The method of collecting advertisement cost of the present invention desirably further has the following configuration.

Namely, the step (B) includes the control device storing data indicating a total number of times the predetermined condition has been satisfied or a total amount of money corresponding to the predetermined profit offered in the step (a), in the memory device based on the signal received in the step (A), as cost-collecting data for collecting money in an amount corresponding to the predetermined profit from the sponsor.

According to the method of collecting advertisement cost, the cost-collecting data is data (total-number-of-times data) indicating the total number of times the predetermined condition has been satisfied, or data (total-amount data) indicating the total amount of money corresponding to the predetermined profit offered in the gaming machine. The casino can collect money in an amount corresponding to the predetermined profit from the sponsor as the advertisement cost, for example, by issuing a bill to the sponsor based on the total-number-of-times data or the total-amount data. Accordingly, it is possible to reduce the financial burden on the casino, which is involved in offering of the predetermined profit to the player.

According to the gaming system, the casino bills the sponsor every time the number indicated by the total-number-of-times data reaches the predetermined number of times, or every time the total amount indicated by the total-amount data reaches the predetermined amount. Such a configuration allows the sponsor to pay a constant amount of money to the casino for each bill. Consequently, it is possible to configure an advertisement-cost collecting system that is easy to understand both for the issuer and the recipient of the bill.

The method of collecting advertisement cost of the present invention desirably has the following configuration.

Namely, the method of collecting advertisement cost further comprises the step of (d) the gaming machine receiving from an input device a signal corresponding to one sponsor selected out of a plurality of sponsors through the input device, when the predetermined condition is satisfied, wherein the step (b) includes the gaming machine outputting an advertisement image or an advertisement sound of the sponsor corresponding to the signal received in the step (d), to the output device, the step (c) includes the gaming machine transmitting a signal including information indicating the sponsor corresponding to the signal received in the step (d) to the control device at a predetermined timing, and the step (B) includes the control device storing cost-collecting data for collecting money in an amount corresponding to the predetermined profit from the sponsor indicated by information included in the signal received in the step (A) in the memory device in association with the sponsor, the cost-collecting data being based on data included in the signal.

According to the method of collecting advertisement cost, the advertisement image or the advertisement sound of one sponsor selected through the input device out of a plurality of sponsors is outputted. Accordingly, it is possible to advertise a plurality of sponsors in one gaming machine.

The cost-collecting data is stored in association with the sponsor selected through the input device, namely the sponsor whose product has been advertised. Accordingly, it is possible to collect the advertisement cost from each sponsor.

Further, the advertisement image or the advertisement sound, which has been outputted, is provided by the sponsor selected by the player through the input device, namely by the sponsor that the player may be interested in. Accordingly, it is possible to obtain a further significant advertising effect.

The method of collecting advertisement cost of the present invention desirably has the following configuration.

Namely, the step (B) includes storing data indicating the number of times the sponsor indicated by information included in the signal received in the step (A) has been selected through the input device in the memory device in association with the sponsor, as the cost-collecting data for collecting money in an amount corresponding to the predetermined profit from the sponsor.

According to the method of collecting advertisement cost, data indicating the number of times the sponsor has been selected through the input device is stored as the cost-collecting data with respect to each sponsor. The casino can collect the advertisement cost from each sponsor, for example, by issuing a bill to each sponsor based on the data.

In addition, the sponsor can see how much the player is interested in their company or in their products from the number of times indicated by the cost-collecting data.

The present invention further provides a gaming system having the following configuration.

Namely, the gaming system comprises: a gaming machine provided with an output device capable of outputting an image or a sound, and a controller; a control device provided with a memory device capable of storing data, and a processor; and a network enabling communication between the gaming machine and the control device; wherein the controller is programmed to execute the processing of: (a) offering a predetermined profit when a predetermined condition is satisfied; (b) outputting an advertisement image or an advertisement sound of a sponsor to the output device when the predetermined condition is satisfied; and (c) transmitting a signal based on the satisfaction of the predetermined condition to the processor at a predetermined timing, and the processor is programmed to execute the processing of (A) receiving a signal transmitted in the processing (c); and (B) storing cost-collecting data for collecting money in an amount corresponding to the predetermined profit from the sponsor in the memory device, the cost-collecting data being based on data included in the signal received in the processing (A).

According to the above gaming system, a predetermined profit is offered to a player when a predetermined condition is satisfied in the gaming machine. At this time, the player is generally elated and satisfied with obtaining of the predetermined profit. According to the gaming system, an advertisement image or an advertisement sound of the sponsor is outputted to the output device provided in the gaming machine at this timing. Namely, the advertisement is carried out to the elated and satisfied player. Accordingly, it is highly possible that such advertisement gives the player a favorable impression and is striking to the player. As a result, it is highly possible to increase the player's willingness to purchase the sponsor's product. Consequently, a significant advertising effect can be obtained.

In addition, according to the gaming system, a signal based on the satisfaction of the predetermined condition is transmitted from the gaming machine to the control device. Then, based on data included in the signal, the memory device provided in the control device stores cost-collecting data for collecting money in an amount corresponding to the predetermined profit from the sponsor. Examples of the cost-collecting data include deposit data indicating the amount of money deposited by the sponsor and total-number-of-times data indicating the total number of times the predetermined condition has been satisfied. Accordingly, the casino can collect money in an amount corresponding to the predetermined profit from the sponsor as advertisement cost, and therefore, it is possible to reduce the financial burden on the casino, which is involved in offering of the predetermined profit to the player.

The gaming system of the present invention desirably has the following configuration.

Namely, the processing (B) includes subtracting the amount of money corresponding to the predetermined profit from an amount of money deposited by the sponsor, which is indicated by deposit data stored in the memory device, based on the signal received in the processing (A).

According to the gaming system, the cost-collecting data is the deposit data indicating the amount of money deposited by the sponsor. Based on the satisfaction of the predetermined condition, the amount of money corresponding to the predetermined profit is subtracted from the amount of money deposited by the sponsor. Accordingly, the casino can collect money in an amount corresponding to the predetermined profit from the sponsor as advertisement cost, and therefore, it is possible to reduce the financial burden on the casino, which is involved in offering of the predetermined profit to the player.

According to the gaming system, it is possible to surely collect the advertisement cost from the sponsor by adopting the configuration that the advertisement image or the advertisement sound is outputted on condition that the amount of money deposited by the sponsor is equal to or more than a predetermined amount.

Further, the gaming system of the present invention desirably has the following configuration.

Namely, the processing (B) includes storing data indicating a total number of times the predetermined condition has been satisfied or a total amount of money corresponding to the predetermined profit offered in the processing (a), in the memory device based on the signal received in the processing (A), as cost-collecting data for collecting money in an amount corresponding to the predetermined profit from the sponsor.

According to the gaming system, the cost-collecting data is data (total-number-of-times data) indicating the total number of times the predetermined condition has been satisfied, or data (total-amount data) indicating the total amount of money corresponding to the predetermined profit offered in the gaming machine. The casino can collect money in an amount corresponding to the predetermined profit from the sponsor as the advertisement cost, for example, by issuing a bill to the sponsor based on the total-number-of-times data or the total-amount data. Accordingly, it is possible to reduce the financial burden on the casino, which is involved in offering of the predetermined profit to the player.

According to the gaming system, the casino bills the sponsor every time the number indicated by the total-number-of-times data reaches the predetermined number of times, or every time the total amount indicated by the total-amount data reaches the predetermined amount. Such a configuration allows the sponsor to pay a constant amount of money to the casino for each bill. Consequently, it is possible to configure an advertisement-cost collecting system that is easy to understand both for the issuer and the recipient of the bill.

Furthermore, the gaming system of the present invention desirably has the following configuration.

Namely, the gaming machine further comprises an input device capable of receiving an input of a command related to a game, the controller is further programmed to execute the processing of (d) receiving a signal corresponding to one sponsor selected out of a plurality of sponsors from the input device, when the predetermined condition is satisfied, the processing (b) includes outputting an advertisement image or an advertisement sound of the sponsor corresponding to the signal received in the processing (d), to the output device, the processing (c) includes transmitting a signal including information indicating the sponsor corresponding to the signal received in the processing (d) to the processor at a predetermined timing, and the processing (B) includes storing cost-collecting data for collecting money in an amount corresponding to the predetermined profit from the sponsor indicated by information included in the signal received in the processing (A) in the memory device in association with the sponsor, the cost-collecting data being based on the data included in the signal.

According to the gaming system, the advertisement image or the advertisement sound of one sponsor selected through the input device out of a plurality of sponsors is outputted. Accordingly, it is possible to advertise a plurality of sponsors in one gaming machine.

The cost-collecting data is stored in association with the sponsor selected through the input device, namely the sponsor whose product has been advertised. Accordingly, it is possible to collect the advertisement cost from each sponsor.

Further, the advertisement image or the advertisement sound, which has been outputted, is provided by the sponsor selected by the player through the input device, namely by the sponsor that the player may be interested in. Accordingly, it is possible to obtain a further significant advertising effect.

Moreover, the gaming system of the present invention desirably has the following configuration.

Namely, the processing (B) includes storing data indicating the number of times the sponsor indicated by information included in the signal received in the processing (A) has been selected through the input device, as cost-collecting data for collecting money in an amount corresponding to the predetermined profit from the sponsor, in the memory device in association with the sponsor.

According to the gaming system, data indicating the number of times the sponsor has been selected through the input device is stored as the cost-collecting data with respect to each sponsor. The casino can collect the advertisement cost from each sponsor, for example, by issuing a bill to each sponsor based on the data.

In addition, the sponsor can see how much the player is interested in their company or in their products from the number of times indicated by the cost-collecting data.

The present invention further provides a gaming machine having the following configuration.

Namely, the gaming machine comprises: an output device capable of outputting an image or a sound; and a controller. The controller is programmed to execute the processing of: (a) offering a predetermined profit when a predetermined condition is satisfied; (b) outputting an advertisement image or an advertisement sound of a sponsor to the output device when the predetermined condition is satisfied; and (c) storing data based on the satisfaction of the predetermined condition in an external memory device, as cost-collecting data for collecting money in an amount corresponding to the predetermined profit from the sponsor.

According to the above gaming machine, a predetermined profit is offered to a player when a predetermined condition is satisfied. At this time, the player is generally elated and satisfied with obtaining of the predetermined profit. According to the gaming machine, an advertisement image or an advertisement sound of the sponsor is outputted to the output device provided in the gaming machine at this timing. Namely, the advertisement is carried out to the elated and satisfied player. Accordingly, it is highly possible that such advertisement gives the player a favorable impression and is striking to the player. As a result, it is highly possible to increase the player's willingness to purchase the sponsor's product. Consequently, a significant advertising effect can be obtained.

In addition, according to the gaming machine, data based on the satisfaction of the predetermined condition is stored in the external control device (e.g. a memory device provided in the control device, a USB memory, and the like) as cost-collecting data for collecting money in an amount corresponding to the predetermined profit from the sponsor. Examples of the cost-collecting data include deposit data indicating the amount of money deposited by the sponsor and total-number-of-times data indicating the total number of times the predetermined condition has been satisfied. Accordingly, the casino can collect money in an amount corresponding to the predetermined profit from the sponsor as advertisement cost, and therefore, it is possible to reduce the financial burden on the casino, which is involved in offering of the predetermined profit to the player.

The gaming machine of the present invention desirably has the following configuration.

Namely, the gaming machine is capable of communicating with a control device. The processing (c) includes transmitting a trigger signal based on the satisfaction of the predetermined condition, to the control device at a predetermined timing. The trigger signal is a signal of triggering the control device to execute a processing of subtracting the amount of money corresponding to the predetermined profit from an amount of money deposited by the sponsor, which is indicated by deposit data stored in a memory device provided in the control device.

According to the gaming machine, the cost-collecting data is the deposit data indicating the amount of money deposited by the sponsor. Based on the satisfaction of the predetermined condition, the amount of money corresponding to the predetermined profit is subtracted from the amount of money deposited by the sponsor. Accordingly, the casino can collect money in an amount corresponding to the predetermined profit from the sponsor as advertisement cost, and therefore, it is possible to reduce the financial burden on the casino, which is involved in offering of the predetermined profit to the player.

According to the gaming machine, it is possible to surely collect the advertisement cost from the sponsor by adopting the configuration that the advertisement image or the advertisement sound is outputted on condition that the amount of money deposited by the sponsor is equal to or more than a predetermined amount.

The gaming machine of the present invention desirably has the following configuration.

Namely, the gaming machine is capable of communicating with a control device. The processing (c) includes transmitting a trigger signal based on the satisfaction of the predetermined condition, to the control device at a predetermined timing. The trigger signal is a signal of triggering the control device to execute a processing of storing data indicating a total number of times the predetermined condition has been satisfied or a total amount of money corresponding to the predetermined profit offered in the processing (a), in a memory device provided in the control device based on the signal, as cost-collecting data for collecting money in an amount corresponding the predetermined profit from the sponsor.

According to the gaming machine, the cost-collecting data is data (total-number-of-times data) indicating the total number of times the predetermined condition has been satisfied, or data (total-amount data) indicating the total amount of money corresponding to the predetermined profit offered in the gaming machine. The casino can collect money in an amount corresponding to the predetermined profit from the sponsor as the advertisement cost, for example, by issuing a bill to the sponsor based on the total-number-of-times data or the total-amount data. Accordingly, it is possible to reduce the financial burden on the casino, which is involved in offering of the predetermined profit to the player.

According to the gaming machine, the casino bills the sponsor every time the number indicated by the total-number-of-times data reaches the predetermined number of times, or every time the total amount indicated by the total-amount data reaches the predetermined amount. Such a configuration allows the sponsor to pay a constant amount of money to the casino for each bill. Consequently, it is possible to configure an advertisement-cost collecting system that is easy to understand both for the issuer and the recipient of the bill.

The gaming machine of the present invention desirably has the following configuration.

Namely, the gaming machine is provided with an input device capable of receiving an input of a command related to a game. The gaming machine is capable of communicating with a control device. The controller is further programmed to execute the processing of (d) receiving a signal corresponding to one sponsor selected out of a plurality of sponsors from the input device, when the predetermined condition is satisfied. The processing (b) includes outputting an advertisement image or an advertisement sound of the sponsor corresponding to the signal received in the processing (d), to the output device. The processing (c) includes transmitting a trigger signal including information indicating the sponsor corresponding to the signal received in the processing (d) to the control device at a predetermined timing. The trigger signal is a signal of triggering the control device to execute a processing of storing the cost-collecting data for collecting money in an amount corresponding to the predetermined profit from the sponsor indicated by information included in the signal, which is based on data included in the signal, in a memory device provided in the control device in association with the sponsor.

According to the gaming machine, the advertisement image or the advertisement sound of one sponsor selected through the input device out of a plurality of sponsors is outputted.

Accordingly, it is possible to advertise a plurality of sponsors in one gaming machine.

The cost-collecting data is stored in association with the sponsor selected through the input device, namely the sponsor whose product has been advertised. Accordingly, it is possible to collect the advertisement cost from each sponsor.

Further, the advertisement image or the advertisement sound, which has been outputted, is provided by the sponsor selected by the player through the input device, namely by the sponsor that the player may be interested in. Accordingly, it is possible to obtain a further significant advertising effect.

The gaming machine of the present invention desirably has the following configuration.

The processing (c) includes transmitting the trigger signal including information indicating the sponsor corresponding to the signal received in the processing (d), to the control device when the predetermined condition is satisfied, and the trigger signal is a signal of triggering the control device to execute a processing of storing data indicating a number of times the signal has been received, as the cost-collecting data for collecting money in an amount corresponding to the predetermined profit from the sponsor indicated by information included in the signal, in a memory device provided in the control device in association with the sponsor.

According to the gaming machine, data indicating the number of times the sponsor has been selected through the input device is stored as the cost-collecting data with respect to each sponsor. The casino can collect the advertisement cost from each sponsor, for example, by issuing a bill to each sponsor based on the data.

In addition, the sponsor can see how much the player is interested in their company or in their products from the number of times indicated by the cost-collecting data.

The present invention further provides a control method of a gaming machine having the following configuration.

Namely, the gaming machine comprises: an output device capable of outputting an image or a sound; and a controller. The control method comprises the steps of: (a) the controller offering a predetermined profit when a predetermined condition is satisfied; (b) the controller outputting an advertisement image or an advertisement sound of a sponsor to the output device when the predetermined condition is satisfied; and (c) the controller storing data based on the satisfaction of the predetermined condition in an external memory device, as cost-collecting data for collecting money in an amount corresponding to the predetermined profit from the sponsor.

According to the above control method of a gaming machine, a predetermined profit is offered to a player when a predetermined condition is satisfied. At this time, the player is generally elated and satisfied with obtaining of the predetermined profit. According to the control method of a gaming machine, an advertisement image or an advertisement sound of the sponsor is outputted to the output device provided in the gaming machine at this timing. Namely, the advertisement is carried out to the elated and satisfied player. Accordingly, it is highly possible that such advertisement gives the player a favorable impression and is striking to the player. As a result, it is highly possible to increase the player's willingness to purchase the sponsor's product. Consequently, a significant advertising effect can be obtained.

In addition, according to the control method of a gaming machine, data based on the satisfaction of the predetermined condition is stored in the external control device (e.g. a memory device provided in the control device, a USB memory, and the like) as cost-collecting data for collecting money in an amount corresponding to the predetermined profit from the sponsor. Examples of the cost-collecting data include deposit data indicating the amount of money deposited by the sponsor and total-number-of-times data indicating the total number of times the predetermined condition has been satisfied. Accordingly, the casino can collect money in an amount corresponding to the predetermined profit from the sponsor as advertisement cost, and therefore, it is possible to reduce the financial burden on the casino, which is involved in offering of the predetermined profit to the player.

The present invention further provides a control device having the following configuration.

Namely, the control device comprises: a memory device capable of storing data; and a processor. The control device is capable of communicating with a gaming machine. The gaming machine outputs an advertisement image or an advertisement sound of a sponsor, in addition to offering a predetermined profit, when a predetermined condition is satisfied, and transmits a trigger signal based on the satisfaction of the predetermined condition to the processor at a predetermined timing. The processor is programmed to execute the processing of: (A) receiving the trigger signal from the gaming machine; and (B) storing cost-collecting data for collecting money in an amount corresponding to the predetermined profit from the sponsor in the memory device, the cost-collecting data being based on data included in the trigger signal received in the processing (A).

According to the gaming machine capable of communicating with the above control device, a predetermined profit is offered to a player when a predetermined condition is satisfied. At this time, the player is generally elated and satisfied with obtaining of the predetermined profit. According to the gaming machine, an advertisement image or an advertisement sound of the sponsor is outputted to the output device provided in the gaming machine at this timing. Namely, the advertisement is carried out to the elated and satisfied player. Accordingly, it is highly possible that such advertisement gives the player a favorable impression and is striking to the player. As a result, it is highly possible to increase the player's willingness to purchase the sponsor's product. Consequently, a significant advertising effect can be obtained.

In addition, according to the control device, cost-collecting data for collecting money in an amount corresponding to the predetermined profit from the sponsor is stored in the memory device. The cost-collecting data is based on data included in the trigger signal. The trigger signal is based on the satisfaction of the predetermined condition and transmitted from the gaming machine. Examples of the cost-collecting data include deposit data indicating the amount of money deposited by the sponsor and total-number-of-times data indicating the total number of times the predetermined condition has been satisfied. Accordingly, the casino can collect money in an amount corresponding to the predetermined profit from the sponsor as advertisement cost, and therefore, it is possible to reduce the financial burden on the casino, which is involved in offering of the predetermined profit to the player.

The control device of the present invention desirably has the following configuration.

Namely, the processing (B) includes subtracting the amount of money corresponding to the predetermined profit from an amount of money deposited by the sponsor, which is indicated by deposit data stored in the memory device, based on the trigger signal received in the processing (A).

According to the control device, the cost-collecting data is deposit data indicating the amount of money deposited by the sponsor. Based on the satisfaction of the predetermined condition, the amount of money corresponding to the predetermined profit is subtracted from the amount of money deposited by the sponsor. Accordingly, the casino can collect money in an amount corresponding to the predetermined profit from the sponsor as the advertisement cost, and therefore, it is possible to reduce the financial burden on the casino, which is involved in offering of the predetermined profit to the player.

According to the control device, it is possible to surely collect the advertisement cost from the sponsor by adopting the configuration that the advertisement image or the advertisement sound is outputted on condition that the amount of money deposited by the sponsor is equal to or more than the predetermined amount.

The control device of the present invention desirably has the following configuration.

Namely, the processing (B) includes storing data indicating a total number of times the predetermined condition has been satisfied or a total amount of money corresponding to the predetermined profit offered in the gaming machine, in the memory device based on the trigger signal received in the processing (A), as the cost-collecting data for collecting money in an amount corresponding to the predetermined profit from the sponsor.

According to the control device, the cost-collecting data is data (total-number-of-times data) indicating the total number of times the predetermined condition has been satisfied, or data (total-amount data) indicating the total amount of money corresponding to the predetermined profit offered in the gaming machine. The casino can collect money in an amount corresponding to the predetermined profit from the sponsor as the advertisement cost, for example, by issuing a bill to the sponsor based on the total-number-of-times data or the total-amount data. Accordingly, it is possible to reduce the financial burden on the casino, which is involved in offering of the predetermined profit to the player.

According to the control device, the casino bills the sponsor every time the number indicated by the total-number-of-times data reaches the predetermined number of times, or every time the total amount indicated by the total-amount data reaches the predetermined amount. Such a configuration allows the sponsor to pay a constant amount of money to the casino for each bill. Consequently, it is possible to configure an advertisement-cost collecting system that is easy to understand both for the issuer and the recipient of the bill.

The present invention provides a gaming machine having the following configuration.

Namely, the gaming machine comprises: an output device capable of outputting an image or a sound; a slot for an external memory device storing advertisement data indicating an advertisement image or an advertisement sound of a sponsor; and a controller. The controller is programmed to execute the processing of: (a) offering a predetermined profit when a predetermined condition is satisfied; (b) outputting an advertisement image or an advertisement sound of a sponsor to the output device based on the advertisement data stored in the external control device inserted into the slot, when the predetermined condition is satisfied; and (c) storing data based on the satisfaction of the predetermined condition in the external memory device or an other external memory device different from the external memory device, as cost-collecting data for collecting money in an amount corresponding to the predetermined profit from the sponsor.

According to the gaming machine, a predetermined profit is offered when a predetermined condition is satisfied. At this time, the player is generally elated and satisfied with obtaining of the predetermined profit. According to the gaming machine, an advertisement image or an advertisement sound of the sponsor is outputted to the output device provided in the gaming machine at this timing. Namely, the advertisement is carried out to the elated and satisfied player. Accordingly, it is highly possible that such advertisement gives the player a favorable impression and is striking to the player. As a result, it is highly possible to increase the player's willingness to purchase the sponsor's product. Consequently, a significant advertising effect can be obtained.

In addition, according to the gaming machine, data based on the satisfaction of the predetermined condition is stored in a predetermined external memory device as cost-collecting data for collecting money in an amount corresponding to the predetermined profit from the sponsor. Examples of the cost-collecting data include deposit data indicating the amount of money deposited by the sponsor and total-number-of-times data indicating the total number of times the predetermined condition has been satisfied. Accordingly, the casino can collect money in an amount corresponding to the predetermined profit from the sponsor as an advertisement cost, and therefore, it is possible to reduce the financial burden on the casino, which is involved in offering of the predetermined profit to the player.

According to the gaming machine, advertisement data indicating an advertisement image or an advertisement sound of a sponsor is stored in an external memory device (e.g. a USB memory, a memory card and the like) and is read out from the external memory device when a predetermined condition is satisfied, so that the advertisement image or the advertisement sound of the sponsor is outputted. Accordingly, the sponsor can change the advertisement image or the advertisement sound by changing the contents of the advertisement data stored in the external memory device. As a result, the sponsor can put the advertisement according to their business plan at the time.

The present invention further provides a gaming system having the following configuration.

Namely, the gaming system comprises: a gaming machine provided with an output device capable of outputting an image or a sound, and a controller; a control device provided with a management-side memory device capable of storing advertisement data indicating an advertisement image or an advertisement sound of a sponsor, and a processor; and a network enabling communication between the gaming machine and the control device. The processor is programmed to execute the processing of (A) transmitting advertisement data stored in the management-side memory device to the controller at a predetermined timing. The controller is programmed to execute the processing of: (a) receiving the advertisement data transmitted in the processing (A); (b) offering a predetermined profit when a predetermined condition is satisfied; (c) outputting an advertisement image or an advertisement sound of a sponsor to the output device based on the advertisement data received in the processing (a), when the predetermined condition is satisfied; and (d) transmitting a signal based on the satisfaction of the predetermined condition to the processor at a predetermined timing. The processor is further programmed to execute the processing of (B) receiving the signal transmitted in the processing (d); and (C) storing cost-collecting data for collecting money in an amount corresponding to the predetermined profit from the sponsor in the management-side memory device, the cost-collecting data being based on data included in the signal received in the processing (B).

According to the gaming system, a predetermined profit is offered when a predetermined condition is satisfied in a gaming machine. At this time, the player is generally elated and satisfied with obtaining of the predetermined profit. According to the gaming system, an advertisement image or an advertisement sound of a sponsor is outputted to the output device provided in the gaming machine at this timing. Namely, the advertisement is carried out to the elated and satisfied player. Accordingly, it is highly possible that such advertisement gives the player a favorable impression and is striking to the player. As a result, it is highly possible to increase the player's willingness to purchase the sponsor's product. Consequently, a significant advertising effect can be obtained.

In addition, according to the gaming system, a signal based on the satisfaction of the predetermined condition is transmitted from the gaming machine to the control device. Then, based on data included in the signal, the memory device provided in the management-side control device stores cost-collecting data for collecting money in an amount corresponding to the predetermined profit from the sponsor. Examples of the cost-collecting data include deposit data indicating the amount of money deposited by the sponsor and total-number-of-times data indicating the total number of times the predetermined condition has been satisfied. Accordingly, the casino can collect money in an amount corresponding to the predetermined profit from the sponsor as an advertisement cost, and therefore, it is possible to reduce the financial burden on the casino, which is involved in offering of the predetermined profit to the player.

According to the gaming system, advertisement data indicating an advertisement image or an advertisement sound of a sponsor is stored in the management-side memory device provided in the control device. The advertisement data is transmitted from the control device to the gaming machine at a predetermined timing.

Accordingly, the advertisement data is not stored in the gaming machine as the permanent data, but stored in the management-side memory device. Accordingly, the advertisement image or the advertisement sound can be changed by changing the contents of the advertisement data stored in the management-side memory device. As a result, the sponsor can put the advertisement according to their business plan at the time.

The gaming system of the present invention desirably has the following configuration.

Namely, the processor is further programmed to execute the processing of (D) updating the advertisement data stored in the management-side memory device according to access from a sponsor-side terminal.

According to the gaming system, the advertisement data is updated according to an access from the sponsor-side terminal. Accordingly, the sponsor can change the advertisement image or the advertisement sound by making an access to the control device at their own timing. As a result, the advertisement in the gaming machine is further matched to the sponsor's business plan at the time.

The gaming system of the present invention desirably has the following configuration.

Namely, the control device is capable of communicating with a sponsor server provided with a sponsor-side memory device capable of storing the advertisement data, and the processor is further programmed to execute the processing of (E) storing the advertisement data stored in the sponsor-side memory device in the management-side memory device as new advertisement data, when the advertisement data stored in the management-side memory device is different from the advertisement data stored in the sponsor-side memory device.

According to the gaming system, when the advertisement data stored in the management-side memory device provided in the control device is different from the advertisement data stored in the sponsor-side memory device provided in the sponsor server, the advertisement data stored in the sponsor-side memory device is stored in the management-side memory device as the new advertisement data. Accordingly, simple updating of the advertisement data stored in the sponsor-side memory device can change the contents of the advertisement conducted in the gaming machine, which is very convenient for the sponsor. Further, the casino can make good use of such convenience to find many sponsors.

The gaming system of the present invention desirably has the following configuration.

Namely, the processing (d) includes transmitting a signal based on the satisfaction of the predetermined condition to the processor when the predetermined condition is satisfied, and the processing (A) includes transmitting the advertisement data stored in the management-side memory device to the controller when the signal is received in the processing (B).

According to the gaming system, advertisement data is transmitted to the gaming machine when a predetermined condition is satisfied. The gaming machine then outputs an advertisement image or an advertisement sound based on the received advertisement data.

Accordingly, the advertisement data is transmitted to the gaming machine every time a predetermined condition is satisfied, so that the newest advertisement can be always carried out. Since the advertisement data is not required to be stored in the gaming machine before the predetermined condition is satisfied, it is possible to reduce a load on the gaming machine for storing data.

The present invention further provides a gaming machine having the following configuration.

Namely, the gaming machine comprises: an output device capable of outputting an image or a sound; and a controller. The gaming machine is capable of communicating with a control device provided with a management-side memory device capable of storing advertisement data indicating an advertisement image or an advertisement sound of a sponsor. The controller is programmed to execute the processing of: (a) receiving advertisement data stored in the management-side memory device from the control device at a predetermined timing; (b) offering a predetermined profit when a predetermined condition is satisfied; (c) outputting an advertisement image or an advertisement sound of a sponsor based on the advertisement data received in the processing (a) when the predetermined condition is satisfied; and (d) transmitting a trigger signal based on the satisfaction of the predetermined condition to the control device at a predetermined timing. The trigger signal triggers the control device to execute a processing of storing cost-collecting data for collecting money in an amount corresponding to the predetermined profit from the sponsor in the management-side memory device, the cost-collecting data being based on data included in the signal.

According to the gaming machine, a predetermined profit is offered when a predetermined condition is satisfied. At this time, the player is generally elated and satisfied with obtaining of the predetermined profit. According to the gaming machine, an advertisement image or an advertisement sound of a sponsor is outputted to the output device provided at this timing. Namely, the advertisement is carried out to the elated and satisfied player. Accordingly, it is highly possible that such advertisement gives the player a favorable impression and is striking to the player. As a result, it is highly possible to increase the player's willingness to purchase the sponsor's product. Consequently, a significant advertising effect can be obtained.

In addition, according to the gaming machine, a signal based on the satisfaction of the predetermined condition is transmitted to the control device. Then, based on data included in the signal, the memory device provided in the control device stores cost-collecting data for collecting money in an amount corresponding to the predetermined profit from the sponsor. Examples of the cost-collecting data include deposit data indicating the amount of money deposited by the sponsor and total-number-of-times data indicating the total number of times the predetermined condition has been satisfied. Accordingly, the casino can collect money in an amount corresponding to the predetermined profit from the sponsor as advertisement cost, and therefore, it is possible to reduce the financial burden on the casino, which is involved in offering of the predetermined profit to the player.

According to the gaming machine, advertisement data indicating an advertisement image or an advertisement sound of a sponsor is stored in the management-side memory device provided in the control device. The advertisement data is transmitted from the control device to the gaming machine at a predetermined timing.

Accordingly, the advertisement data is not stored in the gaming machine as the permanent data, but stored in the management-side memory device. Accordingly, the advertisement image or the advertisement sound can be changed by changing the contents of the advertisement data stored in the management-side memory device. As a result, the sponsor can put the advertisement according to their business plan at the time.

Further, the gaming machine of the present invention desirably has the following configuration.

Namely, the processing (a) includes receiving the advertisement data stored in the management-side memory device when the predetermined condition is satisfied.

According to the gaming machine, advertisement data is received when a predetermined condition is satisfied. An advertisement image or an advertisement sound is outputted based on the received advertisement data.

Accordingly, the gaming machine receives the advertisement data every time a predetermined condition is satisfied, so that the newest advertisement can be always carried out. Since the advertisement data is not required to be stored in the gaming machine before the predetermined condition is satisfied, it is possible to reduce a load on the gaming machine for storing data.

The present invention further provides a control device having the following configuration.

Namely, the control device comprises: a management-side memory device capable of storing advertisement data indicating an advertisement image or an advertisement sound of a sponsor; and a processor. The control device is capable of communicating with a gaming machine. The gaming machine outputs an advertisement image or an advertisement sound of a sponsor based on the advertisement data, in addition to offering a predetermined profit, when a predetermined condition is satisfied, and transmits a trigger signal based on the satisfaction of the predetermined condition to the processor at a predetermined timing. The processor is programmed to execute the processing of: (A) transmitting advertisement data stored in the management-side memory device to the controller at a predetermined timing; (B) receiving the trigger signal from the gaming machine; and (C) storing cost-collecting data for collecting money in an amount corresponding to the predetermined profit from the sponsor in the management-side memory device, the cost-collecting data being based on data included in the trigger signal received in the processing (B).

According to the gaming machine capable of communicating with the control device, a predetermined profit is offered when a predetermined condition is satisfied. At this time, the player is generally elated and satisfied with obtaining of the predetermined profit. According to the gaming machine, an advertisement image or an advertisement sound of a sponsor is outputted to the output device provided in the gaming machine at this timing. Namely, the advertisement is carried out to the elated and satisfied player. Accordingly, it is highly possible that such advertisement gives the player a favorable impression and is striking to the player. As a result, it is highly possible to increase the player's willingness to purchase the sponsor's product. Consequently, a significant advertising effect can be obtained.

In addition, according to the control device, a signal based on the satisfaction of the predetermined condition is transmitted from the gaming machine. Then, based on data included in the signal, the memory device provided in the management-side control device stores cost-collecting data for collecting money in an amount corresponding to the predetermined profit from the sponsor. Examples of the cost-collecting data include deposit data indicating the amount of money deposited by the sponsor and total-number-of-times data indicating the total number of times the predetermined condition has been satisfied. Accordingly, the casino can collect money in an amount corresponding to the predetermined profit from the sponsor as an advertisement cost, and therefore, it is possible to reduce the financial burden on the casino, which is involved in offering of the predetermined profit to the player.

According to the control device, advertisement data indicating an advertisement image or an advertisement sound of a sponsor is stored in the management-side memory device provided in the control device. The advertisement data is transmitted to the gaming machine at a predetermined timing.

Accordingly, the advertisement data is not stored in the gaming machine as the permanent data, but stored in the management-side memory device. Accordingly, the advertisement image or the advertisement sound can be changed by changing the contents of the advertisement data stored in the management-side memory device. As a result, the sponsor can put the advertisement according to their business plan at the time.

The control device of the present invention desirably has the following configuration.

Namely, the processor is further programmed to execute the processing of (D) updating the advertisement data stored in the management-side memory device according to an access from a sponsor-side terminal.

According to the control device, the advertisement data is updated according to an access from the sponsor-side terminal. Accordingly, the sponsor can change the advertisement image or the advertisement sound by making an access to the control device at their own timing. As a result, the advertisement in the gaming machine is further matched to the sponsor's business plan at the time.

The control device of the present invention desirably has the following configuration.

Namely, the control device is capable of communicating with a sponsor server provided with a sponsor-side memory device capable of storing the advertisement data. The processor is further programmed to execute the processing of (E) storing advertisement data stored in the sponsor-side memory device in the management-side memory device as new advertisement data, when the advertisement data stored in the management-side memory device is different from the advertisement data stored in the sponsor-side memory device.

According to the control device, when the advertisement data stored in the management-side memory device provided in the control device is different from the advertisement data stored in the sponsor-side memory device provided in the sponsor server, the advertisement data stored in the sponsor-side memory device is stored in the management-side memory device as the new advertisement data. Accordingly, simple updating of the advertisement data stored in the sponsor-side memory device can change the contents of the advertisement conducted in the gaming machine, which is very convenient for the sponsor. Further, the casino can make good use of such convenience to find many sponsors.

The control device of the present invention desirably has the following configuration.

Namely, the processing (B) includes receiving the trigger signal from the gaming machine when the predetermined condition is satisfied, and the processing (A) includes transmitting the advertisement data stored in the management-side memory device to the controller when receiving the signal in the processing.

According to the control device, advertisement data is transmitted to the gaming machine when a predetermined condition is satisfied. The gaming machine then outputs an advertisement image or an advertisement sound based on the received advertisement data.

Accordingly, the advertisement data is transmitted to the gaming machine every time a predetermined condition is satisfied, so that the newest advertisement can be always carried out. Since the advertisement data is not required to be stored in the gaming machine before the predetermined condition is satisfied, it is possible to reduce a load on the gaming machine for storing data.

The present invention further provides a control method of a gaming machine having the following configuration.

Namely, the gaming machine comprises: an output device capable of outputting an image or a sound; a slot for an external memory device storing advertisement data indicating an advertisement image or an advertisement sound of a sponsor; and a controller. The control method comprises the steps of: (a) the controller offering a predetermined profit when a predetermined condition is satisfied; (b) the controller outputting an advertisement image or an advertisement sound of a sponsor to the output device based on the advertisement data stored in the external control device inserted into the slot, when the predetermined condition is satisfied; and (c) storing data based on the satisfaction of the predetermined condition in the external memory device or another external memory device different from the external memory device, as cost-collecting data for collecting money in an amount corresponding to the predetermined profit from the sponsor.

According to the control method of a gaming machine, a predetermined profit is offered when a predetermined condition is satisfied. At this time, the player is generally elated and satisfied with obtaining of the predetermined profit. According to the gaming machine, an advertisement image or an advertisement sound of the sponsor is outputted to the output device provided in the gaming machine at this timing. Namely, the advertisement is carried out to the elated and satisfied player. Accordingly, it is highly possible that such advertisement gives the player a favorable impression and is striking to the player. As a result, it is highly possible to increase the player's willingness to purchase the sponsor's product. Consequently, a significant advertising effect can be obtained.

In addition, according to the control method of a gaming machine, data based on the satisfaction of the predetermined condition is stored in a predetermined external memory device as cost-collecting data for collecting money in an amount corresponding to the predetermined profit from the sponsor. Examples of the cost-collecting data include deposit data indicating the amount of money deposited by the sponsor and total-number-of-times data indicating the total number of times the predetermined condition has been satisfied. Accordingly, the casino can collect money in an amount corresponding to the predetermined profit from the sponsor as advertisement cost, and therefore, it is possible to reduce the financial burden on the casino, which is involved in offering of the predetermined profit to the player.

According to the control method of a gaming machine, advertisement data indicating an advertisement image or an advertisement sound of a sponsor is stored in an external memory device (e.g. a USB memory, a memory card and the like) and is read out from the external memory device when a predetermined condition is satisfied, so that the advertisement image or the advertisement sound of the sponsor is outputted. Accordingly, the sponsor can change the advertisement image or the advertisement sound by changing the contents of the advertisement data stored in the external memory device. As a result, the sponsor can put the advertisement according to their business plan at the time.

The present invention further provides a gaming system having the following configuration.

Namely, the gaming system comprises: a gaming machine provided with an output device capable of outputting an image or a sound, and a controller; a control device provided with a management-side memory device capable of storing advertisement data indicating an advertisement image or an advertisement sound of a sponsor, and a processor; and a network enabling communication between the gaming machine and the control device. The control method comprises the steps of: (A) the processor transmitting the advertisement data stored in the management-side memory device to the controller at a predetermined timing; (a) the controller receiving the advertisement data transmitted in the processing (A); (b) the controller offering a predetermined profit when a predetermined condition is satisfied; (c) the controller outputting an advertisement image or an advertisement sound of a sponsor to the output device based on the advertisement data received in the step (a), when the predetermined condition is satisfied; (d) the controller transmitting a signal based on the satisfaction of the predetermined condition to the processor at a predetermined timing; (B) the processor receiving the signal transmitted in the step (d); and (C) the processor storing cost-collecting data for collecting money in an amount corresponding to the predetermined profit from the sponsor in the management-side memory device, the cost-collecting data being based on the signal received in the step (B).

According to the control method of a gaming system, a predetermined profit is offered when a predetermined condition is satisfied in a gaming machine. At this time, the player is generally elated and satisfied with obtaining of the predetermined profit. According to the gaming system, an advertisement image or an advertisement sound of a sponsor is outputted to the output device provided in the gaming machine at this timing. Namely, the advertisement is carried out to the elated and satisfied player. Accordingly, it is highly possible that such advertisement gives the player a favorable impression and is striking to the player. As a result, it is highly possible to increase the player's willingness to purchase the sponsor's product. Consequently, a significant advertising effect can be obtained.

In addition, according to the control method of a gaming system, a signal based on the satisfaction of the predetermined condition is transmitted from the gaming machine to the control device. Then, based on data included in the signal, the management-side memory device provided in the control device stores cost-collecting data for collecting money in an amount corresponding to the predetermined profit from the sponsor. Examples of the cost-collecting data include deposit data indicating the amount of money deposited by the sponsor and total-number-of-times data indicating the total number of times the predetermined condition has been satisfied. Accordingly, the casino can collect money in an amount corresponding to the predetermined profit from the sponsor as advertisement cost, and therefore, it is possible to reduce the financial burden on the casino, which is involved in offering of the predetermined profit to the player.

According to the control method of a gaming system, advertisement data indicating an advertisement image or an advertisement sound of a sponsor is stored in the management-side memory device provided in the control device. The advertisement data is transmitted from the control device to the gaming machine at a predetermined timing.

Accordingly, the advertisement data is not stored in the gaming machine as the permanent data, but stored in the management-side memory device. Accordingly, the advertisement image or the advertisement sound can be changed by changing the contents of the advertisement data stored in the management-side memory device. As a result, the sponsor can put the advertisement according to their business plan at the time.

The present invention further provides a control method of a gaming machine having the following configuration.

Namely, the gaming machine comprises: an output device capable of outputting an image or a sound; and a controller. The gaming machine is capable of communicating with a control device provided with a management-side memory device capable of storing advertisement data indicating an advertisement image or an advertisement sound of a sponsor. The control method comprises the steps of: (a) the controller receiving advertisement data stored in the management-side memory device from the control device at a predetermined timing; (b) the controller offering a predetermined profit when a predetermined condition is satisfied; (c) the controller outputting an advertisement image or an advertisement sound of a sponsor to the output device based on the advertisement data received in the step (a), when the predetermined condition is satisfied; and (d) the controller transmitting a trigger signal based on the satisfaction of the predetermined condition to the processor at a predetermined timing. The trigger signal is a signal for triggering the control device to execute a processing of storing cost-collecting data for collecting money in an amount corresponding to the predetermined profit from the sponsor in the management-side memory device, the cost-collecting data being based on data included in the signal.

According to the control method of a gaming machine, a predetermined profit is offered when a predetermined condition is satisfied. At this time, the player is generally elated and satisfied with obtaining of the predetermined profit. According to the gaming machine, an advertisement image or an advertisement sound of a sponsor is outputted to the output device at this timing. Namely, the advertisement is carried out to the elated and satisfied player. Accordingly, it is highly possible that such advertisement gives the player a favorable impression and is striking to the player. As a result, it is highly possible to increase the player's willingness to purchase the sponsor's product. Consequently, a significant advertising effect can be obtained.

In addition, according to the control method of a gaming machine, a signal based on the satisfaction of the predetermined condition is transmitted from the gaming machine to the control device. Then, based on data included in the signal, the management-side memory device provided in the control device stores cost-collecting data for collecting money in an amount corresponding to the predetermined profit from the sponsor. Examples of the cost-collecting data include deposit data indicating the amount of money deposited by the sponsor and total-number-of-times data indicating the total number of times the predetermined condition has been satisfied. Accordingly, the casino can collect money in an amount corresponding to the predetermined profit from the sponsor as advertisement cost, and therefore, it is possible to reduce the financial burden on the casino, which is involved in offering of the predetermined profit to the player.

According to the control method of a gaming machine, advertisement data indicating an advertisement image or an advertisement sound of a sponsor is stored in the management-side memory device provided in the control device. The advertisement data is transmitted from the control device to the gaming machine at a predetermined timing.

Accordingly, the advertisement data is not stored in the gaming machine as the permanent data, but stored in the management-side memory device. Accordingly, the advertisement image or the advertisement sound can be changed by changing the contents of the advertisement data stored in the management-side memory device. As a result, the sponsor can put the advertisement according to their business plan at the time.

BRIEF DESCRIPTIONS OF THE DRAWINGS

FIG. 5 is a view illustrating arrangements of symbols drawn on peripheral faces of reels of the gaming machine according to the embodiment of the present invention.

FIG. 8 is a view illustrating a combination-of-symbols table.

FIG. 33 is a view illustrating a flowchart of advertisement image display processing conducted in the gaming machine according to the embodiment of the present invention.

FIG. 34 is a view illustrating a flowchart of advertisement-cost collection processing conducted in the external control device according to the embodiment of the present invention.

DESCRIPTION OF THE EMBODIMENT

Hereinafter, an embodiment of the present invention is described with reference to the drawings.

A gaming system 300 according to an embodiment of the present invention comprises a gaming machine 1 and an external control device 200, wherein the gaming machine 1 is programmed to execute the processing of: (a) offering a predetermined profit when a predetermined condition is satisfied; (b) displaying an advertisement image of a sponsor to a lower image display panel 141 when the predetermined condition is satisfied; (c) transmitting a signal based on the satisfaction of the predetermined condition to the external control device 200 at a predetermined timing, and the external control device 200 is programmed to execute the processing of: (A) receiving a signal transmitted from the gaming machine 1 and (B) storing cost-collecting data, which is for collecting money in an amount corresponding to the predetermined profit from the sponsor and is based on data included in the received signal.

First Embodiment

Figure 1A:
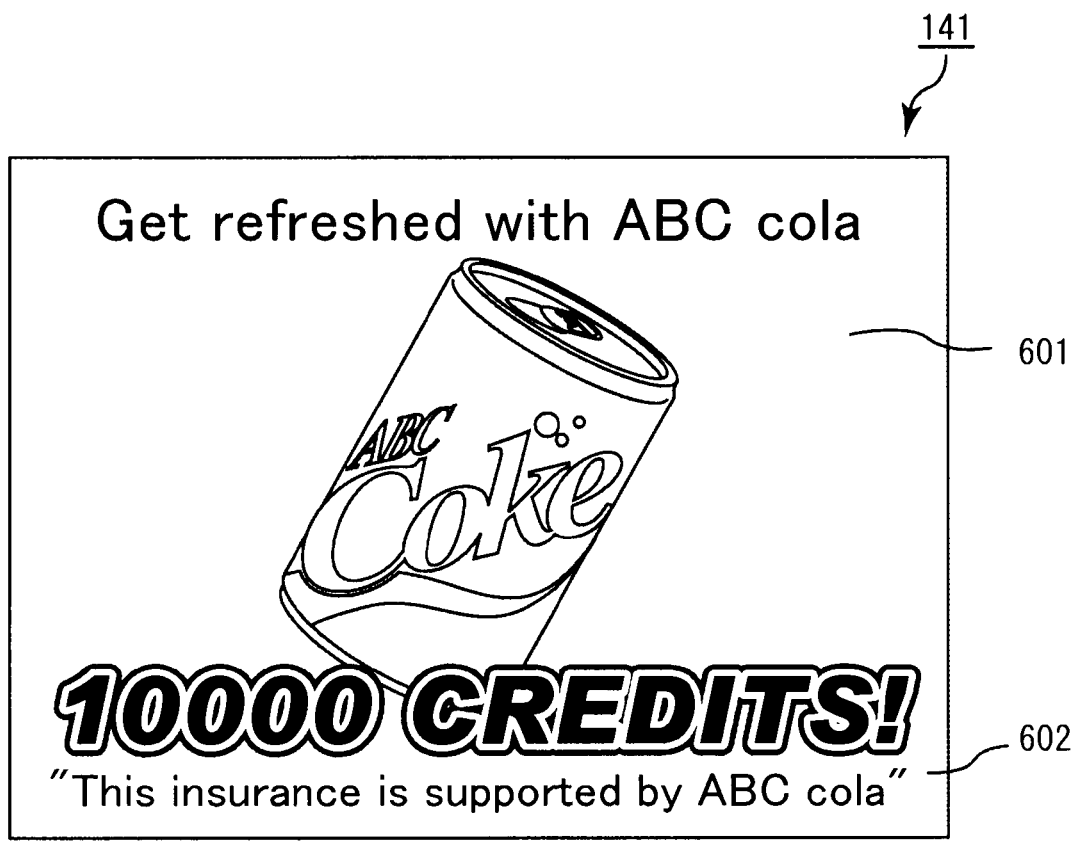
FIG. 1A is a view illustrating an advertisement image according to one embodiment of the present invention.
Figure 1B:
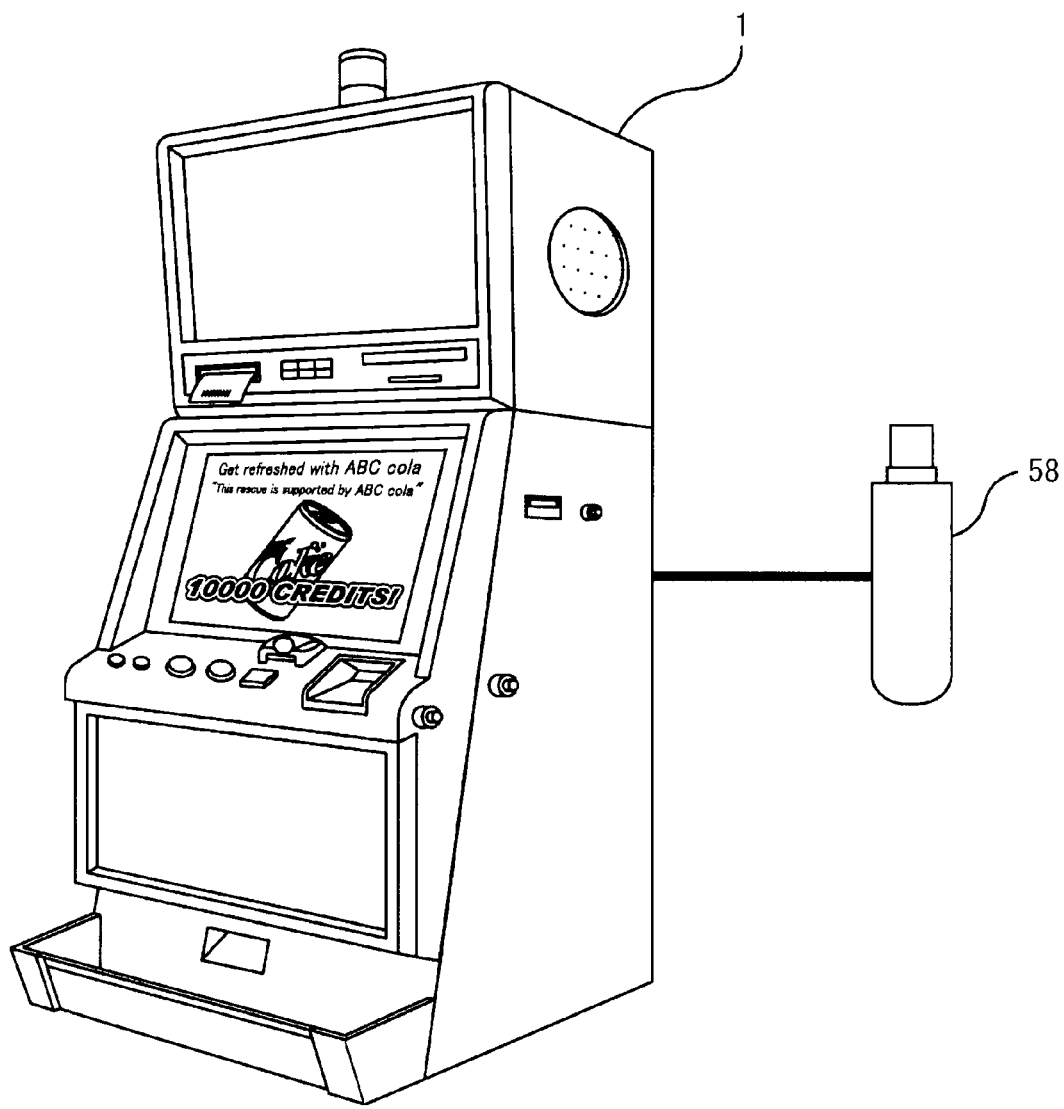
FIG. 1B is a view illustrating a USB memory according to the embodiment of the present invention.

First, with reference to FIG. 1 (FIGS. 1A and 1B), an overview of the first embodiment is described.

FIG. 1A is a view illustrating an advertisement image according to one embodiment of the present invention.

FIG. 1B is a view illustrating a USB memory according to the embodiment of the present invention.

In the gaming machine 1 (see FIG. 4) according to the first embodiment, a mode is shifted from a non-insurance mode to an insurance mode when an insurance-effective command is inputted. The number of times of the game played after the shift of the mode to the insurance mode is counted. When the counted number of times of the game has reached a predetermined number of times (1000) (hereinafter, also referred to as the number of insured games), coins of the number corresponding to an amount of insurance are paid out.

The number of insured games reaching the predetermined number corresponds to the predetermined condition of the present invention. Further, payout of coins of the number corresponding to the amount of insurance corresponds to the predetermined profit in the present invention.

In the first embodiment, an advertisement image of a sponsor is displayed to the lower image display panel 141 (see FIG. 4) when the number of insured games has reached the predetermined number of times (1000). FIG. 1A shows a state where an advertisement image 601 illustrating an advertisement of ABC cola is displayed.

Advertisement-image data showing an advertisement image is stored in an USB memory 58 and is obtained from the USB memory.

In the first embodiment, the sponsor provides money corresponding to the amount of insurance to the casino. In FIG. 1A, a sponsor text image 602 illustrating a text of "This insurance is supported by ABC Cola" is displayed.

More specifically, money corresponding to the amount of insurance is paid following the below procedures of:

(i) the hard disk drive 205 (see FIG. 7) provided in the external control device 200 (see FIG. 3) storing deposit data which shows the amount of money previously deposited by the sponsor in the casino (deposit amount);

(ii) the gaming machine 1 transmitting a signal to the external control device 200 when the number of insured games has reached a predetermined number of times (1000); and (iii) the external control device 200 subtracting the amount of insurance from the deposit amount indicated by the deposit data stored in the hard disk drive 205 on receiving the signal.

According to the gaming system 300 of the first embodiment, coins of the number corresponding to the amount of insurance are paid out when the number of insured games has reached the predetermined number of times (1000) in the gaming machine 1. At this time, the player is generally elated and satisfied with obtaining of coins. According to the gaming system 300 of the first embodiment, an advertisement image of a sponsor is displayed to the lower image display panel 141 at this timing. Namely, the advertisement is carried out to the elated and satisfied player. Accordingly, it is highly possible that such advertisement gives the player a favorable impression and is striking to the player. As a result, it is highly possible to increase the player's willingness to purchase the sponsor's product. Consequently, a significant advertising effect can be obtained.

In addition, according to the gaming system 300 of the first embodiment, a signal is transmitted from the gaming machine 1 to the external control device 200 when the number of insured games has reached the predetermined number of times (1000). Then, on receiving the signal, the external control device 200 subtracts the amount of insurance from the deposit amount indicated by the deposit data stored in the hard disk drive 205. Accordingly, the casino can collect money in an amount corresponding to the amount of insurance from the sponsor as advertisement cost, and therefore, it is possible to reduce financial burden on the casino, which is involved in the payout of coins of the number corresponding to the amount of insurance to the player.

With reference to FIG. 1, the overview of the first embodiment has been described above.

Hereinafter, the first embodiment is further described in detail.

[Explanation of Function Flow Diagram]

Figure 2:
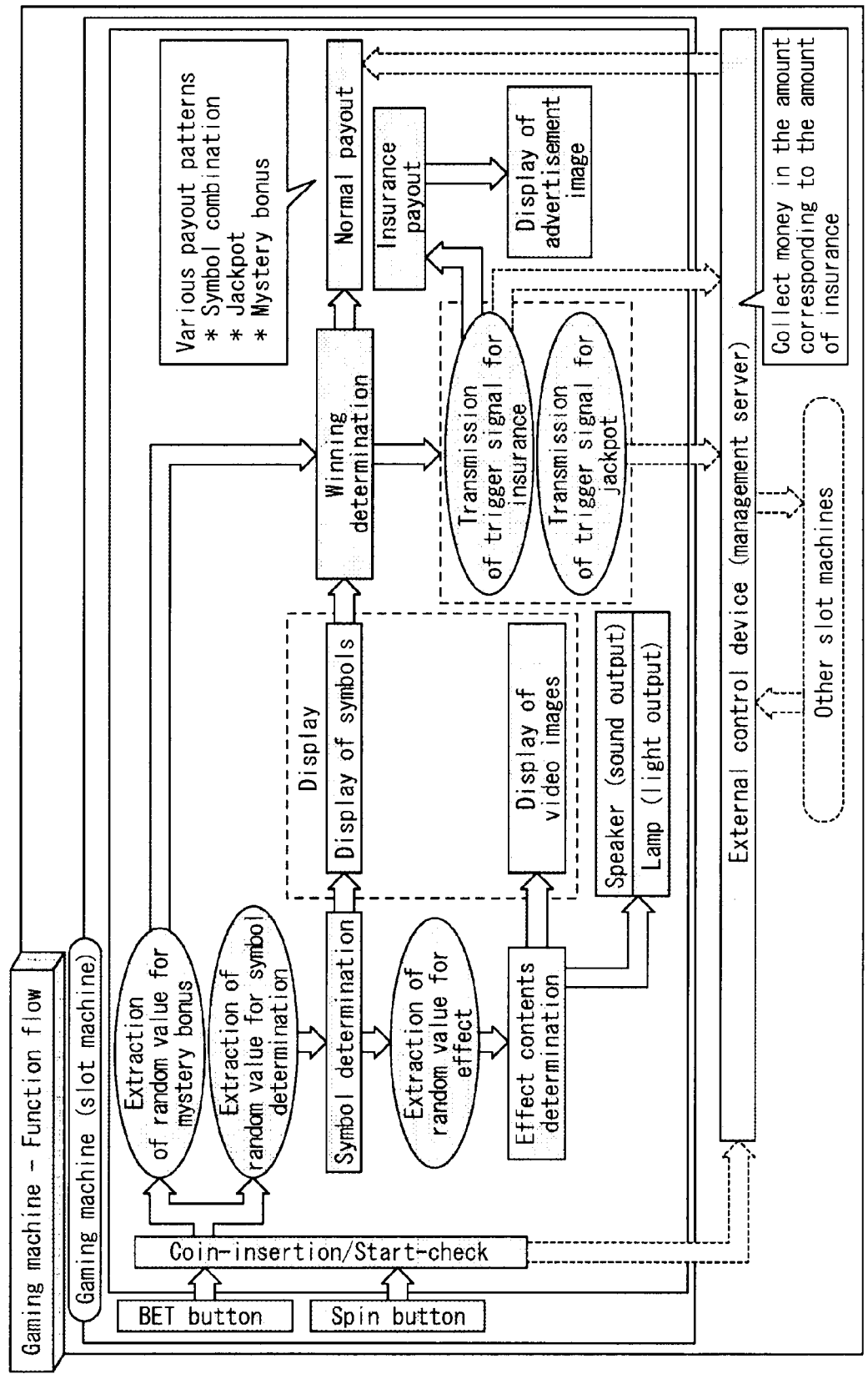
FIG. 2 is a view illustrating a function flow of a gaming machine according to the embodiment of the present invention.

With reference to FIG. 2, basic functions of the gaming machine according to the present embodiment are described.

FIG. 2 is a view illustrating a function flow of the gaming machine according to the embodiment of the present invention.

<Coin-Insertion/Start-Check>

First, the gaming machine checks whether or not a BET button has been pressed by the player, and subsequently checks whether or not a spin button has been pressed by the player.

<Symbol Determination>

Next, when the spin button has been pressed by the player, the gaming machine extracts random values for symbol determination, and determines symbols to be displayed at the time of stopping scrolling of symbol arrays for the player, for a plurality of respective video reels displayed to a display.

<Symbol Display>

Next, the gaming machine starts scrolling of the symbol array of each of the video reels and then stops scrolling so that the determined symbols are displayed for the player.

<Winning Determination>

When scrolling of the symbol array of each video reel has been stopped, the gaming machine determines whether or not a combination of symbols displayed for the player is a combination related to winning.

<Payout>

When the combination of symbols displayed for the player is a combination related to winning, the gaming machine offers benefits according to the combination to the player.

For example, when a combination of symbols related to a payout of coins has been displayed, the gaming machine pays out coins of the number corresponding to the combination of symbols to the player.

When a combination of symbols related to a jackpot trigger is displayed, the gaming machine pays out coins in an amount of jackpot to the player. The jackpot refers to a function which accumulates parts of coins used by players at the respective gaming machines as the amount of jackpot and which, when the jackpot trigger has been formed in any of the gaming machines, pays out coins of the accumulated amount of jackpot to that gaming machine.

In each game, the gaming machine calculates the amount (amount for accumulation) to be accumulated to the amount of jackpot and transmits that amount to an external control device. The external control device accumulates to the amount of jackpot the amounts for accumulation transmitted from the respective gaming machines.

Further, in addition to the aforementioned benefits, the gaming machine is provided with benefits such as a mystery bonus and insurance.

The mystery bonus is a bonus in which a predetermined amount of coins are paid out for winning of a lottery that is intended for the mystery bonus. When the spin button has been pressed, the gaming machine extracts a random value for mystery bonus and determines whether or not to establish a mystery bonus trigger by lottery.

The insurance is a function provided for a purpose of relieving the player from a situation in which a benefit such as a jackpot and a mystery bonus has not been offered for long periods of time. In the present embodiment, the player can arbitrarily select whether or not to make the insurance effective. Making insurance effective requires a predetermined insurance-purchase amount to be paid in exchange.

In the case where the insurance has been made effective, the gaming machine starts counting the number of games (number of insured games). The gaming machine conducts a payout of coins of the amount that is set for the insurance (amount of insurance), when the number of counted games (number of insured games) has reached a previously determined number of times without a large amount of payout related to the jackpot, the mystery bonus or the like being conducted.

<Determination of Effects>

The gaming machine produces effects by displaying images to the display, outputting the light from lamps, and outputting sounds from speakers. The gaming machine extracts a random value for effect and determines contents of the effects based on the symbols and the like determined by lottery.

[Overall Gaming System]

The basic functions of the gaming machine have been described above. Next, with reference to FIG. 3, a gaming system including the gaming machine is described.

Figure 3:
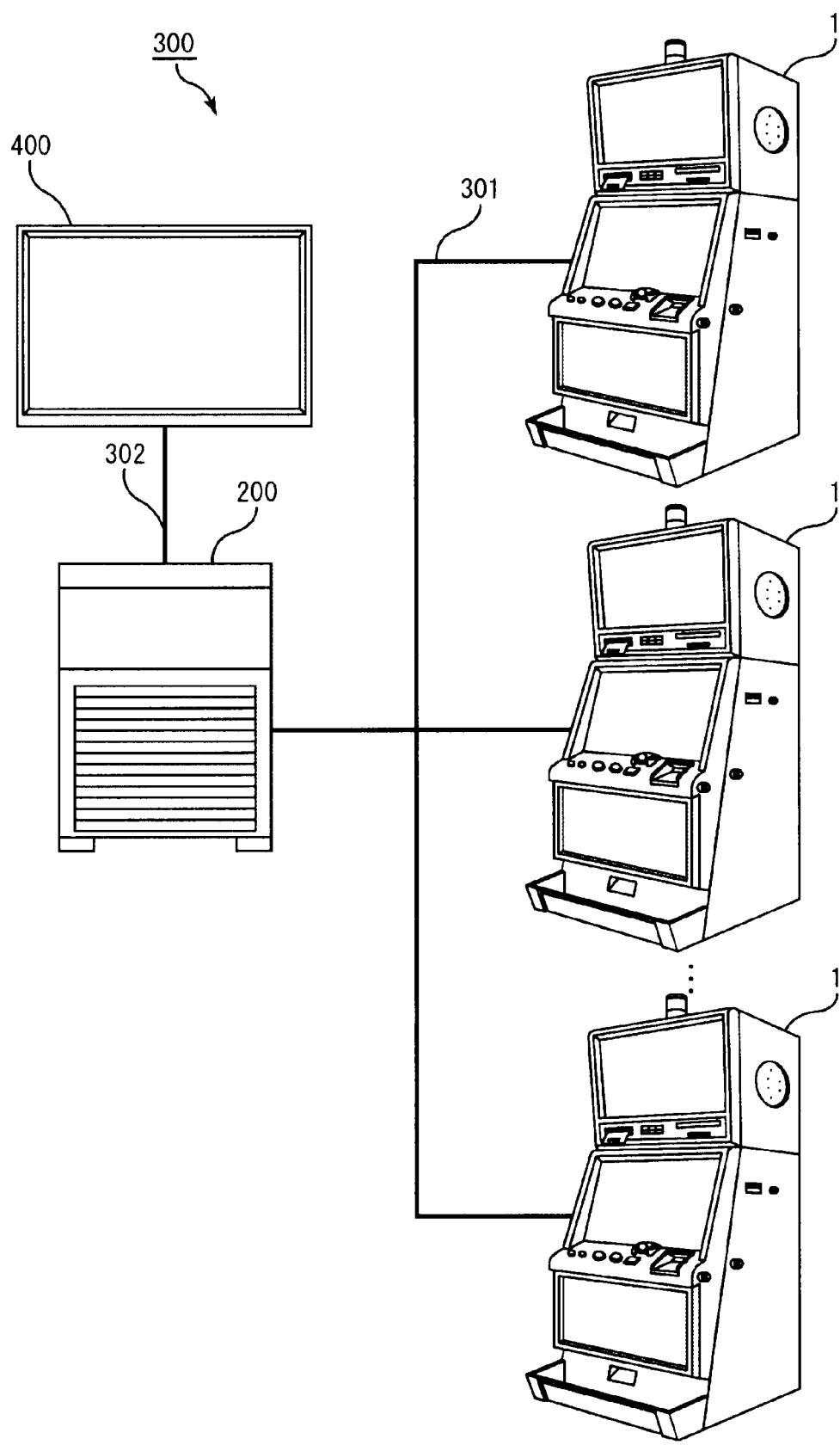
FIG. 3 is a view illustrating a gaming system including the gaming machine according to the embodiment of the present invention.

FIG. 3 is a view illustrating the gaming system including the gaming machine according to the embodiment of the present invention.

A gaming system 300 includes the plurality of gaming machines 1, and the external control device 200 that is connected to each of the gaming machines 1 through a communication line 301.

The external control device 200 is for controlling the plurality of gaming machines 1. In the present embodiment, the external control device 200 is a so-called hall server which is installed in a game facility having the plurality of gaming machines 1. Each of the gaming machines 1 is provided with a unique identification number, and the external control device 200 identifies transmission sources of data transmitted from the respective gaming machines 1 by using the identification numbers. Also in the case where the external control device 200 transmits data to a gaming machine 1, the identification numbers are used for specifying the transmission destination.

Further, a large display 400 is connected to the external control device 200 through a communication line 302. The large display 400 displays an effect image (see FIG. 1) as appropriate.

It is to be noted that the gaming system 300 may be constructed within a single game facility where various games can be conducted, such as a casino, or may be constructed among a plurality of game facilities. Further, when the gaming system 300 is constructed in a single game facility, the gaming system 300 may be constructed in each floor or section of the game facility. The communication line 301 may be a wired or wireless line, and can adopt a dedicated line, an exchange line or the like. The communication line 302 corresponds to the network of the present invention.

[Overall Configuration of Gaming Machine]

The gaming system according to the present embodiment has been described above. Next, with reference to FIG. 4, an overall configuration of the gaming machine 1 is described.

Figure 4:
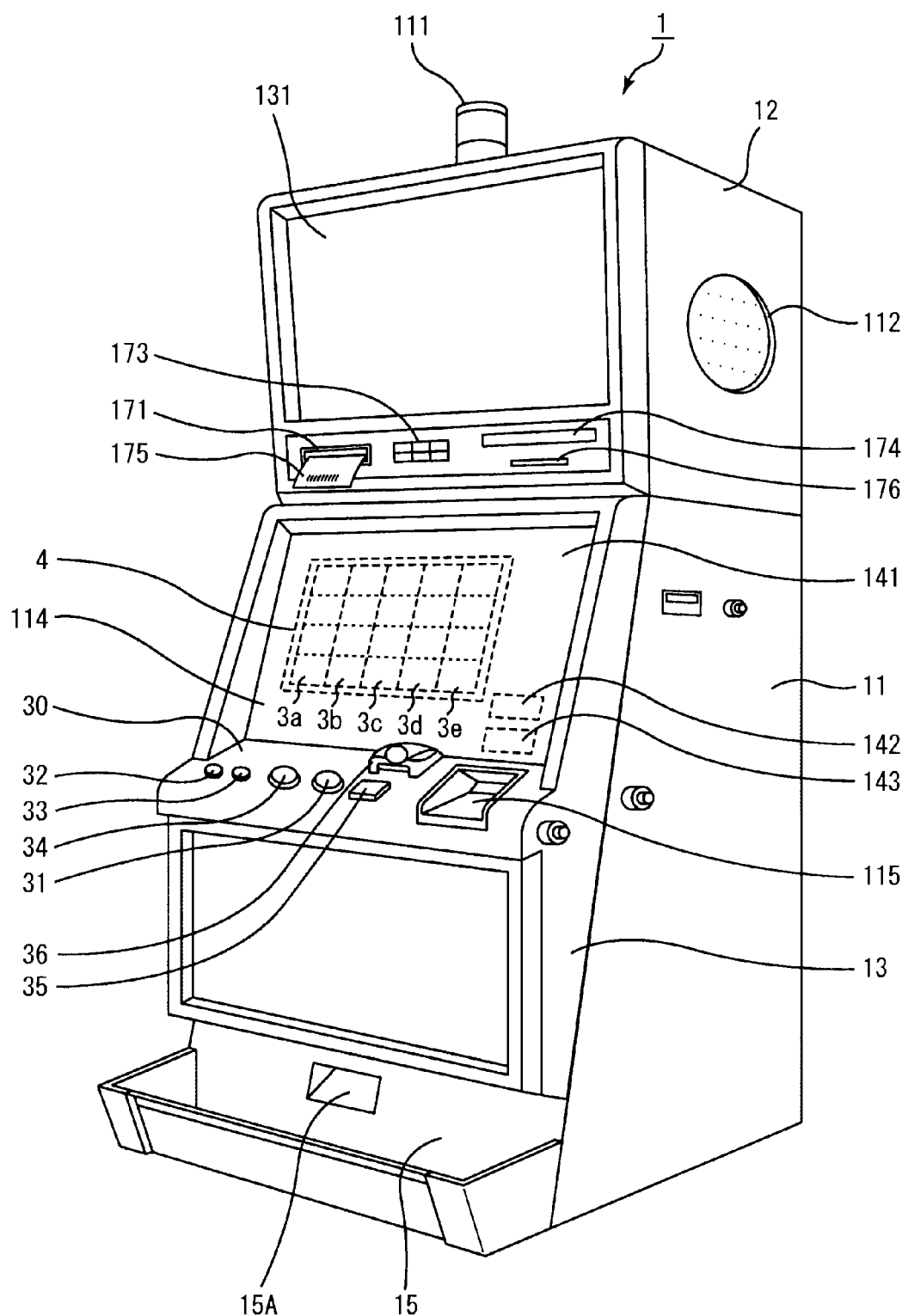
FIG. 4 is a view illustrating an overall configuration of the gaming machine according to the embodiment of the present invention.

FIG. 4 is a view illustrating the overall configuration of the gaming machine according to the embodiment of the present invention.

A coin, a bill, or electrically valuable information corresponding to these is used as a game medium in the gaming machine 1. Further, in the present embodiment, a later-described ticket with a barcode is also used. It is to be noted that the game medium is not limited to these, and for example a medal, a token, electric money or the like can be adopted.

The gaming machine 1 includes a cabinet 11, a top box 12 installed on the upper side of the cabinet 11, and a main door 13 provided at the front face of the cabinet 11.

A lower image display panel 141 is provided at the center of the main door 13. The lower image display panel 141 includes a liquid crystal panel, and forms the display. The lower image display panel 141 has a symbol display region 4. To the symbol display region 4, five video reels 3 (3a, 3b, 3c, 3d, 3e) are displayed.

In the present embodiment, a video reel depicts through videos the rotational and stop motions of a mechanical reel having a plurality of symbols drawn on the peripheral surface thereof. To each of the video reels 3, a symbol array comprised of a previously determined plurality (22 in the present embodiment) of symbols is assigned (see FIG. 5 which is described later).

In the symbol display region 4, the symbol arrays assigned to the respective video reels 3 are separately scrolled, and are stopped after predetermined time has elapsed. As a result, a part (four consecutive symbols in the present embodiment) of each of the symbol arrays is displayed for the player.

The symbol display region 4 has four regions, namely an upper region, an upper central region, a lower central region, and a lower region, for each video reel 3, and a single symbol is to be displayed to each region. That is, 20 (=5 columns×4 symbols) symbols are to be displayed in the symbol display region 4.

In the present embodiment, a line formed by selecting one of the aforementioned four regions for each of the video reels 3 and connecting the respective regions is referred to as a winning line.

It is to be noted that any desired shape of the winning line can be adopted, and examples of the shape of the winning line may include a straight line formed by connecting the upper central regions for the respective video reels 3, a V-shaped line, and a bent line. Also, any desired number of lines can be adopted, and the number can be for example 30 lines.

It is to be noted that, although the case where the gaming machine 1 is a so-called video slot machine is described in the present embodiment, the gaming machine of the present invention may be configured so that the symbols are stop-displayed by so-called mechanical reels.

The lower image display panel 141 displays an advertisement image of a sponsor (see FIG. 1A). The lower image display panel 141 corresponds to the output device of the present invention. In the present embodiment, a display capable of displaying an image thereto is used as the output device. The output device in the present invention may also be a speaker capable of outputting a sound. In this case, a sound is outputted from the speaker based on advertisement sound data stored in a USB memory or the like. Further, in the present invention, both of the display and the speaker may be provided as the output devices, and they may be configured so that an advertisement sound of the sponsor is outputted from the speaker concurrently with a display of an advertisement image of the sponsor to the display.

The lower image display panel 141 has a built-in touch panel 114. The player can input various commands by touching the lower image display panel 141.

On the lower side of the lower image display panel 141, there are arranged various buttons set in a control panel 30, and various devices to be operated by the player.

A spin button 31 is used when starting scrolling of the symbol arrays of the respective video reels 3. A change button 32 is used when requesting a game facility staff member to exchange money. A CASHOUT button 33 is used when paying out the coins retained inside the gaming machine 1 to a coin tray 15.

A 1-BET button 34 and a maximum BET button 35 are used for determining the number of coins (hereinafter also referred to as "the number of BETs") to be used in the game from the coins retained inside the gaming machine 1. The 1-BET button 34 is used when determining one coin at a time for the aforementioned number of BETs. The maximum BET button 35 is used when setting the aforementioned number of BETs to a defined upper limit number.

A coin accepting slot 36 is provided to accept coins. A bill validator 115 is provided to accept bills. The bill validator 115 validates a bill, and accepts a valid bill into the cabinet 11. It is to be noted that the bill validator 115 may be configured so as to be capable of reading a later-described ticket 175 with a barcode.

An upper image display panel 131 is provided at the front face of the top box 12. The upper image display panel 131 includes a liquid crystal panel, and forms the display. The upper image display panel 131 displays images related to effects and images showing introduction of the game contents and explanation of the game rules. Further, the top box 12 is provided with a speaker 112 and a lamp 111. The gaming machine 1 produces effects by displaying images, outputting sounds, and outputting the light.

A ticket printer 171, a card slot 176, a data display 174, and a keypad 173 are provided on the lower side of the upper image display panel 131.

The ticket printer 171 prints on a ticket a barcode representing encoded data of the number of credits, date, the identification number of the gaming machine 1, and the like, and outputs the ticket as the ticket 175 with a barcode. The player can make a gaming machine read the ticket 175 with a barcode so as to play a game thereon, and can also exchange the ticket 175 with a barcode with a bill or the like at a predetermined place (e.g. a cashier in a casino) in the game facility.

The card slot 176 is for inserting a card in which predetermined data is stored. For example, the card stores data for identifying the player, and data about the history of games played by the player.

When the card is inserted into the card slot 176, a later-described card reader 172 reads data from the card or writes data into the card. It is to be noted that the card may store data corresponding to a coin, a bill or a credit.

The data display 174 includes a fluorescent display, LEDs and the like, and displays the data read by the card reader 172 or the data inputted by the player via the keypad 173, for example. The keypad 173 is for inputting a command and data related to ticket issuance or the like.

[Symbol Arrays of Video Reels]

The overall configuration of the gaming machine 1 has been described above. Next, with reference to FIG. 5, a configuration of the symbol arrays included in the video reels 3 of the gaming machine 1 is described.

FIG. 5 is a view illustrating arrangements of symbols drawn on peripheral faces of reels of the gaming machine according to the embodiment of the present invention.

A first video reel 3a, a second video reel 3b, a third video reel 3c, a fourth video reel 3d, and a fifth video reel 3e each is assigned with a symbol array consisting of 22 symbols that correspond to respective code numbers from "00" to "21".

Types of the symbols provided are "JACKPOT 7", "BLUE 7", "BELL", "CHERRY", "STRAWBERRY", "PLUM", "ORANGE", and "APPLE".

[Configuration of Circuit Included in Gaming Machine]

The configuration of the symbol arrays included in the video reels 3 of the gaming machine 1 has been described above. Next, with reference to FIG. 6, a configuration of a circuit included in the gaming machine 1 is described.

Figure 6:
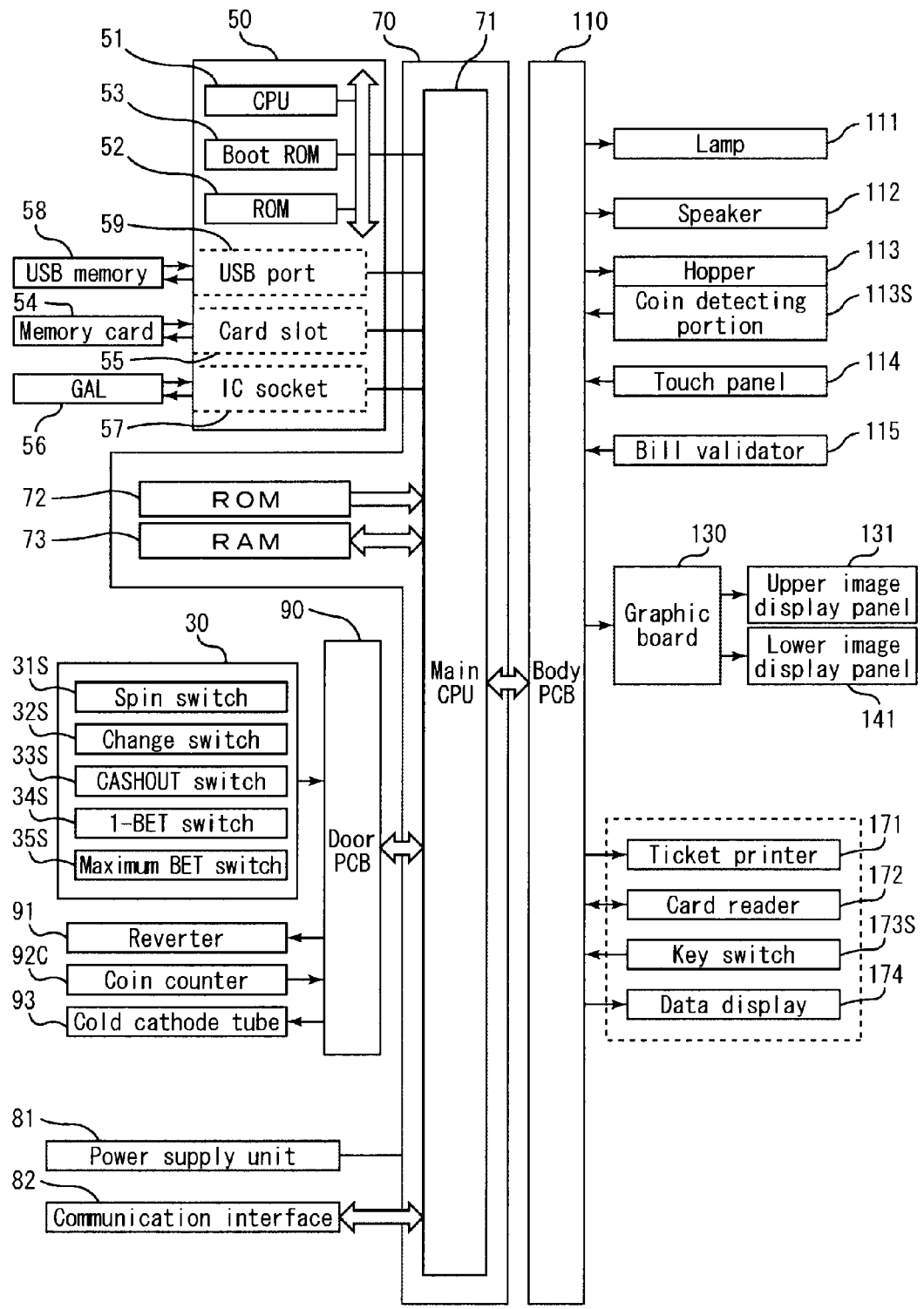
FIG. 6 is a block diagram illustrating an internal configuration of the gaming machine according to the embodiment of the present invention.

FIG. 6 is a block diagram illustrating an internal configuration of the gaming machine according to the embodiment of the present invention.

A gaming board 50 is provided with: a CPU 51, a ROM 52, and a boot ROM 53, which are mutually connected by an internal bus; a card slot 55 corresponding to a memory card 54; an IC socket 57 corresponding to a GAL (Generic Array Logic) 56; and a USB (Universal Serial Bus) port 59 corresponding to a USB memory 58.

The memory card 54 includes a non-volatile memory, and stores a game program and a game system program. The game program includes a program related to game progression, a lottery program, and a program for producing effects by images and sounds (e.g. see FIGS. 9 to 19 which are described later). Further, the aforementioned game program includes data (see FIG. 5) specifying the configuration of the symbol array assigned to each video reel 3.

The lottery program is a program for determining to-be stopped symbol of each video reel 3 by lottery. The to-be stopped symbol is data for determining four symbols to be displayed to the symbol display region 4 out of the 22 symbols forming each symbol array. The gaming machine 1 of the present embodiment determines as the to-be stopped symbol the symbol to be displayed in a predetermined region (e.g. the upper region) out of the four regions provided for each of the video reels 3 of the symbol display region 4.

The aforementioned lottery program includes symbol determination data. The symbol determination data is data that specifies random values so that each of the 22 symbols (code numbers from "00" to "21") forming the symbol array is determined at an equal probability (i.e. 1/22), for each video reel 3.

The probabilities of the respective 22 symbols being determined are basically equal. However, the numbers of the respective types of symbols included in the 22 symbols vary, and thus the probabilities of the respective types of symbols being determined vary (i.e. different weights on the probabilities are generated). For example, with reference to FIG. 5, the symbol array of the first video reel 3a includes one symbol of "JACKPOT 7", and includes seven symbols of "ORANGE". Hence, the former is determined at the probability of "1/22", whereas the latter is determined at the probability of "7/22".

It is to be noted that, although the data specifies that the equal numbers of symbols are to be provided to form the symbol arrays of the respective video reels 3 in the present embodiment, different numbers of symbols may form the respective video reels 3. For example, the symbol array of the first video reel 3a may consist of 22 symbols whereas the symbol array of the second video reel 3b may consist of 30 symbols. Such a configuration increases the degree of freedom in setting the probabilities of the respective types of symbols being determined for each video reel 3.

Further, the card slot 55 is configured so that the memory card 54 can be inserted thereinto and removed therefrom, and is connected to a motherboard 70 by an IDE bus.

The GAL 56 is a type of PLD (Programmable Logic Device) having a fixed OR array structure. The GAL 56 is provided with a plurality of input ports and output ports, and predetermined input into the input port causes output of the corresponding data from the output port.

Further, the IC socket 57 is configured so that the GAL 56 can be inserted thereinto and removed therefrom, and is connected to the motherboard 70 by a PCI bus. The contents of the game to be played on the gaming machine 1 can be changed by replacing the memory card 54 with another memory card 54 having another program written therein or by rewriting the program written into the memory card 54 as another program.

The USB memory 58 includes a non-volatile memory, and stores advertisement-image data. The advertisement-image data is data indicating an advertisement image (see FIG. 1A). The USB port 59 is configured so that the USB memory 58 can be inserted thereinto and removed therefrom, and is connected to the motherboard 70 by an IDE bus.

The USB memory 58 corresponds to the external memory device of the present invention. The external memory device of the present invention is not limited to this example, and examples thereof include a memory card and the like.

The USB port 59 corresponds to the slot of the present invention.

Here, it is to be noted that the player can select one sponsor out of three sponsors (sponsor A, sponsor B, and sponsor C) in the first embodiment, which will be described later in detail with reference to FIG. 18. The lower image display panel 141 displays the advertisement image of the selected sponsor.

Corresponding to this, the USB port 59 includes a USB port 59a for sponsor A, a USB port 59b for sponsor B, and a USB port 59c for sponsor C.

The USB port 59a for sponsor A is configured so that a USB memory 58a for sponsor A is inserted thereinto and removed therefrom. The USB port 59b for sponsor B is configured so that a USB memory 58b for sponsor B is inserted thereinto and removed therefrom. The USB port 59c for sponsor C is configured so that a USE memory 58c for sponsor C is inserted thereinto and removed therefrom.

The USB memory 58a for sponsor A stores advertisement-image data indicating the advertisement image of sponsor A. The USE memory 58b for sponsor B stores advertisement-image data indicating the advertisement image of sponsor B. The USB memory 58c for sponsor C stores advertisement-image data indicating the advertisement image of sponsor C.

The USB memory 58 includes the USB memory 58a for sponsor A, the USB memory 58b for sponsor B, and the USB memory 58c for sponsor C.

The CPU 51, the ROM 52 and the boot ROM 53 mutually connected by the internal bus are connected to the motherboard 70 by a PCI bus. The PCI bus enables a signal transmission between the motherboard 70 and the gaming board 50, and power supply from the motherboard 70 to the gaming board 50.

The ROM 52 stores an authentication program. The boot ROM 53 stores a pre-authentication program, a program (boot code) to be used by the CPU 51 for activating the pre-authentication program, and the like.

The authentication program is a program (tamper check program) for authenticating the game program and the game system program. The pre-authentication program is a program for authenticating the aforementioned authentication program.

The authentication program and the pre-authentication program are written along a procedure (authentication procedure) for proving that the program to be the subject has not been tampered.

The motherboard 70 is provided with a main CPU 71, a ROM 72, a RAM 73, and a communication interface 82. The motherboard 70 corresponds to the controller of the present invention.

The ROM 72 includes a memory device such as a flash memory, and stores a program such as BIOS to be executed by the main CPU 71, and permanent data. When the BIOS is executed by the main CPU 71, processing for initializing predetermined peripheral devices is conducted; further, through the gaming board 50, processing of loading the game program and the game system program stored in the memory card 54 is started.

The RAM 73 stores data and programs which are used in operation of the main CPU 71. For example, when the processing of loading the aforementioned game program, game system program or authentication program is conducted, the RAM 73 can store the program. The RAM 73 is provided with working areas used for operations in execution of these programs. Examples of the areas include: an area that stores the number of BETs, the number of payouts, the number of credits and the like; and an area that stores symbols (code numbers) determined by lottery.

Further, the main RAM 43 is provided with a storage area for an insurance-effective flag. The insurance-effective flag is a flag to be set when a command to make the insurance effective is inputted. The storage area for an insurance-effective flag comprises, for example, a storage area of a predetermined number of bits, and turns "ON" or "OFF" the insurance-effective flag according to the memory in the storage area. When the insurance-effective flag is "ON", the game is in the insurance mode. When the insurance-effective flag is "OFF", the game is in the non-insurance mode.

The communication interface 82 is for communicating with the external control device 200 such as a server, through the communication line 301. Further, the motherboard 70 is connected with a later-described door PCB (Printed Circuit Board) 90 and a body PCB 110 by respective USBs. The motherboard 70 is also connected with a power supply unit 81.

When the power is supplied from the power supply unit 81 to the motherboard 70, the main CPU 71 of the motherboard 70 is activated, and then the power is supplied to the gaming board 50 through the PCI bus so as to activate the CPU 51.

The door PCB 90 and the body PCB 110 are connected with input devices such as a switch and a sensor, and peripheral devices the operations of which are controlled by the main CPU 71.

The door PCB 90 is connected with a control panel 30, a reverter 91, a coin counter 92C and a cold cathode tube 93.

The control panel 30 is provided with a spin switch 31S, a change switch 32S, a CASHOUT switch 33S, a 1-BET switch 34S and a maximum BET switch 35S which correspond to the aforementioned respective buttons. Each of the switches outputs a signal to the main CPU 71 upon detection of press of the button corresponding thereto by the player.

The coin counter 92C validates a coin inserted into the coin accepting slot 36 based on its material, shape and the like, and outputs a signal to the main CPU 71 upon detection of a valid coin. Invalid coins are discharged from a coin payout exit 15A.

The reverter 91 operates based on a control signal outputted from the main CPU 71, and distributes valid coins validated by the coin counter 92C into a hopper 113 or a cash box (not illustrated). That is, coins are distributed into the hopper 113 when the hopper 113 is not filled with coins, while coins are distributed into the cash box when the hopper 113 is filled with coins.

The cold cathode tube 93 functions as a backlight installed on the rear face sides of the upper image display panel 131 and the lower image display panel 141, and lights up based on a control signal outputted from the main CPU 71.

The body PCB 110 is connected with the lamp 111, the speaker 112, the hopper 113, a coin detecting portion 113S, the touch panel 114, the bill validator 115, a graphic board 130, the ticket printer 171, the card reader 172, a key switch 173S and the data display 174.

The lamp 111 lights up based on a control signal outputted from the main CPU 71. The speaker 112 outputs sounds such as BGM, based on a control signal outputted from the main CPU 71.

The hopper 113 operates based on a control signal outputted from the main CPU 71, and pays out coins of the specified number of payouts from the coin payout exit 15A to the coin tray 15. The coin detecting portion 113S outputs a signal to the main CPU 71 upon detection of coins paid out by the hopper 113.

The touch panel 114 detects a place on the lower image display panel touched by the player's finger or the like, and outputs to the main CPU 71a signal corresponding to the detected place. Upon acceptance of a valid bill, the bill validator 115 outputs to the main CPU 71a signal corresponding to the face amount of the bill.

The graphic board 130 controls display of images conducted by the respective upper image display panel 131 and lower image display panel 141, based on a control signal outputted from the main CPU 71. The symbol display region 4 of the lower image display panel 141 displays the five video reels 3 by which the scrolling and stop motions of the symbol arrays included in the respective video reels 3 are displayed. The graphic board 130 is provided with a VDP generating image data, a video RAM temporarily storing the image data generated by the VDP, and the like. A number-of-credits display portion 142 of the lower image display panel 141 displays the number of credits stored in the RAM 73. A number-of-payouts display portion 143 of the lower image display panel 141 displays the number of payouts of coins.

The graphic board 130 is provided with the VDP (Video Display Processor) generating image data based on a control signal outputted from the main CPU 71, the video RAM temporarily storing the image data generated by the VDP, and the like. It is to be noted that the image data used in generation of image data by the VDP is included in the game program that has been read from the memory card 54 and stored into the RAM 73.

Based on a control signal outputted from the main CPU 71, the ticket printer 171 prints on a ticket a barcode representing encoded data of the number of credits stored in the RAM 73, date, the identification number of the gaming machine 1, and the like, and then outputs the ticket as the ticket 175 with a barcode.

The card reader 172 reads data stored in a card inserted into the card slot 176 and transmits the data to the main CPU 71, or writes data into the card based on a control signal outputted from the main CPU 71.

The key switch 173S is provided in the keypad 173, and outputs a predetermined signal to the main CPU 71 when the keypad 173 has been operated by the player.

The data display 174 displays data read by the card reader 172 and data inputted by the player through the keypad 173, based on a control signal outputted from the main CPU 71.

[Configuration of Circuit Included in External Control Device]

The circuit configuration of the gaming machine 1 has been described above. Next, with reference to FIG. 7, a configuration of a circuit included in the external control device 200 is described.

Figure 7:
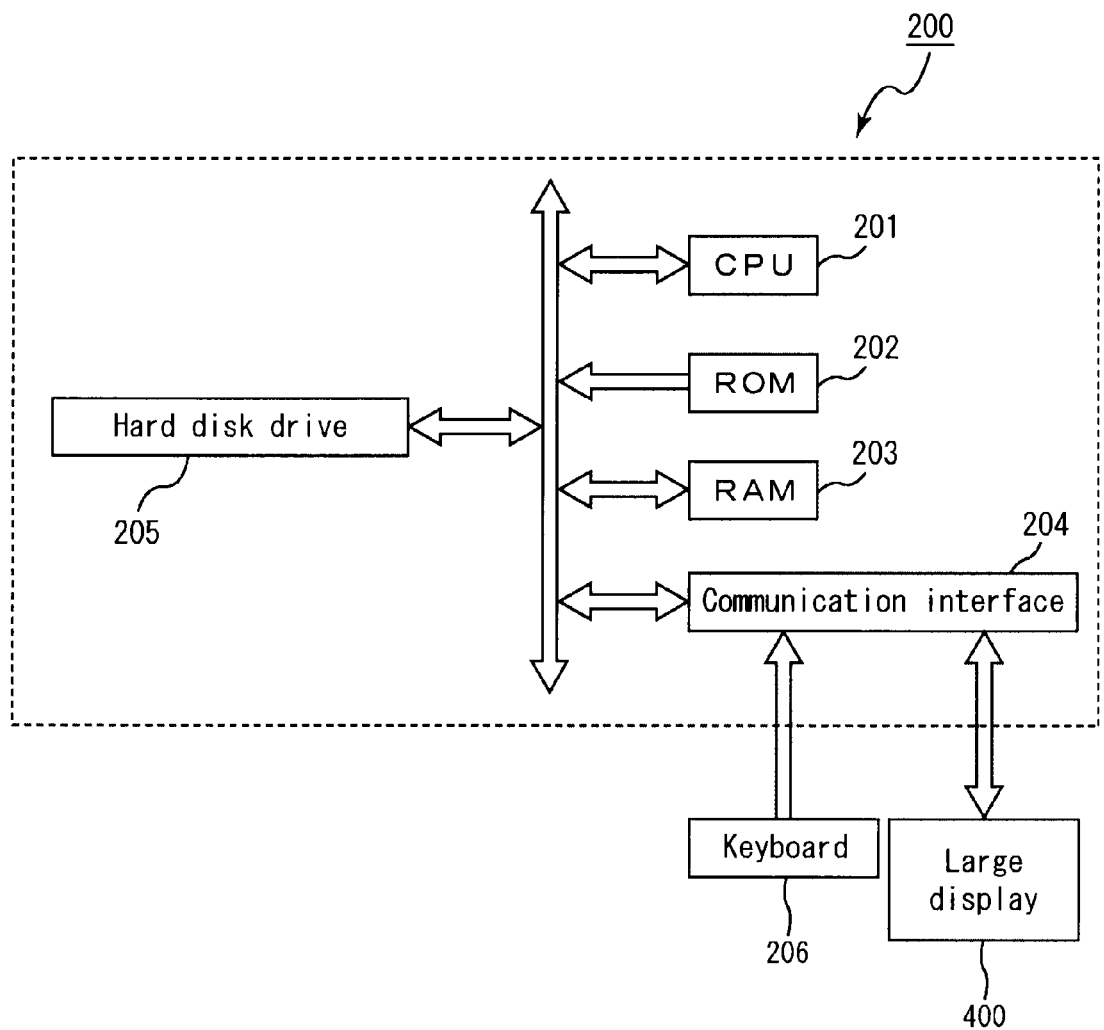
FIG. 7 is a block diagram illustrating an internal configuration of an external control device constituting the gaming system according to the embodiment of the present invention.

FIG. 7 is a block diagram illustrating an internal configuration of an external control device constituting the gaming system according to the embodiment of the present invention.

The external control device 200 includes a CPU 201, a ROM 202, a RAM 203, a communication interface 204, and a hard disk drive 205. The communication interface 204 is connected with the communication interface 82 of each gaming machine 1 through the communication line 301. Further, the communication interface 204 is connected with the large display 400 through the communication line 302.

Further, the communication interface 204 is connected with a keyboard 206. The amount of money deposited by the sponsor in the casino is inputted through the keyboard 206.

The ROM 202 stores a system program for controlling operations of a processor, permanent data, and the like. The CPU 201 corresponds to the processor of the present invention.

The RAM 203 temporarily stores data received from the respective gaming machines 1.

In the hard disk drive 205, deposit data indicating the amount of money deposited in the casino by each sponsor is stored in association with each of the sponsor A, the sponsor B, and the sponsor C. The deposit data corresponds to the cost-collecting data of the present invention. Further, the hard disk drive 205 corresponds to the memory device of the present invention.

The hard disk drive 205 also corresponds to the external control device of the present invention. Accordingly, a memory device provided in a control device may be used as the external control device of the present invention. It is to be noted that the present invention is not limited to this example, and a USB memory and the like may be used as an external control device and the USB memory may be configured to store cost-collecting data.

[Configuration of Symbol Combination Table]

The circuit configuration of the gaming machine 1 has been described above. Next, with reference to FIG. 8, a symbol combination table is described.

FIG. 8 is a view illustrating a symbol combination table of the gaming machine according to the embodiment of the present invention.

The symbol combination table specifies combinations of drawn symbols related to winning, and the number of payouts. On the gaming machine 1, the scrolling of symbol arrays of the respective video reels 3 is stopped, and winning is established when the combination of symbols displayed along the winning line matches one of the combinations of symbols specified by the symbol combination table. According to the winning combination, a benefit such as payout of coins is offered to the player. It is to be noted that winning is not established (i.e. the game is lost) when the combination of symbols displayed along the winning line does not match any of the combinations of symbols specified by the symbol combination table.

Basically, winning is established when all symbols displayed along the winning line by the respective video reels 3 are of one type out of "JACKPOT 7", "APPLE", "BLUE 7", "BELL", "CHERRY", "STRAWBERRY", "PLUM" and "ORANGE". However, with respect to the respective types of symbols of "CHERRY" and "ORANGE", winning is also established when one or three symbols of either type are displayed along the winning line by the video reels 3.

For example, when all the symbols displayed along the winning line by all the video reels 3 are "BLUE 7", the winning combination is "BLUE", and "10" is determined as the number of payouts. Based on the determined number of payouts, payout of coins is conducted. The payout of coins is conducted by actually discharging coins from the coin payout exit 15A or adding the determined number of payouts to the number of credits, or issuing a ticket with a barcode.

"JACKPOT 7" is the jackpot trigger. When all the symbols displayed along the winning line by all the video reels 3 are "JACKPOT 7", the winning combination is "jackpot", and the amount of jackpot is determined as the number of payouts.

[Contents of Program]

The symbol combination table has been described above. Next, with reference to FIGS. 9 to 19, the program to be executed by the gaming machine 1 is described.

<Main Control Processing>

Figure 9:
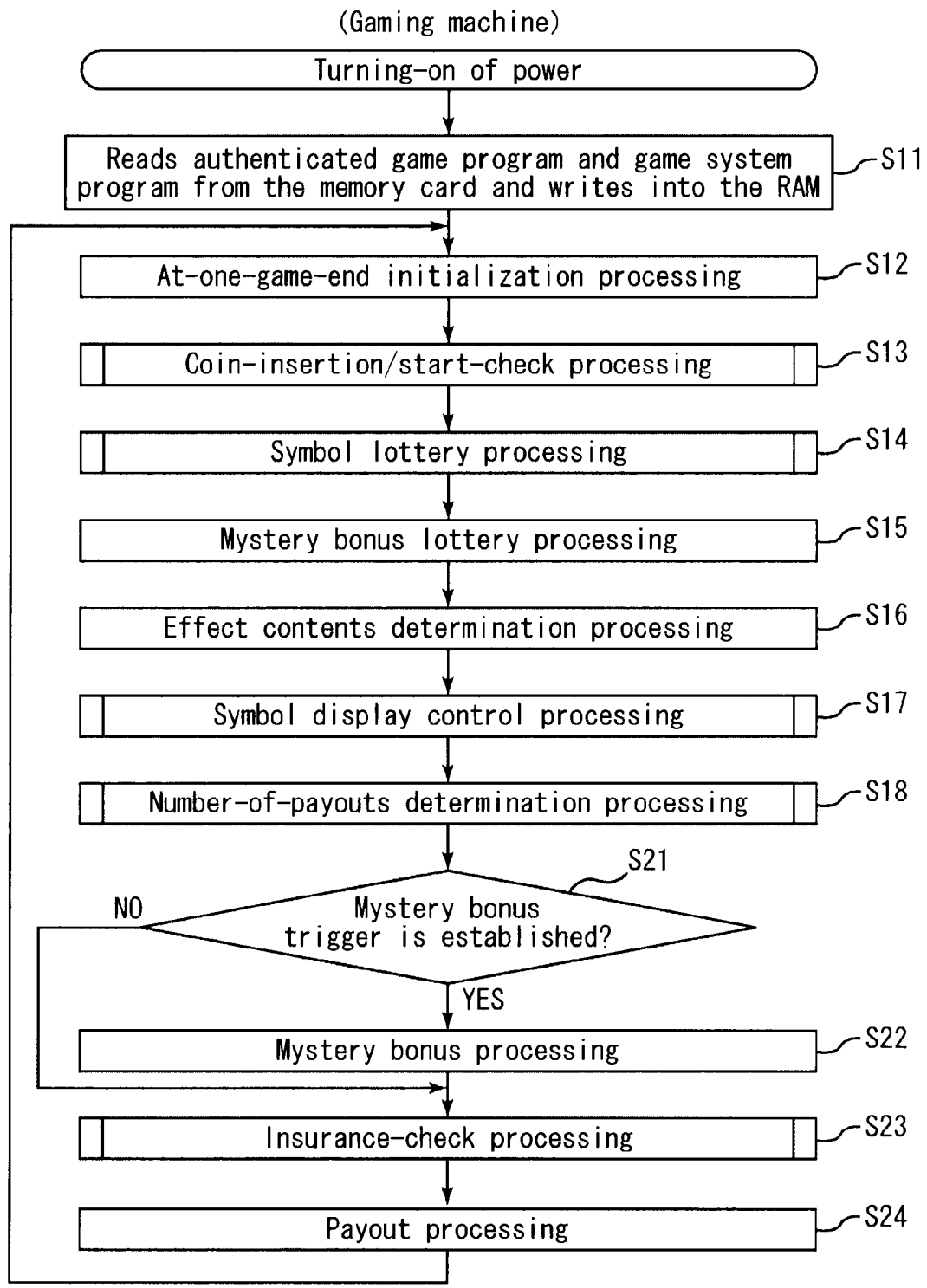
FIG. 9 is a view illustrating a flowchart of main control processing for the gaming machine according to the embodiment of the present invention.

First, with reference to FIG. 9, main control processing is described.

FIG. 9 is a view illustrating a flowchart of the main control processing for the gaming machine according to the embodiment of the present invention.

First, when the power is supplied to the gaming machine 1, the main CPU 71 reads the authenticated game program and gaming system program from the memory card 54 through the gaming board 50, and writes the programs into the RAM 73 (step S11).

Next, the main CPU 71 conducts at-one-game-end initialization processing (step S12). For example, data that becomes unnecessary after each game in the working areas of the RAM 73, such as the number of BETs and the symbols determined by lottery, is cleared.

The main CPU 71 conducts coin-insertion/start-check processing which is described later with reference to FIG. 10 (step S13). In the processing, input from the BET switch and the spin switch is checked.

The main CPU 71 then conducts symbol lottery processing which is described later with reference to FIG. 13 (step S14).

In the processing, to-be stopped symbols are determined based on the random values for symbol determination.

Next, the main CPU 71 conducts mystery bonus lottery processing (step S15). In the processing, lottery determining whether or not to establish a mystery bonus trigger is held. For example, the main CPU 71 extracts a random value for mystery bonus from the numbers in a range of "0 to 99", and establishes the mystery bonus trigger when the extracted random value is "0".

The main CPU 71 conducts effect contents determination processing (step S16). The main CPU 71 extracts a random value for effect, and determines any of the effect contents from the preset plurality of effect contents by lottery.

The main CPU 71 then conducts symbol display control processing which is described later with reference to FIG. 14 (step S17). In the processing, scrolling of the symbol array of each video reel 3 is started, and the to-be stopped symbol determined in the symbol lottery processing of step S14 is stopped at a predetermined position (e.g. the upper region in the symbol display region 4). That is, four symbols including the to-be stopped symbol are displayed in the symbol display region 4. For example, when the to-be stopped symbol is the symbol associated with the code number of "10" and it is to be displayed to the upper region, the symbols associated with the respective code numbers of "11", "12" and "13" are to be displayed to the respective upper central region, lower central region and lower region in the symbol display region 4.

Next, the main CPU 71 conducts number-of-payouts determination processing which is described later with reference to FIG. 15 (step S18). In the processing, the number of payouts is determined based on the combination of symbols displayed along a winning line, and is stored into a number-of-payouts storage area provided in the RAM 73.

The main CPU 71 then determines whether or not the mystery bonus trigger has been established (step S21). When the main CPU 71 determines that the mystery bonus trigger has been established, the main CPU 71 conducts the mystery bonus processing (step S22). In the processing, the number of payouts (e.g. 300) being set for the mystery bonus is stored into the number-of-payouts storage area provided in the RAM 73.

After the processing of step S22 or when the main CPU 71 determines in step S21 that the mystery bonus trigger has not been established, the main CPU 71 conducts insurance-check processing which is described later with reference to FIG. 16 (step S23). In the processing, whether or not to conduct payout by the insurance is checked.

The main CPU 71 conducts payout processing (step S24). The main CPU 71 adds the value stored in the number-of-payouts storage area to the value stored in the number-of-credits storage area provided in the RAM 73. It is to be noted that operations of the hopper 113 may be controlled based on input through the CASHOUT switch 33S, and coins of the number corresponding to the value stored in the number-of-payouts storage area may be discharged from the coin payout exit 15A. Further, operations of the ticket printer 171 may be controlled and a ticket with a barcode may be issued on which a value stored in the number-of-payouts storage area is recorded. After the processing has been conducted, the processing is shifted to step S12.

<Coin-Insertion/Start-Check Processing>

Figure 10:
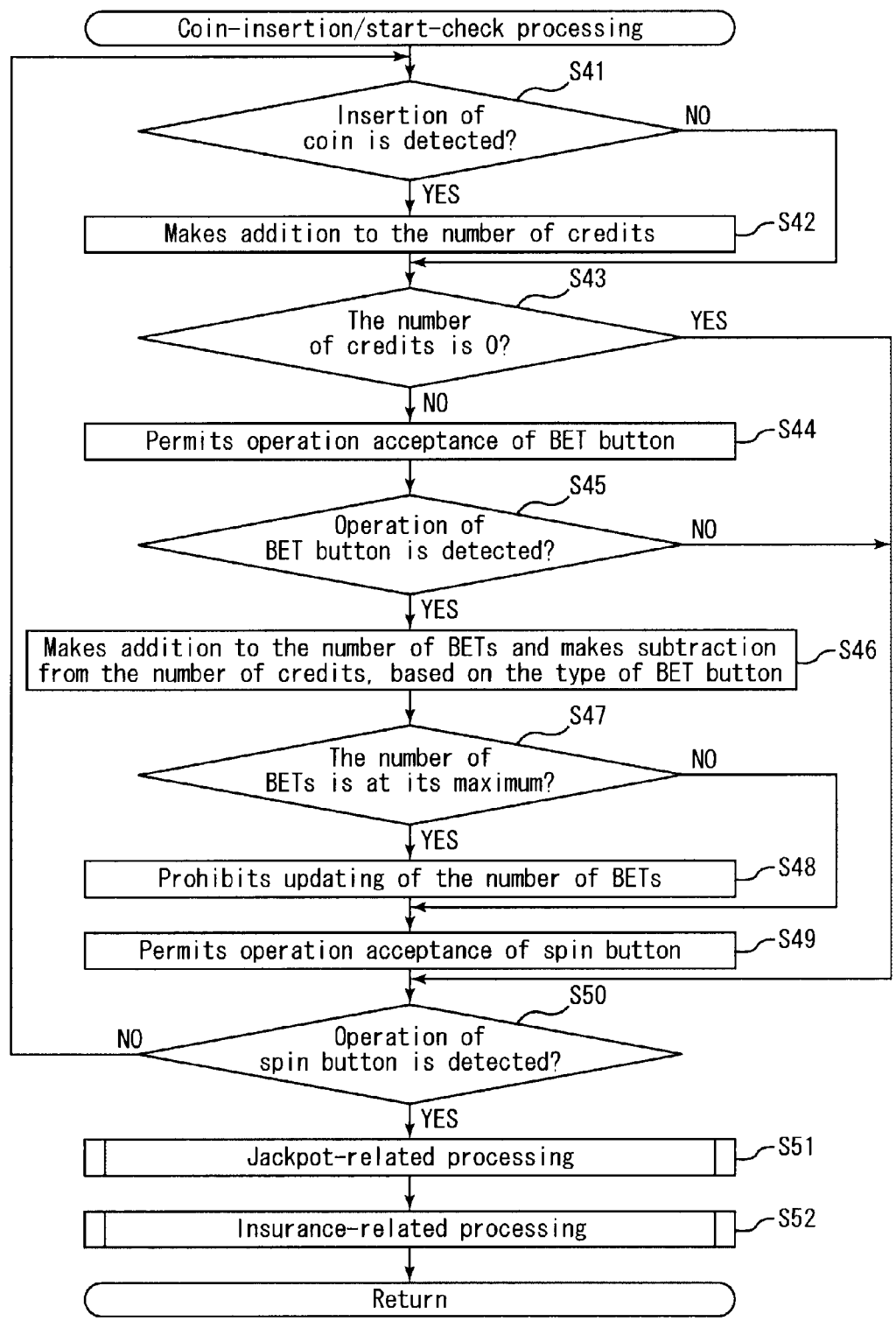
FIG. 10 is a flowchart illustrating coin-insertion/start-check processing for the gaming machine according to the embodiment of the present invention.

Next, with reference to FIG. 10, coin-insertion/start-check processing is described.

FIG. 10 is a view illustrating a flowchart of the coin-insertion/start-check processing for the gaming machine according to the embodiment of the present invention.

First, the main CPU 71 determines whether or not insertion of a coin has been detected by the coin counter 92C (step S41). When the main CPU 71 determines that the insertion of a coin has been detected by the coin counter 92C, the main CPU 71 makes an addition to the value stored in the number-of-credits storage area (step S42). It is to be noted that, in addition to the insertion of a coin, the main CPU 71 may determine whether or not insertion of a bill has been detected by the bill validator 115, and when the main CPU 71 determines that the insertion of a bill has been detected, the main CPU 71 may add a value according to the bill to the value stored in the number-of-credits storage area.

After step S42 or when the main CPU 71 determines in step S41 that the insertion of a coin has not been detected, the main CPU 71 determines whether or not the value stored in the number-of-credits storage area is zero (step S43). When the main CPU 71 determines that the value stored in the number-of-credits storage area is not zero, the main CPU 71 permits operation acceptance of the BET buttons (step S44).

Next, the main CPU 71 determines whether or not operation of any of the BET buttons has been detected (step S45). When the main CPU 71 determines that the BET switch has detected press of the BET button by the player, the main CPU 71 makes an addition to the value stored in a number-of-BETs storage area provided in the RAM 73 and makes a subtraction from the value stored in the number-of-credits storage area, based on the type of the BET button (step S46).

The main CPU 71 then determines whether or not the value stored in the number-of-BETs storage area is at its maximum (step S47). When the main CPU 71 determines that the value stored in the number-of-BETs storage area is at its maximum, the main CPU 71 prohibits updating of the value stored in the number-of-BETs storage area (step S48). After step S48 or when the main CPU 71 determines in step S47 that the value stored in the number-of-BETs storage area is not at its maximum, the main CPU 71 permits operation acceptance of the spin button (step S49).

After step S49 or when the main CPU 71 determines in step S45 that the operation of any of the BET buttons has not been detected, or when the main CPU 71 determines in step S43 that the value stored in the number-of-credits storage area is zero, the main CPU 71 determines whether or not operation of the spin button has been detected (step S50). When the main CPU 71 determines that the operation of the spin button has not been detected, the processing is shifted to step S41.

When the main CPU 71 determines that the operation of the spin button has been detected, the main CPU 71 conducts jackpot-related processing described later with reference to FIG. 11 (step S51). In this processing, the main CPU 71 calculates the amount to be accumulated to the amount of jackpot and transmits the amount to the external control device 200.

Next, the main CPU 71 conducts insurance-related processing which is described later with reference to FIG. 12 (step S52). In the processing, counting of the number of games is conducted which triggers a payout by the insurance. After the processing has been conducted, the coin-insertion/start-check processing is completed.

<Jackpot-Related Processing>

Figure 11:
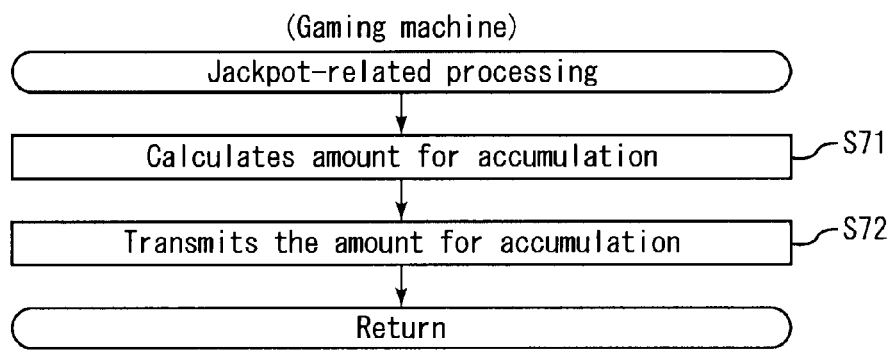
FIG. 11 is a view illustrating a flowchart of jackpot-related processing for the gaming machine according to the embodiment of the present invention.

Now, with reference to FIG. 11, the jackpot-related processing is described.

FIG. 11 is a view illustrating a flowchart of the jackpot-related processing for the gaming machine according to the embodiment of the present invention.

First, the main CPU 71 calculates the amount for accumulation (step S71). The main CPU 71 obtains the product of the value stored in the number-of-BETs storage area and a preset accumulation ratio, so that the amount for accumulation to the amount of jackpot is calculated.

Next, the main CPU 71 transmits the calculated amount for accumulation to the external control device 200 (step S72). Upon reception of the amount for accumulation, the external control device 200 updates the amount of jackpot. After the processing has been conducted, the jackpot-related processing is completed.

<Insurance-Related Processing>

Figure 12:
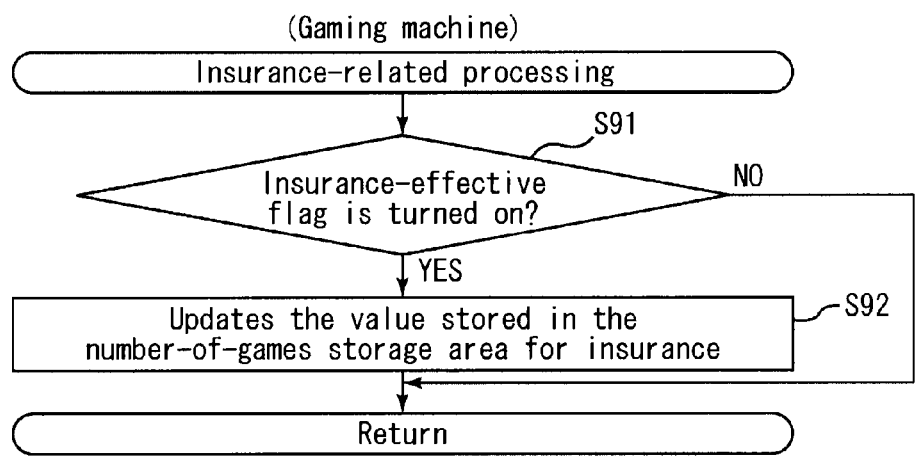
FIG. 12 is a view illustrating a flowchart of insurance-related processing for the gaming machine according to the embodiment of the present invention.

Next, with reference to FIG. 12, the insurance-related processing is described.

FIG. 12 is a view illustrating a flowchart of the insurance-related processing for the gaming machine according to the embodiment of the present invention.

First, the main CPU 71 determines whether or not an insurance-effective flag is turned on (step S91). The insurance-effective flag is turned on when a command to make the insurance effective is inputted by the player in the insurance selection processing which is described later with reference to FIG. 19.

When the main CPU 71 determines that the insurance-effective flag is not turned on, the main CPU 71 completes the insurance-related processing. On the other hand, when the main CPU 71 determines that the insurance-effective flag is turned on, the main CPU 71 updates the value (number of insured games) stored in a number-of-games storage area for insurance provided in the RAM 73 (step S92). The number-of-games storage area for insurance is a storage area for storing the number of insured games. In the processing of step S92, the main CPU 71 adds one to the value (number of insured games) stored in the number-of-games storage area for insurance. After the processing has been conducted, the insurance-related processing is completed.

<Symbol Lottery Processing>

Figure 13:
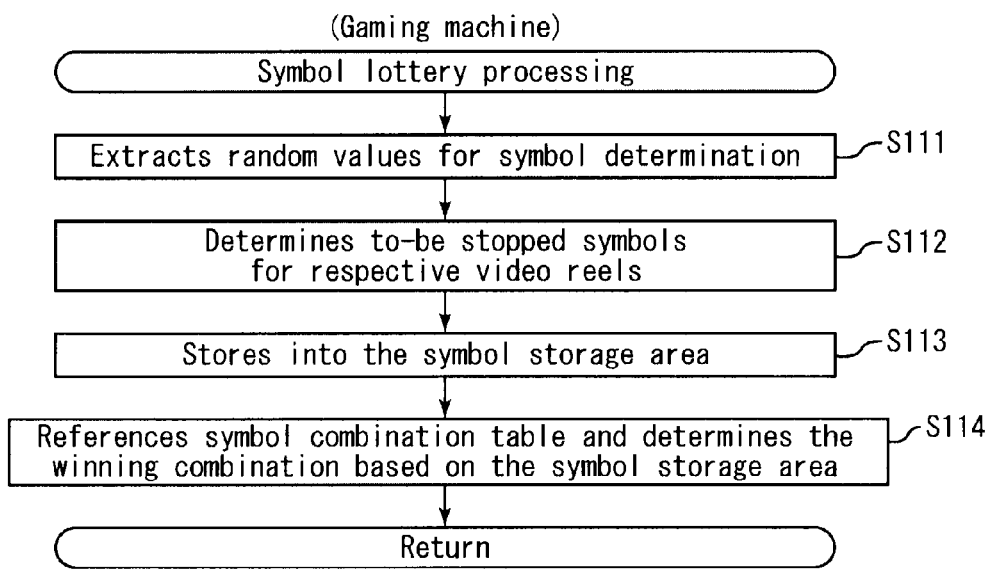
FIG. 13 is a view illustrating a flowchart of symbol lottery processing for the gaming machine according to the embodiment of the present invention.

Next, with reference to FIG. 13, the symbol lottery processing is described.

FIG. 13 is a view illustrating a flowchart of the symbol lottery processing for the gaming machine according to the embodiment of the present invention.

First, the main CPU 71 extracts random values for symbol determination (step S111). The main CPU 71 then determines to-be stopped symbols for the respective video reels 3 by lottery (step S112). The main CPU 71 holds a lottery for each video reel 3, and determines any one of the 22 symbols (code numbers from "00" to "21") as a to-be stopped symbol. At this time, each of the 22 symbols (code numbers from "00" to "21") is determined at an equal probability (i.e. 1/22).

The main CPU 71 then stores the determined to-be stopped symbols for the respective video reels 3 into a symbol storage area provided in the RAM 73 (step S113). Next, the main CPU references the symbol combination table (FIG. 8) and determines a winning combination based on the symbol storage area (step S114). The main CPU 71 determines whether or not the combination of symbols to be displayed along the winning line by the respective video reels 3 matches any of the combinations of symbols specified by the symbol combination table, and determines the winning combination. After the processing has been conducted, the symbol lottery processing is completed.

<Symbol Display Control Processing>

Figure 14:
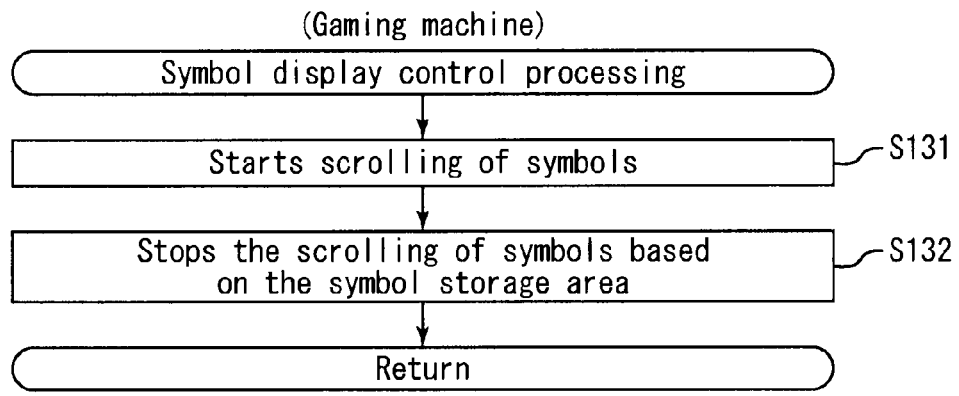
FIG. 14 is a view illustrating a flowchart of symbol display control processing for the gaming machine according to the embodiment of the present invention.

Next, with reference to FIG. 14, the symbol display control processing is described.

FIG. 14 is a view illustrating a flowchart of the symbol display control processing for the gaming machine according to the embodiment of the present invention.

First, the main CPU 71 starts scrolling of the symbol arrays of the respective video reels 3 that are displayed to the symbol display region 4 of the lower image display panel 141 (step S131). The main CPU 71 then stops the scrolling of the symbol arrays of the respective video reels 3, based on the aforementioned symbol storage area (step S132). After the processing has been conducted, the symbol display control processing is completed.

<Number-of-Payouts Determination Processing>

Figure 15:
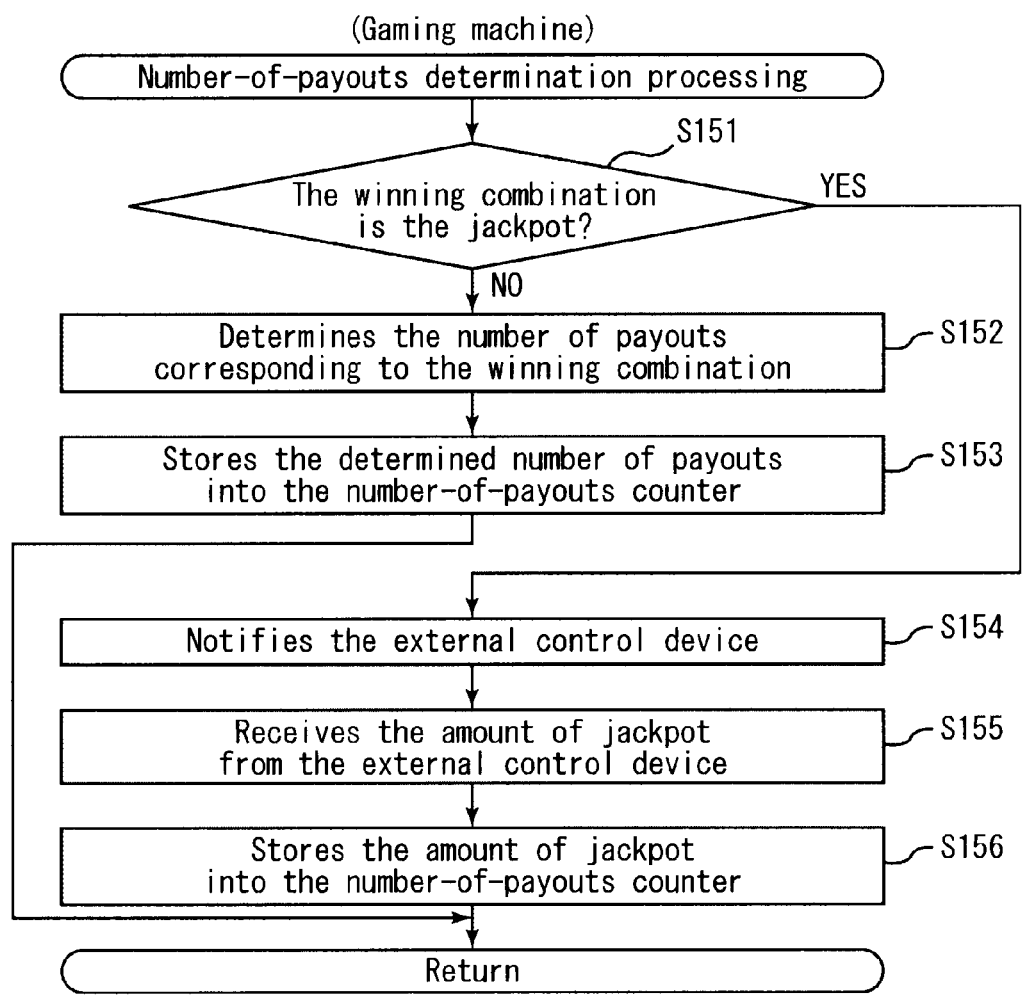
FIG. 15 is a view illustrating a flowchart of number-of-payouts determination processing for the gaming machine according to the embodiment of the present invention.

Next, with reference to FIG. 15, the number-of-payouts determination processing is described.

FIG. 15 is a view illustrating a flowchart of the number-of-payouts determination processing for the gaming machine according to the embodiment of the present invention.

First, the main CPU 71 determines whether or not the winning combination is jackpot (step S151). When the main CPU 71 determines that the winning combination is not jackpot, the main CPU 71 determines the number of payouts corresponding to the winning combination (step S152). For example, when the winning combination is "BELL", the main CPU 71 determines "8" as the number of payouts (see FIG. 8). It is to be noted that the main CPU 71 determines "0" as the number of payouts in the case where the game is lost. Next, the main CPU 71 stores the determined number of payouts into the number-of-payouts storage area (step S153). After the processing has been conducted, the number-of-payouts determination processing is completed.

When the main CPU 71 determines that the winning combination is the jackpot, the main CPU 71 notifies the external control device 200 of the winning of the jackpot (step S154). It is to be noted that, upon reception of the notification, the external control device 200 transmits to the gaming machine 1 the amount of jackpot having updated up to that time. At this time, a part (e.g. 80%) of the amount of jackpot may be the payout subject and the rest (e.g. 20%) may be carried over for the upcoming establishment of the jackpot trigger.

Next, the main CPU 71 receives the amount of jackpot from the external control device 200 (step S155). The main CPU 71 then stores the received amount of jackpot into the number-of-payouts storage area (step S156). After the processing has been conducted, the number-of-payouts determination processing is completed.

<Insurance-Check Processing>

Figure 16:
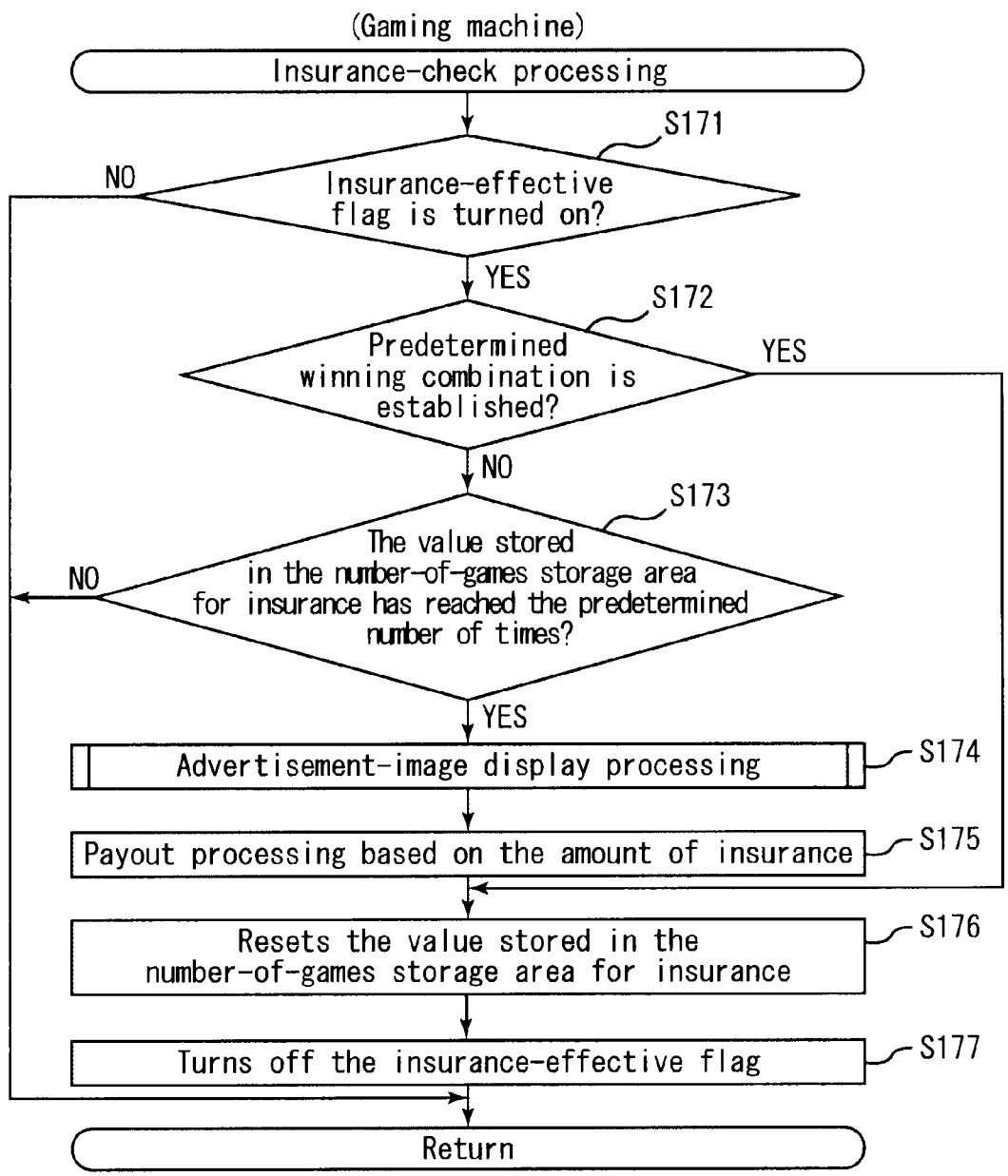
FIG. 16 is a view illustrating a flowchart of insurance-check processing for the gaming machine according to the embodiment of the present invention.

Next, with reference to FIG. 16, the insurance-check processing is described.

FIG. 16 is a view illustrating a flowchart of the insurance-check processing for the gaming machine according to the embodiment of the present invention.

First, the main CPU 71 determines whether or not the insurance-effective flag is turned on (step S171). When the main CPU 71 determines that the insurance-effective flag is not turned on, the main CPU 71 completes the insurance-check processing.

When the main CPU 71 determines that the insurance-effective flag is turned on, the main CPU 71 determines whether or not a predetermined winning combination has been formed (step S172). In the present embodiment, "jackpot" and "mystery bonus" are subjects of the predetermined winning combination.

When the main CPU 71 determines that the predetermined winning combination has not been formed, the main CPU 71 determines whether or not the value (number of insured games) stored in the number-of-games storage area for insurance has reached a predetermined number of times (1000) (step S173). When the main CPU 71 determines that the value (number of insured games) stored in the number-of-games storage area for insurance has not reached the predetermined number of times, the main CPU 71 completes the insurance-check processing.

When the main CPU 71 determines that the value (number of insured games) stored in the number-of-games storage area for insurance has reached the predetermined number of times, the main CPU 71 executes advertisement image display processing (step S174). The advertisement image display processing will be described later in detail with reference to FIG. 17.

Next, the main CPU 71 conducts payout processing based on the amount of insurance (step S175). The main CPU 71 adds an amount (e.g. 10000) preset as the amount of insurance to the value stored in the number-of-credits storage area.

After step S175 or when the main CPU 71 determines in step S172 that the predetermined winning combination has been formed, the main CPU 71 sets the value (number of insured games) stored in the number-of-games storage area for insurance to zero (step S176). Next, the main CPU 71 turns the insurance-effective flag off (step S177). After the processing has been conducted, the insurance-check processing is completed.

Next, the advertisement image display processing is described with reference to FIGS. 17 and 18.

Figure 17:
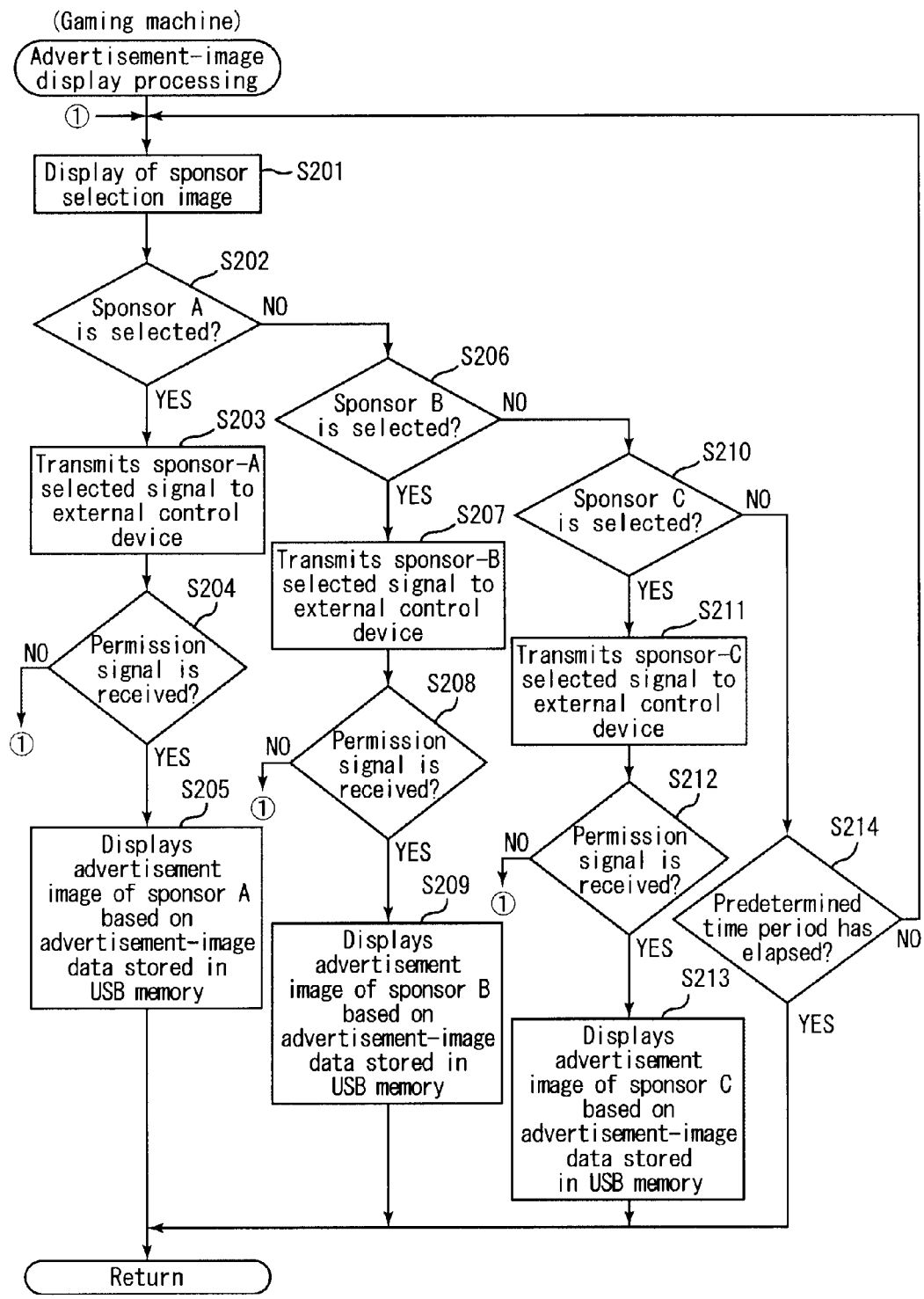
FIG. 17 is a view illustrating a flowchart of advertisement image display processing conducted in the gaming machine according to the embodiment of the present invention.

FIG. 17 is a view illustrating a flowchart of advertisement image display processing conducted in the gaming machine according to the embodiment of the present invention.

Figure 18:
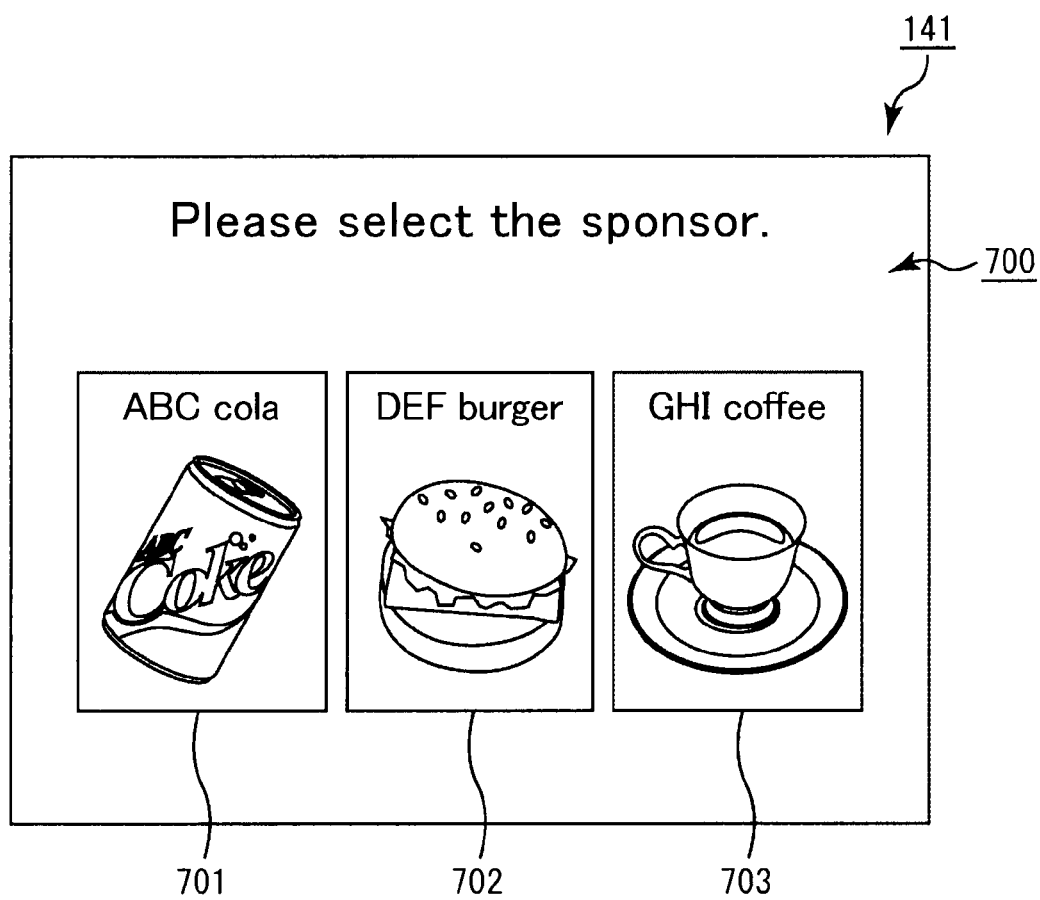
FIG. 18 is a view illustrating an exemplary image displayed to a lower image display panel provided in the gaming machine according to the embodiment of the present invention.

FIG. 18 is a view illustrating an exemplary image displayed to a lower image display panel provided in the gaming machine according to the embodiment of the present invention.

First, the main CPU 71 displays a sponsor selection image 700 to the lower image display panel 141 (step S201).

Here, the sponsor selection image 700 is described with reference to FIG. 18.

As shown in FIG. 18, the sponsor selection image 700 includes a sponsor-A selection image 701, a sponsor-B selection image 702, and a sponsor-C selection image 703.

The player can select the sponsor A (ABC cola) by touching the portion on the touch panel 114 corresponding to the sponsor-A selection image 701, the sponsor B (DEF burger) by touching the portion on the touch panel 114 corresponding to the sponsor-B selection image 702, or the sponsor C (GHI coffee) by touching the portion on the touch panel 114 corresponding to the sponsor-C selection image 703.

The touch panel 114 corresponds to the input device of the present invention. The input device of the present invention is not particularly limited and a conventionally-known input device can be appropriately used.

After executing the processing of step S201, the main CPU 71 determines whether or not the sponsor A has been selected (step S202). In this processing, the main CPU 71 determines whether or not the main CPU 71 has received a signal which is outputted from the touch panel 114 when the portion corresponding to the sponsor-A selection image 701 on the touch panel 114 is touched.

When the main CPU 71 determines that the sponsor A has been selected, the main CPU 71 transmits a sponsor-A selected signal to the external control device 200 (step S203). The sponsor-A selected signal corresponds to the trigger signal of the present invention.

Next, the main CPU 71 determines whether or not the main CPU 71 has received a permission signal from the external control device 200 (step S204). The permission signal is for permitting the display of the advertisement image. The permission signal is later described in detail with reference to FIG. 20.

When the main CPU 71 determines that the main CPU 71 has not received the permission signal, the main CPU 71 returns the processing to step S201.

On the other hand, when the main CPU 71 determines that the main CPU 71 has received the permission signal, the main CPU 71 displays the advertisement image of the sponsor A to the lower image display panel 141 based on the advertisement-image data stored in the USB memory 58a for sponsor A inserted into the USB port 59a for sponsor A (step S205).

Then, the main CPU 71 completes the present subroutine.

When the main CPU 71 determines in step S202 that the sponsor A has not been selected, the main CPU 71 determines whether or not the sponsor B has been selected (step S206). In this processing, the main CPU 71 determines whether or not the main CPU 71 has received a signal which is outputted from the touch panel 114 when the portion corresponding to the sponsor-B selection image 702 on the touch panel 114 is touched.

When the main CPU 71 determines that the sponsor B has been selected, the main CPU 71 transmits a sponsor-B selected signal to the external control device 200 (step S207). The sponsor-B selected signal corresponds to the trigger signal in the present invention.

Next, the main CPU 71 determines whether or not the main CPU 71 has received the permission signal from the external control device 200 (step S208).

When the main CPU 71 determines that the main CPU 71 has not received the permission signal, the main CPU 71 returns the processing to step S201.

On the other hand, when the main CPU 71 determines that the main CPU 71 has received the permission signal, the main CPU 71 displays the advertisement image of the sponsor B to the lower image display panel 141 based on the advertisement-image data stored in the USB memory 58b for sponsor B inserted into the USB port 59b for sponsor B (step S209).

Then, the main CPU 71 completes the present subroutine.

When the main CPU 71 determines in step S206 that the sponsor B has not been selected, the main CPU 71 determines whether or not the sponsor C has been selected (step S210). In this processing, the main CPU 71 determines whether or not the main CPU 71 has received a signal which is outputted from the touch panel 114 when the portion corresponding to the sponsor-C selection image 703 on the touch panel 114 is touched.

When the main CPU 71 determines that the sponsor C has been selected, the main CPU 71 transmits a sponsor-C selected signal to the external control device 200 (step S211). The sponsor-C selected signal corresponds to the trigger signal in the present invention.

Next, the main CPU 71 determines whether or not the main CPU 71 has received the permission signal from the external control device 200 (step S212).

When the main CPU 71 determines that the main CPU 71 has not received the permission signal, the main CPU 71 returns the processing to step S201.

On the other hand, when the main CPU 71 determines that the main CPU 71 has received the permission signal, the main CPU 71 displays the advertisement image of the sponsor C to the lower image display panel 141 based on the advertisement-image data stored in the USB memory 58c for sponsor C inserted into the USB port 59c for sponsor C (step S213).

Then, the main CPU 71 completes the present subroutine.

When the main CPU 71 determines in step S210 that the sponsor C has not been selected, the main CPU 71 then determines whether or not a predetermined time period has elapsed (step S214). When the main CPU 71 determines that the predetermined time period has not elapsed, the main CPU 71 returns the processing to step S201. On the other hand, when the main CPU 71 determines that the predetermined time period has elapsed, the main CPU 71 completes the present subroutine.

<Insurance Selection Processing>

Figure 19:
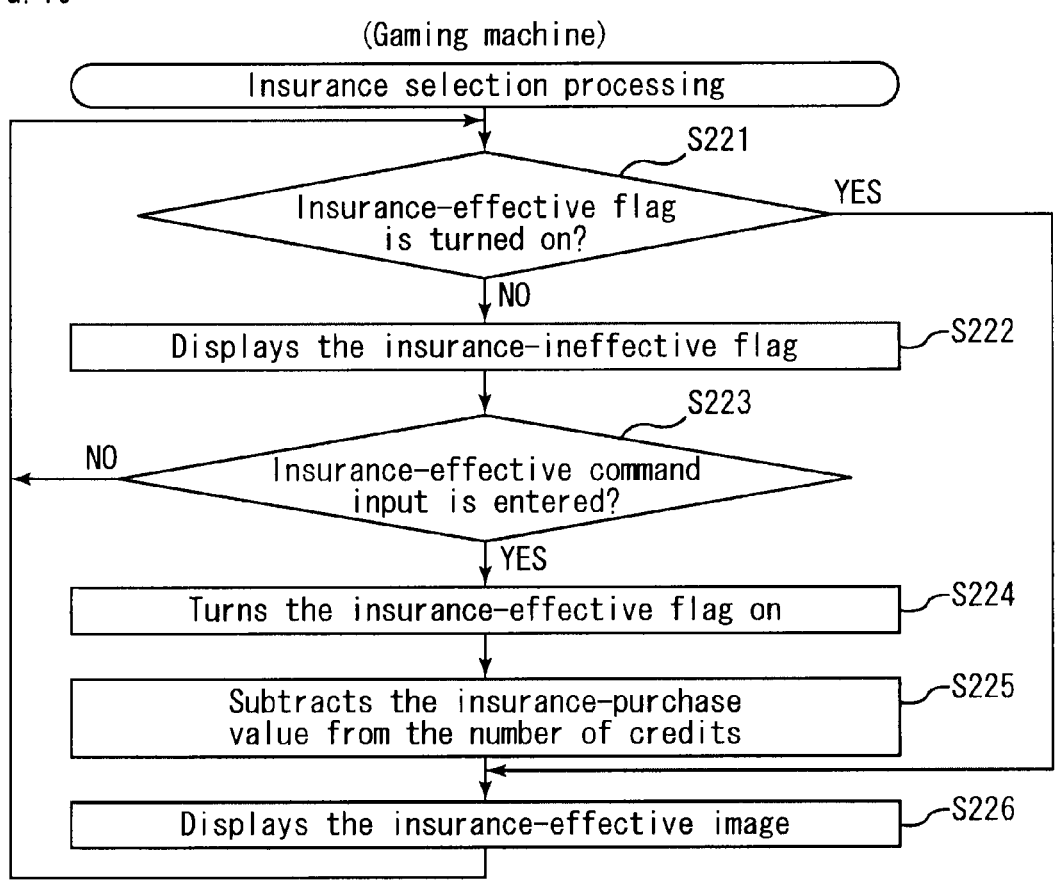
FIG. 19 is a view illustrating a flowchart of insurance selection processing for the gaming machine according to the embodiment of the present invention.

Next, with reference to FIG. 19, the insurance selection processing is described.

FIG. 19 is a view illustrating a flowchart of the insurance selection processing for the gaming machine according to the embodiment of the present invention.

First, the main CPU 71 determines whether or not the insurance-effective flag is turned on (step S221). When the main CPU 71 determines that the insurance-effective flag is not turned on, the main CPU 71 displays an insurance-ineffective image (step S222). The main CPU 71 transmits to the graphic board 130 a command to display the insurance-ineffective image. Based on the command, the graphic board 130 generates the insurance-ineffective image and displays the image to the lower image display panel 141.

As the insurance-ineffective image, for example, an image showing "INSURANCE BET $1.00 TOUCH TO BET" is displayed. This image is an image for prompting the player to select whether or not to make the insurance effective, and notifying the player of the amount required for making the insurance effective. The player can input a command to make the insurance effective by touching a predetermined place on the touch panel 114.

Subsequently, the main CPU 71 determines whether or not an insurance-effective command input has been entered (step S223). When the main CPU 71 determines that the insurance-effective command input has not been entered, the main CPU 71 shifts the processing to step S221 with the insurance-effective flag turned off. On the other hand, when the main CPU 71 determines that the insurance-effective command input has been entered, the main CPU 71 turns the insurance-effective flag on (step S224).

Next, the main CPU 71 subtracts the insurance-purchase amount from the value stored in the number-of-credits storage area (step S225). In the present embodiment, an amount corresponding to, for example, one dollar is subtracted from the value stored in the number-of-credits storage area. After step S225 or when the main CPU 71 determines in step S221 that the insurance-effective flag is turned on, the main CPU 71 displays the insurance-effective image (step S226).

As the insurance-effective image, for example, an image showing "INSURANCE CONTINUED WIN 200 CREDIT" is displayed. This image is an image informing the player that the insurance is effective, and that the value of "200" is to be added to the value stored in the number-of-credits storage area when the insurance condition is satisfied. After the processing has been conducted, the processing is shifted to step S221.

As above, the processing conducted in the gaming machine 1 has been described with reference to FIGS. 9 to 19. Subsequently, processing conducted in the external control device 200 is described with reference to FIGS. 20 to 21.

Figure 20:
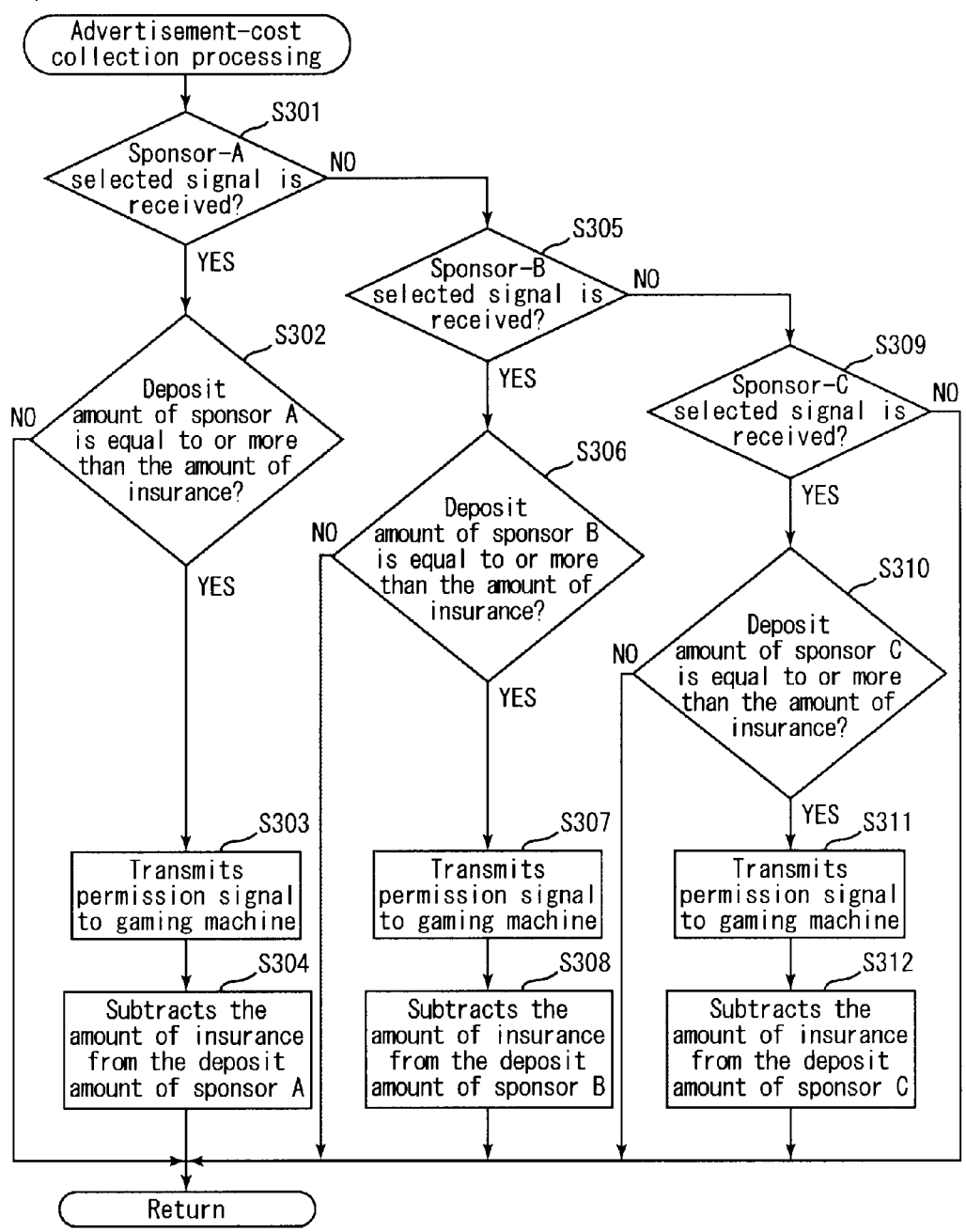
FIG. 20 is a view illustrating a flowchart of advertisement-cost collection processing conducted in the external control device according to the embodiment of the present invention.

FIG. 20 is a view illustrating a flowchart of advertisement-cost collection processing conducted in the external control device according to the embodiment of the present invention.

First, the CPU 201 determines whether or not the CPU 201 has received the sponsor-A selected signal (see step S203 in FIG. 17) from the gaming machine 1 at a predetermined timing (step S301).

When the CPU 201 determines that the CPU 201 has received the sponsor-A selected signal, the CPU 201 determines whether or not the deposit amount indicated by the deposit data stored in the hard disk drive 205 in association with the sponsor A is equal to or more than the amount of insurance (step S302).

When the CPU 201 determines that the deposit amount is less than the amount of insurance, the CPU 201 completes the present subroutine.

On the other hand, when the CPU 201 determines that the deposit amount is equal to or more than the amount of insurance, the CPU 201 transmits the permission signal to the gaming machine 1 (step S303). On receiving the permission signal, the advertisement image is displayed in the gaming machine 1.

Namely, in the first embodiment, the advertisement image is displayed on condition that the deposit amount is equal to or more than the amount of insurance. Accordingly, the casino can surely collect the advertisement cost from the sponsor Further, in the present invention, the gaming system may be configured as follows: when the deposit amount is less than the predetermined amount (e.g. amount of insurance), a signal indicating that the deposit amount is less than the predetermined amount is transmitted from a control device to a sponsor server described later. Accordingly, the casino can more surely collect the advertisement cost from the sponsor. Further, the sponsor can avoid the disadvantage that the advertisement is not conducted because the deposit amount is unknowingly decreased to the amount less than the predetermined amount.

Next, the CPU 201 subtracts the amount of insurance from the deposit amount indicated by the deposit data stored in the hard disk drive 205 in association with the sponsor A (step S304).

Then, the CPU 201 completes the present subroutine.

When the CPU 201 determines in step S301 that the CPU 201 has not received the sponsor-A selected signal, the CPU 201 determines whether or not the CPU 201 received the sponsor-B selected signal (step S305).

When the CPU 201 determines that the CPU 201 has received the sponsor-B selected signal, the CPU 201 determines whether or not the deposit amount indicated by the deposit data stored in the hard disk drive 205 in association with the sponsor B is equal to or more than the amount of insurance (step S306).

When the CPU 201 determines that the deposit amount is less than the amount of insurance, the CPU 201 completes the present subroutine.

On the other hand, when the CPU 201 determines that the deposit amount is equal to or more than the amount of insurance, the CPU 201 transmits the permission signal to the gaming machine 1 (step S307).

Next, the CPU 201 subtracts the amount of insurance from the deposit amount indicated by the deposit data stored in the hard disk drive 205 in association with the sponsor B (step S307).

Then, the CPU 201 completes the present subroutine.

When the CPU 201 determines in step S305 that the CPU 201 has not received the sponsor-B selected signal, the CPU 201 determines whether or not the CPU 201 has received the sponsor-C selected signal (step S309).

When the CPU 201 determines that the CPU 201 has not received the sponsor-C selected signal, CPU 201 completes the present subroutine.

On the other hand, when the CPU 201 determines that the CPU 201 has received the sponsor-C selected signal, the CPU 201 determines whether or not the deposit amount indicated by the deposit data stored in the hard disk drive 205 in association with the sponsor C is equal to or more than the amount of insurance (step S310).

When the CPU 201 determines that the deposit amount is less than the amount of insurance, the CPU 201 completes the present subroutine.

On the other hand, when the CPU 201 determines that the deposit amount is equal to or more than the amount of insurance, the CPU 201 transmits the permission signal to the gaming machine 1 (step S311).

Next, the CPU 201 subtracts the amount of insurance from the deposit amount indicated by the deposit data stored in the hard disk drive 205 in association with the sponsor C (step S312).

Then, the CPU 201 completes the present subroutine.

Figure 21:
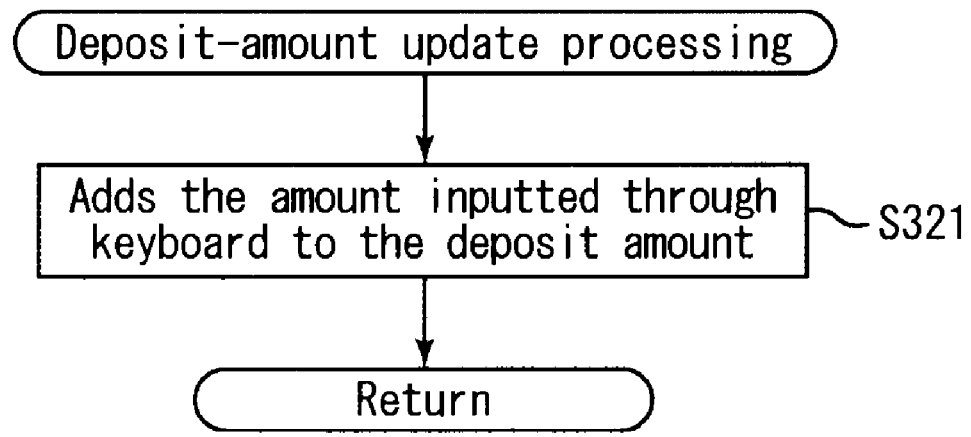
FIG. 21 is a view illustrating a flowchart of deposit-amount update processing conducted in the external control device according to the embodiment of the present invention.

FIG. 21 is a view illustrating a flowchart of deposit-amount update processing conducted in the external control device according to the embodiment of the present invention.

The CPU 201 adds the amount inputted through the keyboard to the deposit amount (step S321).

In this processing, the CPU 201 receives a signal which is outputted when a command to update the deposit amount is inputted through the keyboard. The signal includes sponsor information indicating a sponsor and additional-amount information indicating the amount depositted by the sponsor.

The CPU 201 adds the amount indicated by the additional-amount information included in the signal to the deposit amount indicated by the deposit data stored in association with the sponsor indicated by the sponsor information included in the signal, among the deposit data stored in the hard disk drive 205.

After this processing, the CPU 201 completes the present subroutine.

As above, the first embodiment has been described.

According to the gaming system 300 of the first embodiment, coins of the number corresponding to the amount of insurance are paid out when the number of insured games has reached the predetermined number of times (1000) in the gaming machine 1. At this time, the player is generally elated and satisfied with obtaining of coins. According to the gaming system 300 of the first embodiment, an advertisement image of the sponsor is displayed to the lower image display panel 141 at this timing. Namely, the advertisement is carried out to the elated and satisfied player. Accordingly, it is highly possible that such advertisement gives the player a favorable impression and is striking to the player. As a result, it is highly possible to increase the player's willingness to purchase the sponsor's product. Consequently, a significant advertising effect can be obtained.

In addition, according to the gaming system 300 of the first embodiment, a signal is transmitted from the gaming machine 1 to the external control device 200 when the number of insured games has reached the predetermined number of times (1000). Then, on receiving the signal, the external control device 200 subtracts the amount of insurance from the deposit amount indicated by the deposit data stored in the hard disk drive 205. Accordingly, the casino can collect money in an amount corresponding to the amount of insurance from the sponsor as the advertisement cost, and therefore, it is possible to reduce the financial burden on the casino, which is involved in the payout of coins of the number corresponding to the amount of insurance to the player.

According to the gaming system 300 of the first embodiment, the advertisement image of one sponsor selected through the touch panel 114 out of a plurality of sponsors is displayed. Accordingly, it is possible to advertise a plurality of sponsors in one gaming machine.

The deposit data is stored in association with each sponsor. Accordingly, it is possible to collect the advertisement cost from each sponsor.

Further, the displayed advertisement image is provided by the sponsor selected by the player through the touch panel 114, namely by the sponsor that the player may be interested in. Accordingly, it is possible to obtain a further significant advertising effect.

In the gaming system 300 according to the first embodiment, advertisement-image data indicating the advertisement image of the sponsor is stored in the USB memory 58. When the number of insured games has reached the predetermined number of times (1000), the advertisement-image data is read from the USB memory 58 and the advertisement image is displayed. Accordingly, the sponsor can change the advertisement image by changing contents of the advertisement-image data stored in the USE memory 58. As a result, the sponsor can put the advertisement according to their business plan at the time.

Second Embodiment

Hereinafter, components that are same as the components of the gaming system 300 according to the first embodiment are given the same signs in description.

Further, descriptions are omitted about the parts to which the descriptions in the first embodiment are applicable in a second embodiment.

In the first embodiment, there has been described that the advertisement cost is collected by subtracting the amount of insurance from the deposit amount indicated by the deposit data stored in the hard disk drive 205.

On the other hand, in the second embodiment, the advertisement cost is collected following the below procedures of:

(i) selecting one sponsor when the number of insured games has reached the predetermined number of times (1000);

(ii) storing the selected number of times with respect to each sponsor in the hard disk drive; and (iii) conducting processing related to billing to the sponsor when the selected number of times has reached the predetermined number.

Further, in the first embodiment, there has been described that the advertisement-image data is provided from the USB memory 58.

On the other hand, in the second embodiment, the advertisement-image data is provided from the external control device 200.

The above points are described with reference to FIGS. 22 to 25.

Figure 22:
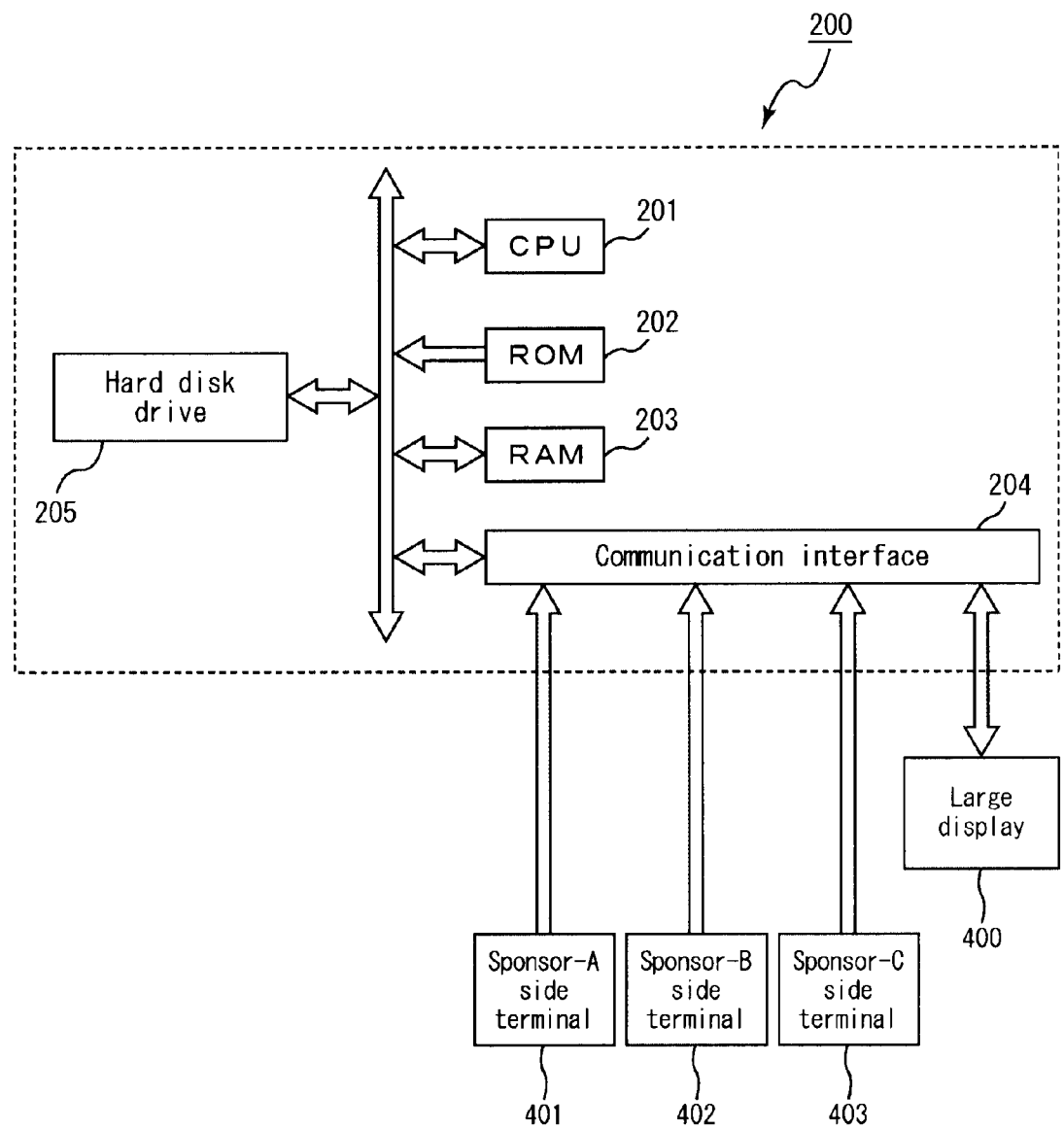
FIG. 22 is a block diagram illustrating an internal configuration of an external control device of one embodiment of the present invention.

FIG. 22 is a block diagram illustrating an internal configuration of an external control device of one embodiment of the present invention.

Unlike the first embodiment, the hard disk drive 205 stores selected-number-of-times data of sponsor A, selected-number-of-times data of sponsor B, and selected-number-of-times data of sponsor C, instead of deposit data.

The selected-number-of-times data of sponsor A indicates the number of times that the sponsor A has been selected (selected number of times $T_A$ of sponsor A). The selected-number-of-times data of sponsor B indicates the number of times that the sponsor B has been selected (selected number of times $T_B$ of sponsor B). The selected-number-of-times data of sponsor C indicates the number of times that the sponsor C has been selected (selected number of times $T_C$ of sponsor C).

The selected-number-of-times data of sponsor A and the selected-number-of-times data of sponsor B and the selected-number-of-times data of sponsor C constitute the cost-collecting data of the present invention.

The hard disk drive 205 further stores advertisement-image data indicating the advertisement image of respective sponsors, each in association with the corresponding sponsor among the sponsor A, the sponsor B, and the sponsor C.

The communication interface 204 is connected with a sponsor-A side terminal 401, a sponsor-B side terminal 402, and a sponsor-C side terminal 403. The sponsor-Aside terminal 401, the sponsor-B side terminal 402, and the sponsor-C side terminal 403 are installed in respective sponsors' facilities remote from the casino. Each of the sponsor-A side terminal 401, the sponsor-B side terminal 402, and the sponsor-C side terminal 403 are provided with an input device and has access to the external control device 200 through the internet.

The advertisement-image data stored in the hard disk drive 205 is updated according to the access from the sponsor-A side terminal 401, the sponsor-B side terminal 402, or the sponsor-C side terminal 403.

Figure 23:
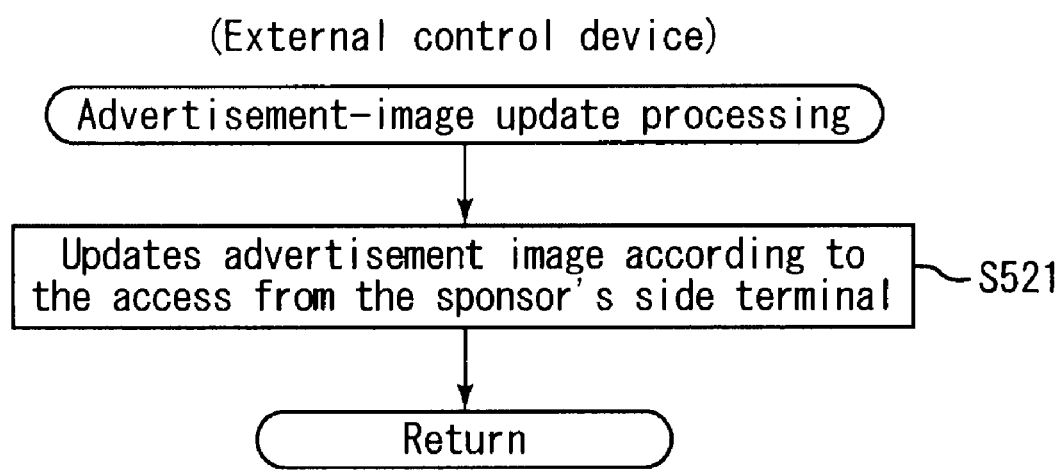
FIG. 23 is a view illustrating a flowchart of advertisement image update processing conducted in the external control device according to the embodiment of the present invention.

FIG. 23 is a view illustrating a flowchart of advertisement image update processing conducted in the external control device according to the embodiment of the present invention.

The CPU 201 updates the advertisement-image data stored in the hard disk drive 205 according to the access from the sponsor's side terminal (step S521).

In this processing, the CPU 201 receives a signal from the sponsor-A side terminal 401, the sponsor-B side terminal 402, or the sponsor-C side terminal 403. The signal includes sponsor information indicating the sponsor and the advertisement-image data.

The CPU 201 stores the advertisement-image data included in the signal as the new advertisement-image data in the hard disk drive 205, in association with the sponsor indicated by the sponsor information included in the signal After this processing, the CPU 201 completes the present subroutine.

Figure 24:
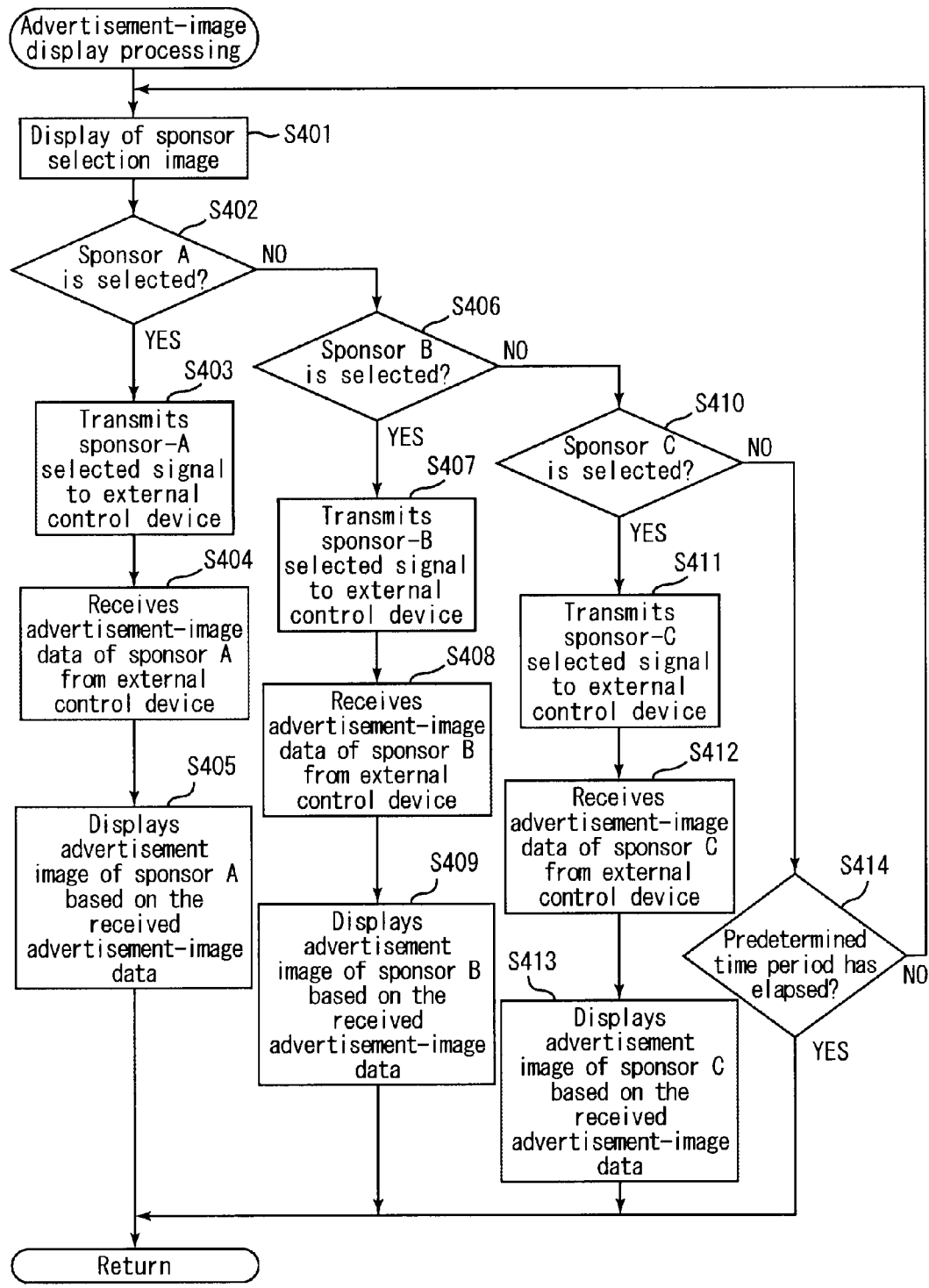
FIG. 24 is a view illustrating a flowchart of advertisement image display processing conducted in the gaming machine according to the embodiment of the present invention.

FIG. 24 is a view illustrating a flowchart of advertisement image display processing conducted in the gaming machine according to the embodiment of the present invention.

First, the main CPU 71 executes the processing of steps S401 to S403. The processing is the same as the processing of steps S201 to S203, and therefore, the description thereof is omitted here.

After the processing of step S403, the main CPU 71 receives the advertisement-image data of the sponsor A from the external control device 200 (step S404).

Based on the received advertisement-image data, the advertisement image of the sponsor A is displayed to the lower image display panel 141 (step S405).

Then, the main CPU 71 completes the present subroutine.

When the main CPU 71 determines in step S402 that the sponsor A has not been selected, the main CPU 71 executes the processing of steps S406 to S407. The processing is the same as the processing of steps S206 to S207, and therefore, the description thereof is omitted here.

After the processing of step S407, the main CPU 71 receives the advertisement-image data of the sponsor B from the external control device 200 (step S408).

Based on the received advertisement-image data, the advertisement image of the sponsor B is displayed to the lower image display panel 141 (step S409).

Then, the main CPU 71 completes the present subroutine.

When the main CPU 71 determines in step S406 that the sponsor B has not been selected, the main CPU 71 executes the processing of steps S410 to S411. The processing is the same as the processing of steps S210 to S211, and therefore the description thereof is omitted here.

After the processing of step S411, the main CPU 71 receives the advertisement-image data of the sponsor C from the external control device 200 (step S412).

Based on the received advertisement-image data, the advertisement image of the sponsor C is displayed to the lower image display panel 141 (step S413).

Then, the main CPU 71 completes the present subroutine.

When the main CPU 71 determines in step S410 that the sponsor C has not been selected, the main CPU 71 executes the processing of step S414. The processing is the same as the processing of step S214 in FIG. 17, and therefore, the description thereof is omitted here.

Figure 25:
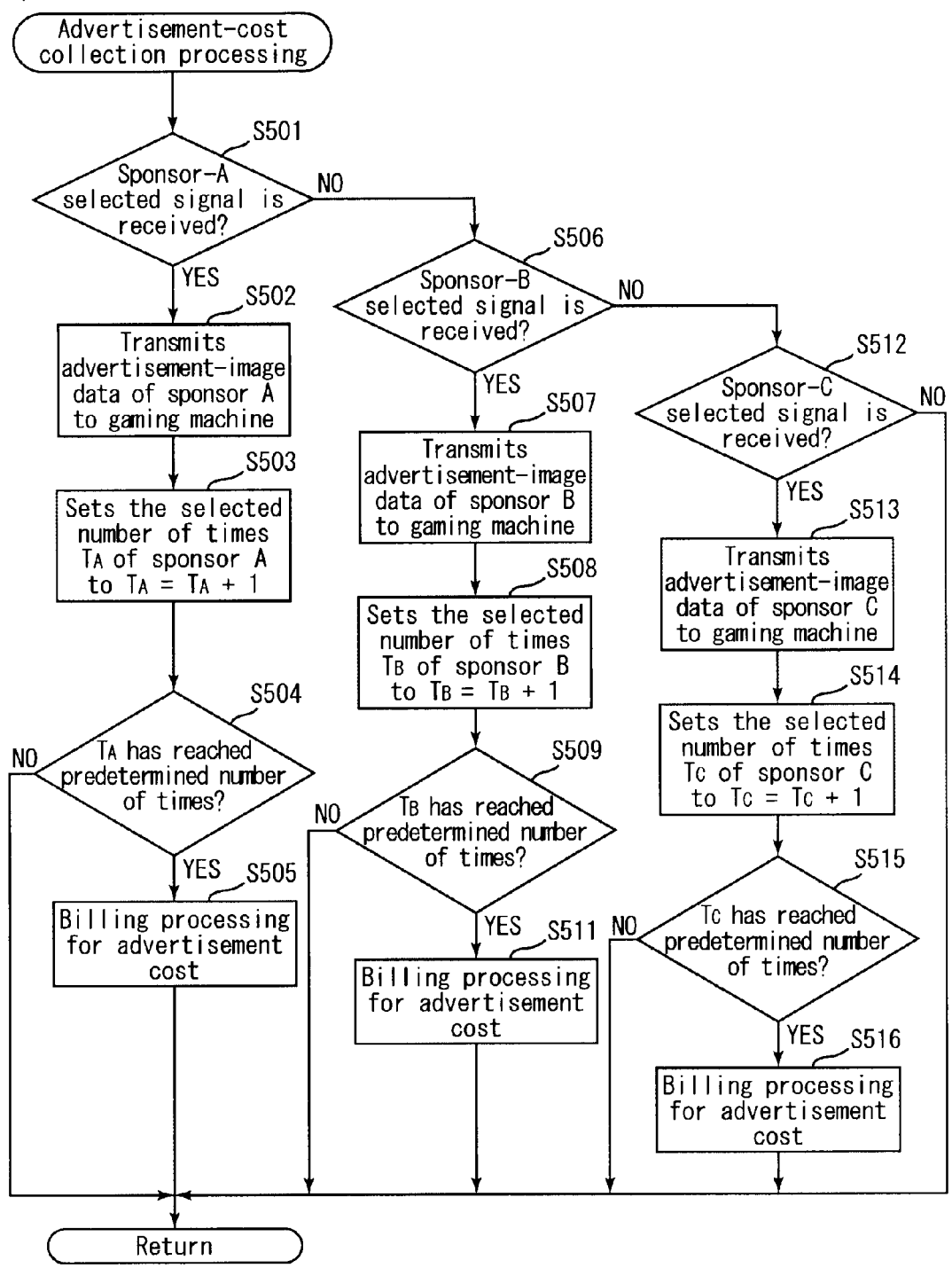
FIG. 25 is a view illustrating a flowchart of advertisement-cost collection processing conducted in the external control device according to the embodiment of the present invention.

FIG. 25 is a view illustrating a flowchart of advertisement-cost collection processing conducted in the external control device according to the embodiment of the present invention.

First, the CPU 201 determines whether or not the CPU 201 has received the sponsor-A selected signal (see step S403 in FIG. 24) from the gaming machine 1 (step S501).

When the CPU 201 determines that the CPU 201 has received the sponsor-A selected signal, the CPU 201 transmits the advertisement-image data stored in the hard disk drive 205 in association with the sponsor A to the gaming machine 1 (step S502).

Next, the CPU 201 sets the selected number of times $T_A$ of sponsor A to $T_A=T_A+1$ in the hard disk drive 205 (step S503).

Subsequently, the CPU 201 determines whether or not the selected number of times $T_A$ of sponsor A has reached the predetermined number of times N based on the selected-number-of-times data of sponsor A stored in the hard disk drive 205 (step S504).

When the CPU 201 determines that the selected number of times $T_A$ of sponsor A has not reached the predetermined number of times N, the CPU 201 completes the present subroutine.

On the other hand, when the CPU 201 determines that the selected number of times $T_A$ of sponsor A has reached the predetermined number of times N, the CPU 201 conducts processing related to billing for the advertisement cost in addition to setting the selected number of times $T_A$ of sponsor A to zero ($T_A=0$) in the hard disk drive 205 (step S505).

After that, the CPU completes the present subroutine.

The processing related to billing for the advertisement cost is not particularly limited, and examples thereof may include:

issuing a bill to the sponsor for the amount corresponding to the amount obtainable by multiplying the amount of insurance by the predetermined number of times N;

transmitting an e-mail for charging the amount corresponding to the amount obtainable by multiplying the amount of insurance by the predetermined number of times N; and transmitting to the server of the bank a signal for notifying the sponsor of charging the amount obtainable by multiplying the amount of insurance by the predetermined number of times N to the deposit account of the sponsor.

In step S501, when the CPU 201 determines that the CPU 201 has not received the sponsor-A selected signal, the CPU 201 determines whether or not the CPU 201 has received the sponsor-B selected signal (see step S407 in FIG. 24) (step S506).

When the CPU 201 determines that the CPU 201 has received the sponsor-B selected signal, the CPU 201 transmits the advertisement-image data stored in the hard disk drive 205 in association with the sponsor B, to the gaming machine 1 (step S507).

Next, the CPU 201 sets the selected number of times $T_B$ of sponsor B to $T_B=T_B+1$ in the hard disk drive (step S508).

Subsequently, the CPU 201 determines whether or not the selected number of times $T_B$ of sponsor B has reached the predetermined number of times N based on the selected-number-of-times data of sponsor B stored in the hard disk drive 205 (step S509).

When the CPU 201 determines that the selected number of times $T_B$ of sponsor B has not reached the predetermined number of times N, the CPU 201 completes the present subroutine.

On the other hand, when the CPU 201 determines that the selected number of times $T_B$ of sponsor B has reached the predetermined number of times N, the CPU 201 conducts processing related to billing for the advertisement cost in addition to setting the selected number of times $T_B$ of sponsor B to zero ($T_B$=0) in the hard disk drive 205 (step S511).

After that, the CPU completes the present subroutine.

In step S506, when the CPU 201 determines that the CPU 201 has not received the sponsor-B selected signal, the CPU 201 determines whether or not the CPU 201 has received the sponsor-C selected signal (see step S411 in FIG. 24) (step S512).

When the CPU 201 determines that the CPU 201 has received the sponsor-C selected signal, the CPU 201 transmits the advertisement-image data stored in the hard disk drive 205 in association with the sponsor C, to the gaming machine 1 (step S513).

Next, the CPU 201 sets the selected number of times $T_C$ of sponsor C to $T_C=T_C+1$ (step S514).

Subsequently, the CPU 201 determines whether or not the selected number of times $T_C$ of sponsor C has reached the predetermined number of times N based on the selected-number-of-times data of sponsor C stored in the hard disk drive 205 (step S515).

When the CPU 201 determines that the selected number of times $T_C$ of sponsor C has not reached the predetermined number of times N, the CPU 201 completes the present subroutine.

On the other hand, when the CPU 201 determines that the selected number of times $T_C$ of sponsor C has reached the predetermined number of times N, the CPU 201 conducts processing related to billing for the advertisement cost in addition to setting the selected number of times $T_C$ of sponsor C to zero ($T_C$=0) in the hard disk drive 205 (step S516).

After that, the CPU completes the present subroutine.

There has been described the second embodiment.

According to the gaming system 300 of the second embodiment, processing related to billing for the advertisement cost is conducted when the selected number of times of the sponsor has reached the predetermined number of times. The casino can collect money in an amount corresponding to the amount of insurance from the sponsor as the advertisement cost. Accordingly, it is possible to reduce the financial burden on the casino, which is involved in payout of coins of the number corresponding to the amount of insurance to the player.

According to the gaming system 300 of the second embodiment, the sponsor is allowed to pay a constant amount of money to the casino for each bill. Consequently, it is possible to configure an advertisement-cost collecting system that is easy to understand both for the issuer and the recipient of the bill.

In addition, according to the gaming system 300 of the second embodiment, the sponsor can see how much the player is interested in their company or in their products from the selected number of times of the sponsor indicated by the cost-collecting data.

According to the gaming system 300 of the second embodiment, the advertisement-image data is not the permanent data stored in the gaming machine 1, but stored in the hard disk drive 205 provided in the external control device 200. Accordingly, the advertisement image can be changed by changing the contents of the advertisement-image data stored in the hard disk drive 205. As a result, the sponsor can put the advertisement according to their business plan at the time.

Further, according to the gaming system 300 of the second embodiment, the advertisement-image data is updated according to the access through the sponsor's side terminal. Accordingly, the sponsor can change the advertisement image by making an access to the external control device 200 at their own timing. As a result, the advertisement in the gaming machine 1 is further matched to the sponsor's business plan at the time.

In addition, according to the gaming system 300 of the second embodiment, the advertisement-image data is transmitted to the gaming machine 1 every time the number of insured games has reached the predetermined number of times (1000), so that the newest advertisement can be always carried out. Since the advertisement-image data is not required to be stored in the gaming machine 1 before the number of insured games reaches the predetermined number of times (1000), it is possible to reduce a load on the gaming machine 1 for storing data.

Third Embodiment

In the second embodiment, there has been described that the advertisement-image data stored in the hard disk drive 205 is updated according to the access through the sponsor's side terminal.

On the other hand, in the third embodiment, when advertisement-image data stored in the hard disk drive 205 is different from advertisement-image data stored in a sponsor-side memory device, the advertisement-image data stored in the sponsor-side memory device is stored in the hard disk drive 205 as new advertisement data, so that the advertisement-image data is updated.

The description is given on this point with reference to FIGS. 26 to 30.

Figure 26:
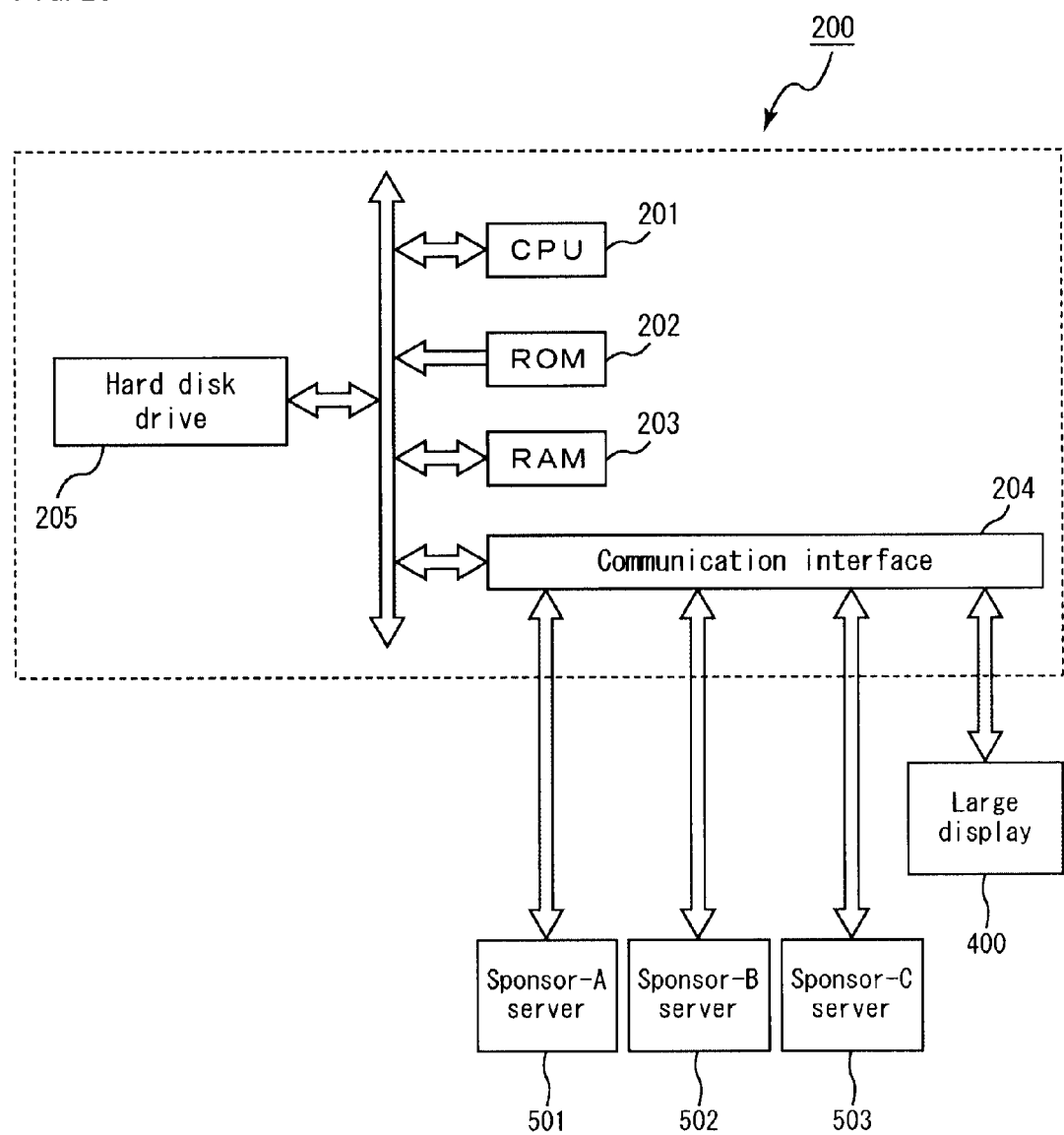
FIG. 26 is a block diagram illustrating an internal configuration of an external control device of one embodiment of the present invention.

FIG. 26 is a block diagram illustrating an internal configuration of an external control device of one embodiment of the present invention.

In the same manner as in the second embodiment, the hard disk drive 205 stores advertisement-image data indicating the advertisement images of respective sponsors, each in association with the corresponding sponsor among the sponsor A, the sponsor B, and the sponsor C.

On the other hand, different from the second embodiment, the communication interface 204 is connected with a sponsor-A server 501, a sponsor-B server 502, and a sponsor-C server 503. The sponsor-A server 501, the sponsor-B server 502, and the sponsor-C server 503 are installed in respective sponsors' facilities located remote from the casino. The sponsor-A server 501, the sponsor-B server 502, and the sponsor-C server 503 are capable of communicating with the external control device 200 through Internet.

Although not shown in the drawing, the sponsor-A server 501 is provided with a sponsor-A side memory device. The sponsor-B server 502 is provided with a sponsor-B side memory device. The sponsor-C server 503 is provided with a sponsor-C side memory device. The sponsor-A side memory device stores advertisement-image data indicating the advertisement image of the sponsor A. The sponsor-B side memory device stores advertisement-image data indicating the advertisement image of the sponsor B. The sponsor-C side memory device stores advertisement-image data indicating the advertisement image of the sponsor C.

Figure 27:
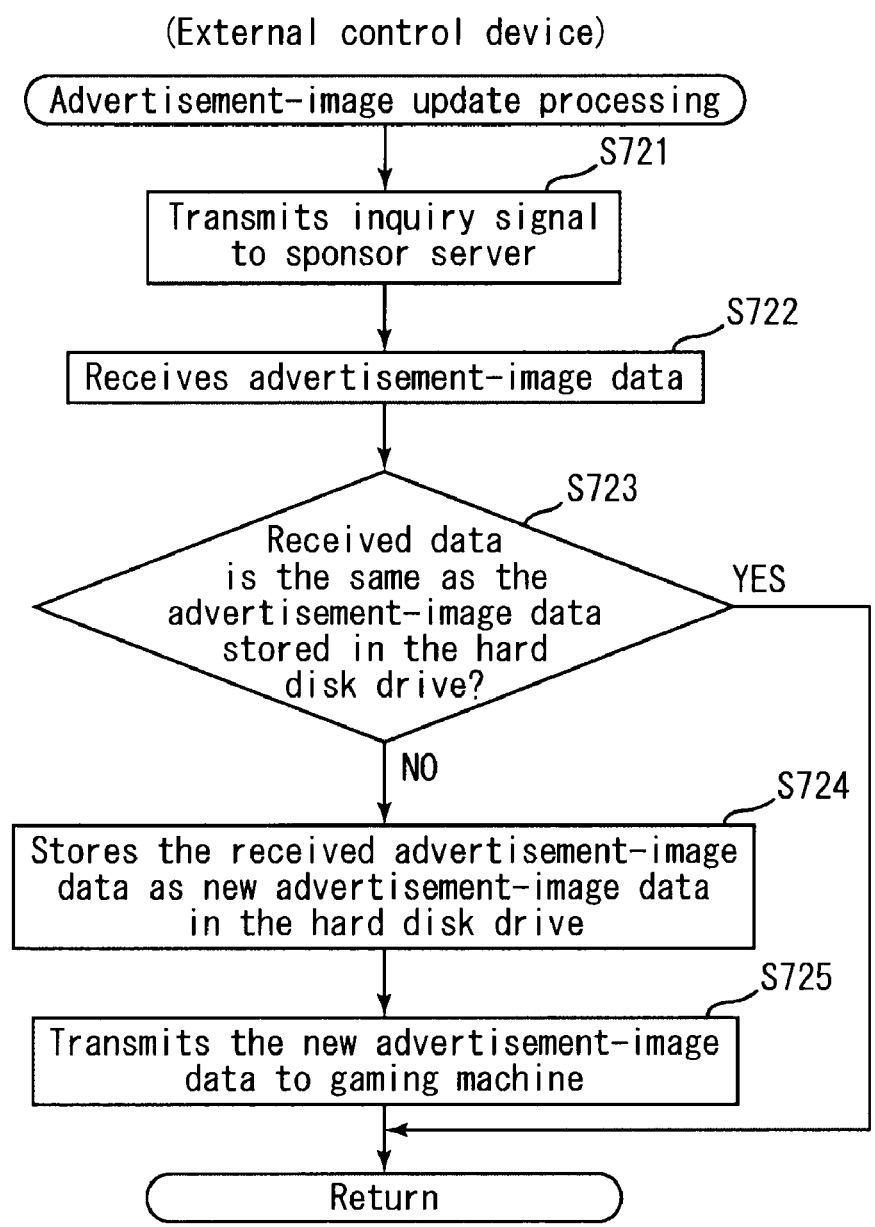
FIG. 27 is a view illustrating advertisement image update processing conducted in the external control device according to the embodiment of the present invention.

FIG. 27 is a view illustrating advertisement image update processing conducted in the external control device according to the embodiment of the present invention.

In the following, updating of the advertisement-image data of the sponsor A is described, and the same is applicable to updating of the advertisement-image data of the sponsor B and the sponsor C.

First, the CPU 201 transmits an inquiry signal to the sponsor-A server 501 at a predetermined timing (step S721). On receiving the inquiry signal, the sponsor-A server 501 transmits advertisement-image data stored in the sponsor-A-side memory device.

The CPU 201 receives the advertisement-image data (step S722).

Next, the CPU 201 determines whether or not the received advertisement-image data is the same as the advertisement-image data stored in the hard disk drive 205 in association with the sponsor A (step S723).

When the CPU 201 determines that the received advertisement-image data is the same as the advertisement-image data stored in the hard disk drive 205 in association with the sponsor A, the CPU 201 completes the present subroutine.

On the other hand, when the CPU 201 determines that the received advertisement-image data is different from the advertisement-image data stored in the hard disk drive 205 in association with the sponsor A, the CPU 201 stores the received advertisement-image data as the new advertisement-image data in the hard disk drive 205 in association with the sponsor A (step S724).

Then, the CPU 201 transmits the new advertisement-image data to the gaming machine 1 (step S725).

After that, the CPU 201 completes the present subroutine.

Figure 28:
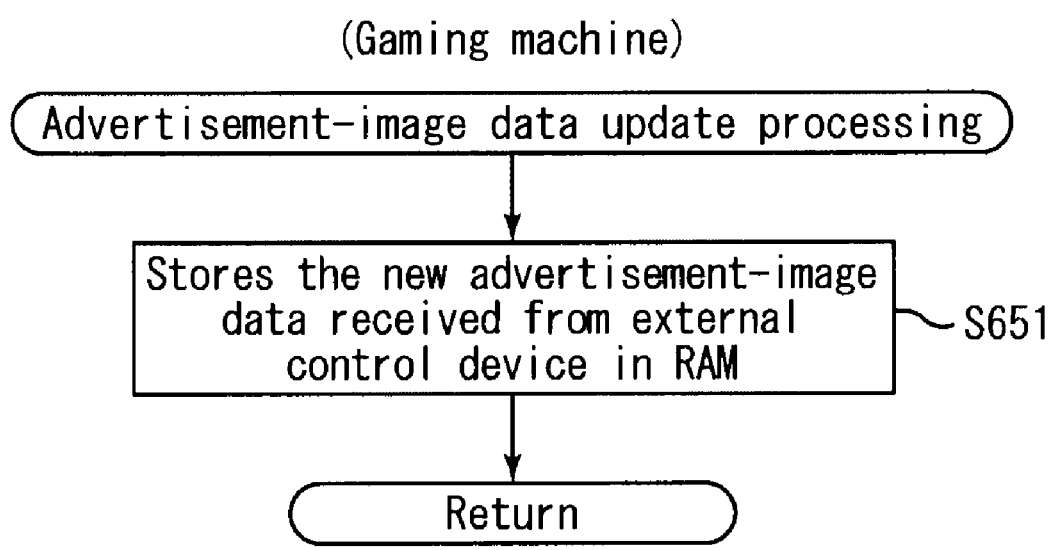
FIG. 28 is a view illustrating advertisement-image data update processing conducted in the gaming machine according to the embodiment of the present invention.

FIG. 28 is a view illustrating advertisement-image data update processing conducted in the gaming machine according to the embodiment of the present invention.

This subroutine is executed when the new advertisement-image data is received from the external control device 200 (see step S725 in FIG. 27).

The main CPU 71 stores the received new advertisement-image data in the RAM 73 in association with the sponsor A (step S651).

Then, the main CPU 71 completes the present subroutine.

There has been described updating of the advertisement-image data of the sponsor A, and the same is applicable to updating of the advertisement-image data of the sponsor B and the sponsor C.

Figure 29:
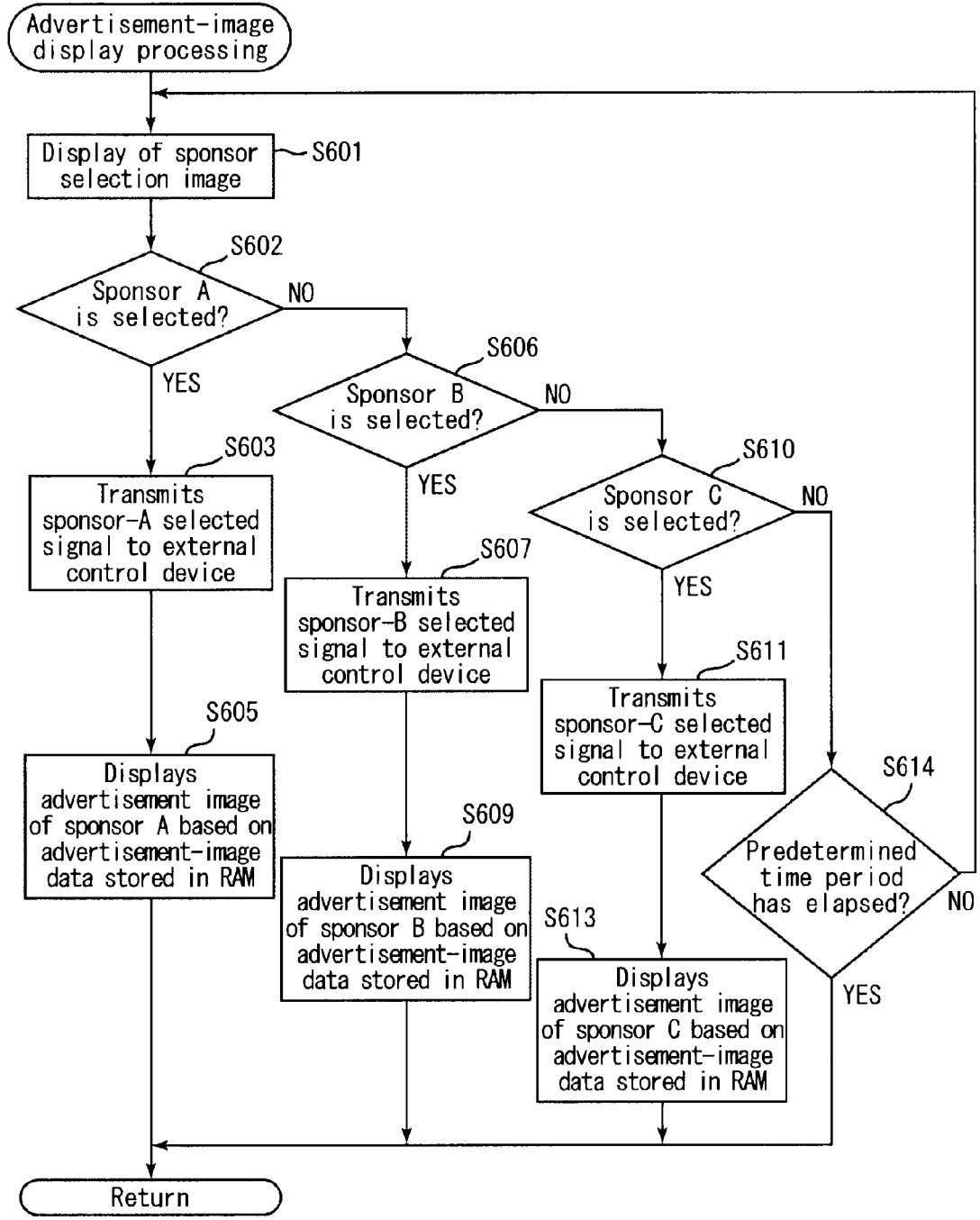
FIG. 29 is a view illustrating a flowchart of advertisement image display processing conducted in the gaming machine according to the embodiment of the present invention.

FIG. 29 is a view illustrating a flowchart of advertisement image display processing conducted in the gaming machine according to the embodiment of the present invention.

First, the main CPU 71 executes the processing of steps S601 to S603. The processing is the same as the processing of steps S401 to S403 in FIG. 24, and therefore, the description thereof is omitted here.

After the processing of step S603, the main CPU 71 displays the advertisement image of the sponsor A to the lower image display panel 141 based on the advertisement-image data stored in the RAM 73 in association with the sponsor A (step S605).

After that, the main CPU 71 completes the present subroutine.

When the main CPU 71 determines in step S602 that the sponsor A has not been selected, the main CPU 71 executes the processing of steps S606 to S607. The processing is the same as the processing of steps S406 to S407 in FIG. 24, and therefore, the description thereof is omitted here.

After the processing of step S607, the main CPU 71 displays the advertisement image of the sponsor B to the lower image display panel 141 based on the advertisement-image data stored in the RAM 73 in association with the sponsor B (step S609).

After that, the main CPU 71 completes the present subroutine.

When the main CPU 71 determines in step S606 that the sponsor B has not been selected, the main CPU 71 executes the processing of steps S610 to S611. The processing is the same as the processing of steps S410 to S411 in FIG. 24, and therefore, the description thereof is omitted here.

After the processing of step S611, the main CPU 71 displays the advertisement image of the sponsor C to the lower image display panel 141 based on the advertisement-image data stored in the RAM 73 in association with the sponsor C (step S613).

Then, the main CPU 71 completes the present subroutine.

When the main CPU 71 determines in step S610 that the sponsor C has not been selected, the main CPU 71 executes the processing of step S614. The processing is the same as the processing of step S414 in FIG. 24, and therefore, the description thereof is omitted here.

Figure 30:
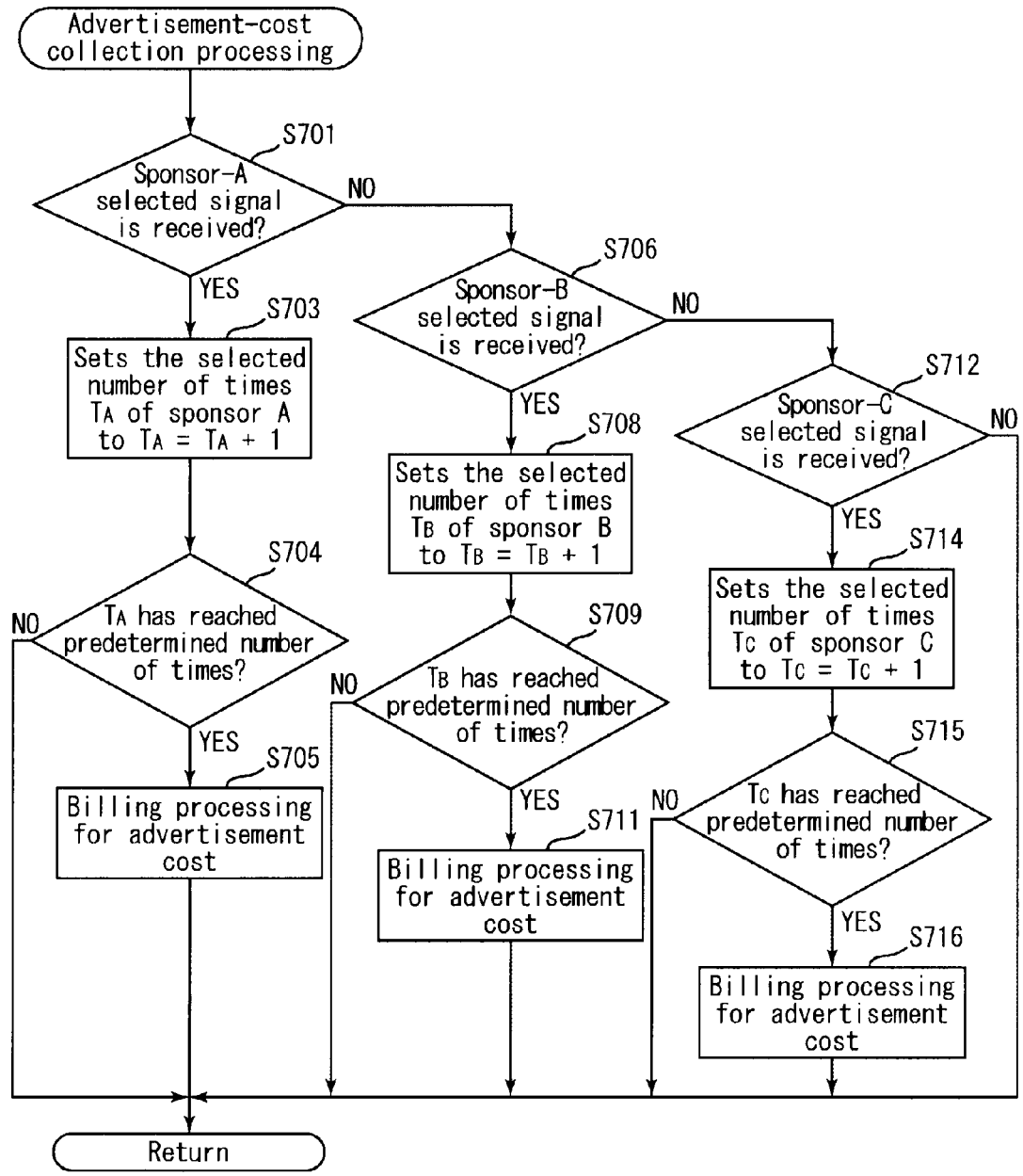
FIG. 30 is a view illustrating a flowchart of advertisement-cost collection processing conducted in the external control device according to the embodiment of the present invention.

FIG. 30 is a view illustrating a flowchart of advertisement-cost collection processing conducted in the external control device according to the embodiment of the present invention.

Processing of steps S701 to S705 is the same as the processing of steps S501 and S503 to S505 in FIG. 25, and therefore, the description thereof is omitted here.

Processing of steps S706 to S711 is the same as the processing of steps S506 and S508 to S511 in FIG. 25, and therefore, the description thereof is omitted here.

Processing of steps S712 to S716 is the same as the processing of steps S512 and S514 to S516 in FIG. 25, and therefore, the description thereof is omitted here.

There has been described the third embodiment.

According to the gaming system 300 of the third embodiment, when the advertisement-image data stored in the hard disk drive 205 provided in the external control device 200 is different from the advertisement-image data stored in the sponsor-side memory device provided in the sponsor server, the advertisement-image data stored in the sponsor-side memory device is stored in the hard disk drive 205 as the new advertisement-image data. Accordingly, simple updating of the advertisement-image data stored in the sponsor-side memory device can change the contents of the advertisement conducted in the gaming machine 1, which is very convenient for the sponsor. Further, the casino can make good use of such convenience to find many sponsors.

Fourth Embodiment

In the above embodiments, there has been described that coins of the number corresponding to the amount of insurance are paid out when a predetermined condition has been formed. In the present invention, a predetermined profit to be offered when a predetermined condition is satisfied is not limited to this example.

In the fourth embodiment, a free game is played when a predetermined condition is satisfied. The free game is a game played without a bet of game media such as coins. In the fourth embodiment, game media to be paid out in the free game is used as the predetermined profit of the present invention.

In the fourth embodiment, the hard disk drive 205 stores total-advertisement-amount data of sponsor A, total-advertisement-amount data of sponsor B, and total-advertisement-amount data of sponsor C. The total-advertisement-amount data of sponsor A indicates the total amount related to the advertisement cost of the sponsor A (total advertisement amount). The total-advertisement-amount data of sponsor B indicates the total amount related to the advertisement cost of the sponsor B (total advertisement amount). The total-advertisement-amount data of sponsor C indicates the total amount related to the advertisement cost of the sponsor C (total advertisement amount).

The total-advertisement-amount data of sponsor A, The total-advertisement-amount data of sponsor B, and The total-advertisement-amount data of sponsor C constitute the cost-collecting data of the present invention.

Figure 31:
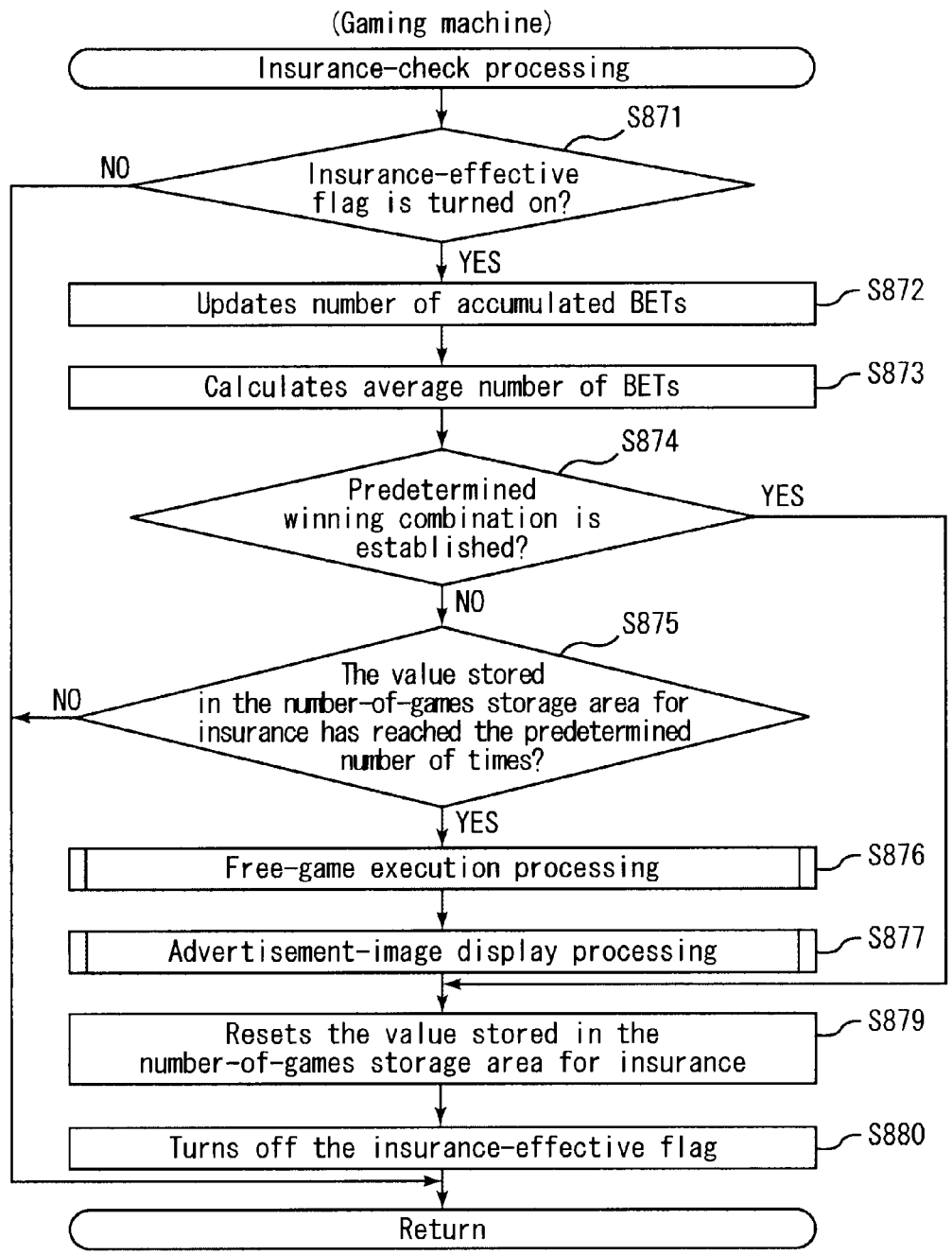
FIG. 31 is a view illustrating a flowchart of insurance check processing of the gaming machine according to the embodiment of the present invention.

FIG. 31 is a view illustrating a flowchart of insurance check processing of the gaming machine according to the embodiment of the present invention.

First, the main CPU 71 executes the processing of step S871. The processing is the same as the processing of step S171 in FIG. 16, and therefore, the description thereof is omitted here.

When the main CPU 71 determines that the insurance-effective flag is turned on, the main CPU 71 updates the number of accumulated BETs (step S872). In this processing, the main CPU 71 adds the number of BET coins (number of BETs, see FIG. 10) to a number of accumulated-BETs indicated by number-of-accumulated-BETs data stored in a storage area for the number of accumulated BETs in the RAM 73.

Next, the main CPU 71 calculates an average number of BETs (step S873). In this processing, the main CPU 71 calculates the average number of BETs based on the number of accumulated BETs indicated by the number-of-accumulated-BETs data stored in the RAM 73 and a value (number of insured games) stored in the number-of-games storage area for insurance in the RAM 73. Then, the main CPU 71 stores average-number-of-BETs data indicating the calculated average number of BETs, in an average-number-of-BETs storage area provided in the RAM 73.

Subsequently, the main CPU 71 executes processing of steps S874 to S875. The processing is the same as the processing of step S172 to S173 in FIG. 16, and therefore, the description thereof is omitted here.

When the main CPU 71 determines that the value (number of insured games) stored in the number-of-games storage area for insurance has reached the predetermined number of times, the main CPU 71 conducts free-game execution processing (step S876). The free-game execution processing is later described in detail with reference to FIG. 32.

Next, the main CPU 71 executes advertisement image display processing (step S877). The advertisement image display processing is later described in detail with reference to FIG. 33.

Subsequently, the main CPU 71 executes processing of steps S879 to S880. The processing is the same as the processing of steps S176 to S177 in FIG. 16, and therefore, the description thereof is omitted here.

Figure 32:
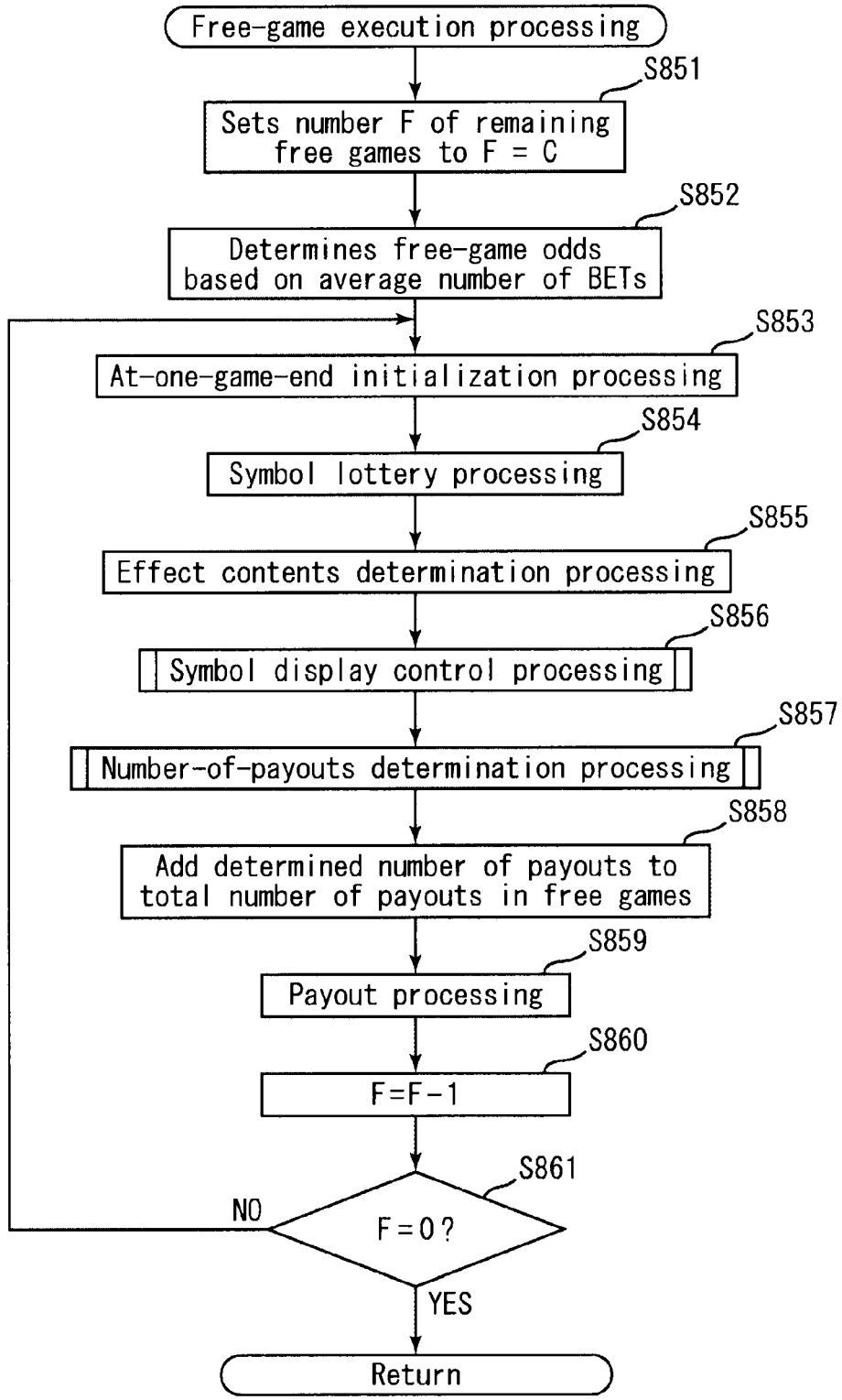
FIG. 32 is a view illustrating a flowchart of free-game execution processing conducted in the gaming machine according to the embodiment of the present invention.

FIG. 32 is a view illustrating a flowchart of free-game execution processing conducted in the gaming machine according to the embodiment of the present invention.

First, the main CPU 71 sets the number F of remaining free games to F=C (e.g. C=10) in the number-of-free-games storage area in the RAM 73 (step S851).

Next, the main CPU 71 determines free-game odds based on average-number-of-BETs data stored in the average-number-of-BETs storage area in the RAM 73 (step S852). In the processing, the main CPU 71 determines M as the free-game odds, which satisfies M≦(average number of BETs)<M+1. The main CPU 71 stores free-game-odds data indicating the determined free-game odds in a free-game-odds storage area in the RAM 73.

After the processing of step S852, the main CPU 71 executes processing of steps S853 to S857. The processing is substantially the same as the processing of steps S12, S14, and S16 to S18 in FIG. 9, and therefore, the description is given only on the different point.

In step S857, the number of payouts is determined by regarding coins are betted of the number obtainable by multiplying the number of coins betted in the game that has triggered the generation of the free game, by the free-game odds stored in the free-game-odds storage area in the RAM 73.

After the processing of step S857, the main CPU 71 adds the number of payouts determined in step S857 to a total number of payouts in free games indicated by data on the total number of payouts in free games stored in a storage area for the total number of payouts in free games (step S858).

Next, the main CPU 71 executes processing of step S859. The processing is the same as the processing of step S24 in FIG. 9, and therefore, the description thereof is omitted here.

The main CPU 71 then sets the number F of remaining free games as F=F−1, in the number-of-free-games storage area of the RAM 73 (step S860).

Next, the main CPU 71 determines whether or not F is 0, based on number-of-remaining-times data stored in the number-of-free-games storage area of the RAM 73 (step S861).

When the main CPU 71 determines that F is not 0, the main CPU 71 returns the processing to step S853.

On the other hand, when the main CPU 71 determines that F is 0, the main CPU 71 completes the present subroutine.

FIG. 33 is a view illustrating a flowchart of advertisement image display processing conducted in the gaming machine according to the embodiment of the present invention.

Processing of steps S801 to S814 is substantially the same as the processing of steps S401 to S414, and therefore, the description thereof is omitted here.

However, different from the processing of step S403, S407 and S411 in FIG. 24, a sponsor-A selected signal, a sponsor-B selected signal, and a sponsor-C selected signal respectively include information indicating the total number of payouts in free games (information on total number of payouts in free games).

FIG. 34 is a view illustrating a flowchart of advertisement-cost collection processing conducted in the external control device according to the embodiment of the present invention.

First, the main CPU 71 executes processing of steps S901 to S902. The processing is the same as the processing of steps S501 to S502 in FIG. 25, and therefore, the description thereof is omitted here.

Next, the CPU 201 adds the total number of payouts in free games indicated by the information on the total number of payouts in free games included in the sponsor-A selected signal received in step S901, to the total advertisement amount of sponsor A indicated by the total-advertisement-amount data of sponsor A stored in the hard disk drive 205 (step S903).

Subsequently, the CPU 201 determines whether or not the total advertisement amount of sponsor A has reached the predetermined amount (step S904).

When the CPU 201 determines that the total advertisement amount of sponsor A has not reached the predetermined amount, the CPU 201 completes the present subroutine.

On the other hand, when the CPU 201 determines that the total advertisement amount of sponsor A has reached the predetermined amount, the CPU 201 executes processing of step S905 and completes the present subroutine.

The processing of step S905 is the same as the processing of step S505 in FIG. 25, and therefore, the description thereof is omitted here.

When the CPU 201 determines that the CPU 201 has not received the sponsor-A selected signal in step S901, the CPU 201 executes processing of steps S906 to S907. The processing is the same as the processing of steps S506 to S507 in FIG. 25, and therefore, the description thereof is omitted here.

Next, the CPU 201 adds the total number of payouts in free games indicated by the information on the total number of payouts in free games included in the sponsor-B selected signal received in step S906, to the total advertisement amount of sponsor B indicated by the total-advertisement-amount data of sponsor B stored in the hard disk drive 205 (step S908).

Subsequently, the CPU 201 determines whether or not the total advertisement amount of sponsor B has reached the predetermined amount (step S909).

When the CPU 201 determines that the total advertisement amount of the sponsor B has not reached the predetermined amount, the CPU 201 completes the present subroutine.

On the other hand, when the CPU 201 determines that the total advertisement amount of sponsor B has reached the predetermined amount, the CPU 201 executes processing of step S911 and completes the present subroutine.

The processing of step S911 is the same as the processing of step S511 in FIG. 25, and therefore, the description thereof is omitted here.

When the CPU 201 determines that the CPU 201 has not received the sponsor-B selected signal in step S906, the CPU 201 executes processing of steps S912 to S913. The processing is the same as the processing of steps S512 to S513 in FIG. 25, and therefore, the description thereof is omitted here.

Next, the CPU 201 adds the total number of payouts in free games indicated by the information on the total number of payouts in free games included in the sponsor-C selected signal received in step S912, to total advertisement amount of sponsor C indicated by the total-advertisement-amount data of sponsor C stored in the hard disk drive 205 (step S914).

Subsequently, the CPU 201 determines whether or not the total advertisement amount of the sponsor C has reached the predetermined amount (step S915).

When the CPU 201 determines that the total advertisement amount of sponsor C has not reached the predetermined amount, the CPU 201 completes the present subroutine.

On the other hand, when the CPU 201 determines that the total advertisement amount of the sponsor C has reached the predetermined amount, the CPU 201 executes processing of step S916 and completes the present subroutine.

The processing of step S916 is the same as the processing of step S516 in FIG. 25, and therefore, the description thereof is omitted here.

There has been described the fourth embodiment.

According to the gaming system 300 of the fourth embodiment, processing related to billing for the advertisement cost is conducted when the total advertisement amount has reached the predetermined amount. The casino can collect money in an amount corresponding to the total advertisement amount from the sponsor as the advertisement cost. Accordingly, it is possible to reduce the financial burden on the casino, which is involved in offering of the profit in the free game to the player.

According to the gaming system 300 of the fourth embodiment, the sponsor is allowed to pay a constant amount of money to the casino for each bill. Consequently, it is possible to configure an advertisement-cost collecting system that is easy to understand both for the issuer and the recipient of the bill.

As above, the description has been given on the first embodiment to the fourth embodiment.

In the above-described embodiments, a condition that "the number of insured games reaches the predetermined number of times" is adopted as the predetermined condition of the present invention. However, the predetermined condition of the present invention is not limited to this example. Examples of the predetermined condition of the present invention include a condition that symbols are stop-displayed in a predetermined stopped state, or a condition that a random value extracted at a predetermined timing is within a predetermined numerical range.

Further, in the above-described embodiments there has been described that the signal is to be transmitted from the gaming machine 1 to the external control device 200 every time the predetermined condition is satisfied. However, the timing to transmit the signal from the gaming machine to the control device is not limited to this example in the present invention. In the present invention, the memory device provided in the gaming machine may be configured to count the number of times the predetermined condition has been satisfied, and the gaming machine may be configured to transmit a signal to the control device when the counted number has reached a predetermined number of times.

In the present invention, money in an amount corresponding to the predetermined profit may be collected from the sponsor in full, or alternatively, only a partial amount may be collected from the sponsor.

Further, in the present invention, an order relation between offering of a predetermined profit and output of an advertisement image or an advertisement sound is not particularly limited. An advertisement image or an advertisement sound may be outputted after a predetermined profit is offered, or alternatively, a predetermined profit may be offered after an advertisement image or an advertisement sound is outputted.

However, in the present invention, an advertisement image or an advertisement sound is desirably outputted after a predetermined profit is offered. The reason for this is that the player's willingness to purchase the product is more likely to be increased.

An advertisement image or an advertisement sound may be outputted after execution of the free game. Further, an advertisement image or an advertisement sound may be outputted at a predetermined timing during free games.

Although the embodiments of the present invention were described above, they were just illustrations of specific examples, and hence do not particularly restrict the present invention. A specific configuration of each step and the like is appropriately changeable in terms of design. Further, the effects described in the embodiments of the present invention are just recitations of the most suitable effects generated from the present invention. The effects of the present invention are thus not limited to those described in the embodiments of the present invention.

Further, the foregoing detailed descriptions centered the characteristic parts of the present invention in order to facilitate understanding of the present invention. The present invention is not limited to the embodiments in the foregoing specific descriptions but applicable to other embodiments with a variety of application ranges. Further, terms and phrases in the present specification were used not for restricting interpretation of the present invention but for precisely describing the present invention. It is considered easy for the skilled in the art to conceive other configurations, systems, methods and the like included in the concept of the present invention from the concept of the invention described in the specification. Therefore, it should be considered that recitations of the claims include uniform configurations in a range not departing from the range of technical principles of the present invention. Moreover, an object of the abstract is to enable a patent office, a general public institution, an engineer belonging to the technical field who is unfamiliar with patent, technical jargon or legal jargon, and the like, to smoothly determine technical contents and an essence of the present application with simple investigation. Accordingly, the abstract is not intended to restrict the scope of the invention which should be evaluated by recitations of the claims. Furthermore, for thorough understanding of an object of the present invention and an effect specific to the present invention, it is desired to make interpretation in full consideration of documents already disclosed and the like.

The foregoing detailed descriptions include processing executed on a computer. Explanations and expressions above are described with the aim of being most efficiently understood by the skilled person in the art. In the specification, each step for use in deriving one result should be understood as the self-consistent processing. Further, in each step, transmission/reception, recording or the like of an electrical or magnetic signal is performed. While such a signal is expressed by using a bit, a value, a symbol, a letter, a term, a number or the like in processing of each step, it should be noted that those are used simply for the sake of convenience in description. While there are cases where processing in each step may be described using an expression in common with that of action of a human, processing described in the specification is essentially executed by a variety of devices. Further, other configurations requested for performing each step should become apparent from the above descriptions.

What is claimed as new and desired to be secured by Letters Patent of the United States is:

1. A method of collecting advertisement cost, comprising the steps of:
   (a) providing a gaming machine configured to offer a predetermined profit when a predetermined condition is satisfied;
   (b) said gaming machine configured to output an advertisement image or an advertisement sound of a sponsor to an output device when said predetermined condition is satisfied and when an amount of money corresponding to said predetermined profit and advertisement cost is deposited by said sponsor and stored in a memory device as deposit data;
   (c) said gaming machine configured to transmit a signal based on the satisfaction of said predetermined condition to a control device at a predetermined timing;
   (A) said control device configured to receive the signal transmitted in said step (c); and
   (B) said control device configured to store cost-collecting data for collecting, as the advertisement cost corresponding to said predetermined profit, a portion of the amount of money stored in the memory device as deposit data, wherein
   the control device is configured to compare the deposit data with the cost-collecting data and to subtract the advertisement cost from the amount of money deposited by said sponsor, said cost-collecting data being based on data included in the signal received in said step (A), and wherein
   when the comparison of the deposit data and the cost-collecting data does not satisfy redetermined criteria neither of the advertisement image or the advertisement sound is output.

2. The method of collecting advertisement cost according to claim 1, wherein said step (B) includes
   said control device storing data indicating a total number of times said predetermined condition has been satisfied or a total amount of money corresponding to said predetermined profit offered in said step (a), in the memory device based on the signal received in said step (A), as cost-collecting data for collecting money in an amount corresponding to said predetermined profit from said sponsor.

3. The method of collecting advertisement cost according to claim 1, further comprising the step of
   (d) said gaming machine receiving from an input device a signal corresponding to one sponsor selected out of a plurality of sponsors through said input device, when said predetermined condition is satisfied, wherein
   said step (b) includes said gaming machine outputting an advertisement image or an advertisement sound of the sponsor corresponding to the signal received in said step (d), to the output device,
   said step (c) includes said gaming machine transmitting a signal including information indicating the sponsor corresponding to the signal received in said step (d) to the control device at a predetermined timing, and
   said step (B) includes said control device storing cost-collecting data for collecting money in an amount corresponding to said predetermined profit from the sponsor indicated by information included in the signal received in said step (A) in the memory device in association with the sponsor, said cost-collecting data being based on data included in the signal.

4. The method of collecting advertisement cost according to claim 3, wherein said step (B) includes storing data indicating the number of times the sponsor indicated by information included in the signal received in said step (A) has been selected through said input device in the memory device in association with the sponsor, as the cost-collecting data for collecting money in an amount corresponding to said predetermined profit from the sponsor.

5. A gaming machine comprising:
   an output device capable of outputting an image or a sound; and
   a controller, said controller programmed to execute the processing of:
   (a) offering a predetermined profit when a predetermined condition is satisfied;
   (b) outputting an advertisement image or an advertisement sound of a sponsor to said output device when said predetermined condition is satisfied and when an amount of money corresponding to said predetermined profit and advertisement cost is deposited by said sponsor and stored in the memory device as deposit data; and
   (c) storing data based on the satisfaction of said predetermined condition in an external memory device, as cost-collecting data for collecting money in an amount corresponding to said advertisement cost from said sponsor, wherein
   said gaming machine is capable of communicating with a control device,
   said processing (c) includes transmitting a trigger signal based on the satisfaction of said predetermined condition, to said control device at a predetermined timing, and said trigger signal is a signal of triggering said control device to execute a processing of subtracting the amount of money corresponding to said advertisement cost from the amount of money deposited by said sponsor, and wherein the control device is configured to compare the deposit data with the cost-collecting data and when the comparison of the deposit data and the cost-collecting data does not satisfy predetermined criteria, neither of the advertisement image or the advertisement sound is output.

6. The gaming machine according to claim 5, wherein said trigger signal is a signal of triggering said control device to execute a processing of storing data indicating a total number of times said predetermined condition has been satisfied or a total amount of money corresponding to said predetermined profit offered in said processing (a), in a memory device provided in said control device based on the signal, as cost-collecting data for collecting money in an amount corresponding said predetermined profit from said sponsor.

7. The gaming machine according to claim 5, wherein said gaming machine is:

provided with an input device capable of receiving an input of a command related to a game; and said controller is further programmed to execute the processing of (d) receiving a signal from said input device corresponding to one sponsor selected out of a plurality of sponsors through said input device, when said predetermined condition is satisfied, said processing (b) includes outputting an advertisement image or an advertisement sound of the sponsor corresponding to the signal received in said processing (d), to said output device, said processing (c) includes transmitting a trigger signal including information indicating the sponsor corresponding to the signal received in said processing (d) to said control device at a predetermined timing, and said trigger signal is a signal of triggering said control device to execute a processing of storing the cost-collecting data for collecting money in an amount corresponding to said predetermined profit from the sponsor indicated by information included in the signal, which is based on data included in the signal, in a memory device provided in said control device in association with the sponsor.

8. The gaming machine according to claim 7, wherein said processing (c) includes transmitting the trigger signal including information indicating the sponsor corresponding to the signal received in said processing (d), to said control device when said predetermined condition is satisfied, and said trigger signal is a signal of triggering said control device to execute a processing of storing data indicating a number of times the signal has been received, as the cost-collecting data for collecting money in an amount corresponding to said predetermined profit from the sponsor indicated by information included in the signal, in a memory device provided in said control device in association with the sponsor.

9. The gaming machine according to claim 5, wherein said gaming machine is provided with a slot for an external memory device storing advertisement data indicating an advertisement image or an advertisement sound of a sponsor, said processing (b) includes outputting an advertisement image or an advertisement sound of a sponsor to said output device based on the advertisement data stored in said external control device inserted into said slot, when said predetermined condition is satisfied, and said processing (c) includes storing data based on the satisfaction of said predetermined condition in said external memory device or an other external memory device different from said external memory device, as cost-collecting data for collecting money in an amount corresponding to said predetermined profit from said sponsor.

10. A control device comprising:

a memory device capable of storing data; and a processor, said control device being capable of communicating with a gaming machine, wherein said gaming machine outputs an advertisement image or an advertisement sound of a sponsor, in addition to offering a predetermined profit, when a predetermined condition is satisfied and when an amount of money corresponding to said predetermined profit and advertisement cost is deposited by said sponsor and stored in the memory device as deposit data, and transmits a trigger signal based on the satisfaction of said predetermined condition to said processor at a predetermined timing, and said processor is programmed to execute the processing of:

(A) receiving said trigger signal from said gaming machine; and (B) storing cost-collecting data for collecting, as the advertisement cost corresponding to said predetermined profit, a portion of the amount of money stored in said memory device, said cost-collecting data being based on data included in said trigger signal received in said processing (A), wherein the processor is configured to compare the deposit data with the cost-collecting data and to subtract the advertisement cost from the amount of money deposited by said sponsor, said cost-collecting data being based on data included in the signal received in said step (A), and wherein when the comparison of the deposit data and the cost-collecting data does not satisfy predetermined criteria, neither of the advertisement image or the advertisement sound is output.

11. The control device according to claim 10, wherein said processing (B) includes storing data indicating a total number of times said predetermined condition has been satisfied or a total amount of money corresponding to said predetermined profit offered in said gaming machine, in said memory device based on the trigger signal received in said processing (A), as the cost-collecting data for collecting money in an amount corresponding to said predetermined profit from said sponsor.

12. The control device according to claim 10, wherein said data stored in the memory, includes advertisement data corresponding to an advertisement image or an advertisement sound of a sponsor;

said gaming machine outputs the advertisement image or the advertisement sound to the output device based on said advertisement data; and, said processing (A) includes (A-1) transmitting the advertisement data stored in said memory device to a controller at a predetermined timing; and (A-2) receiving said trigger signal from said gaming machine, and said processing (B) includes storing cost-collecting data for collecting, as the advertisement cost corresponding to said predetermined profit, a portion of the amount of money stored in said memory device, said cost-collecting data being based on data included in said trigger signal received in said processing (A-2).

13. The control device according to claim 12, wherein said processor is further programmed to execute the processing of (C) updating the advertisement data stored in said memory device according to access from a sponsor-side terminal.

14. The control device according to claim 12, wherein said control device is capable of communicating with a sponsor server provided with a sponsor-side memory device capable of storing said advertisement data, and said processor is further programmed to execute the processing of (D) storing the advertisement data stored in said sponsor-side memory device in said memory device as new advertisement data, when the advertisement data stored in said memory device is different from the advertisement data stored in said sponsor-side memory device.

15. The control device according to claim 12, wherein said processing (A-2) includes receiving said trigger signal from said gaming machine when said predetermined condition is satisfied, and said processing (A-1) includes transmitting the advertisement data stored in said memory device to said controller when receiving the signal in said processing (A-2).

* * * * *